United States Patent
Braeuninger-Weimer et al.

(10) Patent No.: US 12,449,554 B2
(45) Date of Patent: Oct. 21, 2025

(54) SCINTILLATOR DETECTORS AND METHODS FOR POSITRON EMISSION TOMOGRAPHY

(71) Applicant: Cintilight, LLC, Seattle, WA (US)

(72) Inventors: Philipp Braeuninger-Weimer, Seattle, WA (US); Chad E. Seaver, Knoxville, TN (US); Ronald Grazioso, Knoxville, TN (US); Simon Philip Jelley, Cambridge (GB)

(73) Assignee: Cintilight, LLC, Seattle, WA (US)

( * ) Notice: Subject to any disclaimer, the term of this patent is extended or adjusted under 35 U.S.C. 154(b) by 0 days.

(21) Appl. No.: 18/907,444

(22) Filed: Oct. 4, 2024

(65) Prior Publication Data

US 2025/0116787 A1    Apr. 10, 2025

Related U.S. Application Data

(60) Provisional application No. 63/588,258, filed on Oct. 5, 2023.

(51) Int. Cl.
*A61B 6/03*    (2006.01)
*A61B 6/00*    (2006.01)
(Continued)

(52) U.S. Cl.
CPC ............ *G01T 1/1644* (2013.01); *A61B 6/037* (2013.01); *A61B 6/4258* (2013.01);
(Continued)

(58) Field of Classification Search
CPC ...... A61B 6/037; A61B 6/4266; A61B 6/5258
See application file for complete search history.

(56) References Cited

U.S. PATENT DOCUMENTS 4,743,764 A    5/1988    Casey et al.
4,749,863 A    6/1988    Casey et al.
(Continued)

FOREIGN PATENT DOCUMENTS

CN    110974267 A    4/2020
JP    2011149883 A    8/2010
(Continued)

OTHER PUBLICATIONS

Matsumoto et al. Simulation study optimizing the number of photodetection faces for the X'tal cube PET detector with separated crystal segments, Radiological Physics and Technology vol. 7, pp. 43-50 (Year: 2013).*

(Continued)

*Primary Examiner* — David P Porta
*Assistant Examiner* — Shun Lee
(74) *Attorney, Agent, or Firm* — PCFB, LLC; Justin K. Flanagan

(57) ABSTRACT

A positron emission tomography (PET) scanner includes a plurality of gamma radiation detector modules arranged to form a detector ring. Each detector module includes an array of scintillator detectors. Each scintillator detector comprises a monolithic scintillation crystal and a plurality of photodetector arrays, such as silicon photomultipliers (SiPMs). A photodetector array is positioned on at least two nonparallel faces of each scintillation crystal. In some examples, a photodetector array is positioned on each of three orthogonal faces of each scintillation crystal.

14 Claims, 29 Drawing Sheets

(51) Int. Cl.
*A61B 6/42* (2024.01)
*G01T 1/164* (2006.01)
*G01T 1/20* (2006.01)
*G01T 1/29* (2006.01)

(52) U.S. Cl.
CPC .......... *A61B 6/4266* (2013.01); *A61B 6/5258* (2013.01); *G01T 1/20185* (2020.05); *G01T 1/2985* (2013.01)

(56) References Cited

U.S. PATENT DOCUMENTS

| | | | |
|---|---|---|---|
| 5,227,633 | A | 7/1993 | Ryuo et al. |
| 6,114,703 | A | 9/2000 | Levin et al. |
| 6,180,946 | B1 | 1/2001 | Ebstein |
| 6,288,399 | B1 | 9/2001 | Andreaco et al. |
| 6,552,348 | B2 | 4/2003 | Cherry et al. |
| 6,906,329 | B2 | 6/2005 | Bryman |
| 7,019,297 | B2 | 3/2006 | Aykac et al. |
| 7,019,298 | B2 | 3/2006 | Tonami et al. |
| 7,193,208 | B1 | 3/2007 | Burr et al. |
| 7,238,946 | B2 | 7/2007 | Joung et al. |
| 7,378,659 | B2 | 5/2008 | Burr et al. |
| 7,439,509 | B1 | 10/2008 | Grazioso et al. |
| 7,671,339 | B2 | 3/2010 | Shibuya et al. |
| 7,750,311 | B2 | 7/2010 | Daghighian |
| 7,795,590 | B2 | 9/2010 | Takahashi et al. |
| 7,820,977 | B2 | 10/2010 | Beer et al. |
| 8,431,904 | B2 | 4/2013 | Lewellen et al. |
| 8,476,599 | B2 | 7/2013 | Perna |
| 8,586,933 | B2 | 11/2013 | Levene et al. |
| 8,716,669 | B2 | 5/2014 | Miyaoka et al. |
| 8,809,794 | B2 | 8/2014 | Uchida et al. |
| 8,884,239 | B2 | 11/2014 | Wieczorek et al. |
| 8,993,971 | B2 | 3/2015 | Taghibakhsh et al. |
| 9,000,382 | B2 | 4/2015 | Mattson et al. |
| 9,075,151 | B2 | 7/2015 | Rose et al. |
| 9,140,808 | B2 | 9/2015 | Ronda et al. |
| 9,435,898 | B2 | 9/2016 | Olcott et al. |
| 9,668,714 | B2 | 6/2017 | Call et al. |
| 9,709,684 | B2 | 7/2017 | Kim |
| 9,796,922 | B2 | 10/2017 | Menge et al. |
| 9,835,737 | B1 | 12/2017 | Czarnecki et al. |
| 9,841,510 | B2 | 12/2017 | Simon et al. |
| 10,048,392 | B2 | 8/2018 | Long |
| 10,132,939 | B2 | 11/2018 | Adachi et al. |
| 10,267,931 | B1 | 4/2019 | Breuer et al. |
| 10,274,610 | B2 | 4/2019 | Nelson et al. |
| 10,359,519 | B2 | 7/2019 | Teshigawara |
| 10,436,915 | B2 | 10/2019 | Teshigawara |
| 10,451,748 | B1 | 10/2019 | Qiang et al. |
| 10,497,741 | B2 | 12/2019 | Wong et al. |
| 10,509,135 | B2 | 12/2019 | Nelson et al. |
| 10,802,164 | B2 | 10/2020 | Roy |
| 10,877,169 | B2 | 12/2020 | An et al. |
| 11,073,625 | B2 | 7/2021 | Nelson et al. |
| 11,099,283 | B2 | 8/2021 | Yamaji et al. |
| 11,172,911 | B2 | 11/2021 | Call et al. |
| 11,253,212 | B2 | 2/2022 | Jacob et al. |
| 11,378,702 | B2 | 7/2022 | An et al. |
| RE49,174 | E | 8/2022 | Yang et al. |
| 11,454,730 | B2 | 9/2022 | Goldan et al. |
| 11,598,889 | B2 | 3/2023 | Yamaji et al. |
| 11,662,487 | B1 | 5/2023 | Palm et al. |
| 11,719,835 | B2 | 8/2023 | Wu |
| 11,774,605 | B2 | 10/2023 | Saito et al. |
| 12,013,503 | B2 | 6/2024 | Seaver et al. |
| 2001/0040219 | A1 | 11/2001 | Cherry et al. |
| 2004/0140431 | A1 | 7/2004 | Schmand et al. |
| 2004/0178347 | A1 | 9/2004 | Murayama et al. |
| 2004/0227091 | A1 | 11/2004 | LeBlanc et al. |
| 2004/0232342 | A1 | 11/2004 | Aykac et al. |
| 2004/0232343 | A1 | 11/2004 | Schmand et al. |
| 2004/0262526 | A1 | 12/2004 | Corbeil et al. |
| 2005/0072932 | A1 | 4/2005 | Bryman |
| 2005/0253073 | A1 | 11/2005 | Joram et al. |
| 2006/0192128 | A1 | 8/2006 | Benlloch Bavciera et al. |
| 2006/0293580 | A1 | 12/2006 | Ladebeck et al. |
| 2007/0090298 | A1 | 4/2007 | Shao |
| 2007/0102641 | A1 | 5/2007 | Schmand et al. |
| 2007/0262261 | A1 | 11/2007 | Liang |
| 2008/0042070 | A1 | 2/2008 | Levin et al. |
| 2008/0214927 | A1 | 9/2008 | Cherry et al. |
| 2009/0008562 | A1 | 1/2009 | Grazioso et al. |
| 2009/0032717 | A1 | 2/2009 | Aykac et al. |
| 2009/0134334 | A1 | 5/2009 | Nelson |
| 2009/0224164 | A1 | 9/2009 | Lewellen et al. |
| 2009/0236534 | A1 | 9/2009 | Selfe et al. |
| 2009/0261262 | A1 | 10/2009 | Hunt |
| 2010/0012846 | A1 | 1/2010 | Wang |
| 2010/0067001 | A1 | 3/2010 | Corbeil et al. |
| 2010/0127178 | A1 | 5/2010 | Laurence et al. |
| 2010/0148074 | A1 | 6/2010 | Menge et al. |
| 2010/0155610 | A1 | 6/2010 | Menge et al. |
| 2010/0270462 | A1 | 10/2010 | Nelson et al. |
| 2010/0295144 | A1* | 11/2010 | Jackson ............. H01L 27/1469 438/66 |
| 2011/0017916 | A1 | 1/2011 | Schulz et al. |
| 2011/0074426 | A1 | 3/2011 | Schmand et al. |
| 2011/0121184 | A1 | 5/2011 | Inadama et al. |
| 2011/0155898 | A1 | 6/2011 | Burr et al. |
| 2011/0192982 | A1 | 8/2011 | Henseler et al. |
| 2011/0215248 | A1 | 9/2011 | Lewelle et al. |
| 2012/0085913 | A1 | 4/2012 | Mccroskey et al. |
| 2012/0112083 | A1 | 5/2012 | Zhang et al. |
| 2012/0199748 | A1 | 8/2012 | Cooke et al. |
| 2012/0212355 | A1 | 8/2012 | Zhang et al. |
| 2013/0009047 | A1 | 1/2013 | Grazioso et al. |
| 2013/0009066 | A1 | 1/2013 | Grazioso et al. |
| 2013/0009067 | A1 | 1/2013 | Schmand et al. |
| 2013/0032722 | A1 | 2/2013 | Szupryczynski et al. |
| 2013/0153774 | A1 | 6/2013 | Hughes et al. |
| 2013/0153776 | A1 | 6/2013 | Wieczorek et al. |
| 2013/0206994 | A1 | 8/2013 | Kaufmann et al. |
| 2013/0341518 | A1 | 12/2013 | Fries et al. |
| 2014/0029715 | A1* | 1/2014 | Hansen ............... H03K 5/135 250/200 |
| 2014/0097346 | A1 | 4/2014 | Cohen et al. |
| 2014/0306118 | A1 | 10/2014 | Olcott et al. |
| 2015/0028218 | A1 | 1/2015 | Kataoka et al. |
| 2015/0069250 | A1 | 3/2015 | Schmand et al. |
| 2015/0285922 | A1 | 10/2015 | Mintzer et al. |
| 2016/0011321 | A1* | 1/2016 | Solf ..................... G01T 1/2985 250/369 |
| 2016/0124094 | A1 | 5/2016 | Melcher et al. |
| 2016/0170043 | A1 | 6/2016 | Andreaco et al. |
| 2016/0274249 | A1 | 9/2016 | Vogtmeier et al. |
| 2016/0320496 | A1 | 11/2016 | Frach et al. |
| 2017/0123080 | A1 | 5/2017 | Chai et al. |
| 2017/0219719 | A1 | 8/2017 | Melcher et al. |
| 2018/0038967 | A1 | 2/2018 | Li et al. |
| 2018/0196144 | A1* | 7/2018 | Teshigawara ......... A61B 6/582 |
| 2019/0064369 | A1* | 2/2019 | Chen ................ G01N 21/6408 |
| 2019/0353807 | A1 | 11/2019 | Furenlid et al. |
| 2022/0187479 | A1 | 6/2022 | Terao et al. |
| 2022/0211334 | A1 | 7/2022 | Furenlid |
| 2022/0244099 | A1* | 8/2022 | Frach .................. H03K 5/2463 |
| 2023/0041293 | A1 | 2/2023 | Palm et al. |
| 2023/0061883 | A1 | 3/2023 | Sakuragi et al. |
| 2023/0225679 | A1 | 7/2023 | Corbeil |

FOREIGN PATENT DOCUMENTS

| | | |
|---|---|---|
| JP | 2017015471 A | 1/2017 |
| JP | 2017215194 A | 12/2017 |
| JP | 2020060545 A | 4/2020 |
| JP | 7221623 B2 | 2/2023 |
| WO | 1997044684 A1 | 11/1997 |
| WO | 2018077840 A1 | 5/2018 |
| WO | 2018223917 A1 | 12/2018 |

(56) References Cited

FOREIGN PATENT DOCUMENTS

WO      2019008645 A1     1/2019
WO      2021146559 A1     7/2021

OTHER PUBLICATIONS

Berg et al., "Innovations in instrumentation for positron emission tomography," Seminars in nuclear medicine, vol. 48, No. 4, pp. 311-331, 2018.
Conti, "Focus on time-of-flight PET: the benefits of improved time," European Journal of Nuclear Medicine Molecular Imaging, vol. 38, p. 1147-1157, 2011.
Gundacker, et al., "SiPM time resolution: From single photon to saturation," Nuclear Instruments and Methods in Physics Research Section A: Accelerators, Spectrometers, Detectors and Associated Equipment, vol. 718, pp. 569-572, 2013.
Reddin et al., "Performance evaluation of the SiPM-based Siemens Biograph Vision PET/CT system," in IEEE Nuclear Science Symposium and Medical Imaging Conference Proceedings (NSS/MIC), Sydney, 2018.
Saint-Gobain, "LYSO Scintillation Material," Saint-Gobain Ceramics & Plastics, Inc., Jun. 2018. [Online]. Available: https://luxiumsolutions.com/radiation-detection-scintillators/crystal-scintillators/lyso-scintillation-crystals. [Accessed Aug. 28, 2023].
Strother, et al., "Measuring PET scanner sensitivity: relating count rates to image signal-to-noise ratios using noise equivalent counts," IEEE Trans Nuclear Science, vol. 37, pp. 783-788, 1990.
International Search Report for App. No. PCT/US2024/050145 mailed Jan. 14, 2025.
Written Opinion for App. No. PCT/US2024/050145 mailed Jan. 14, 2025.

* cited by examiner

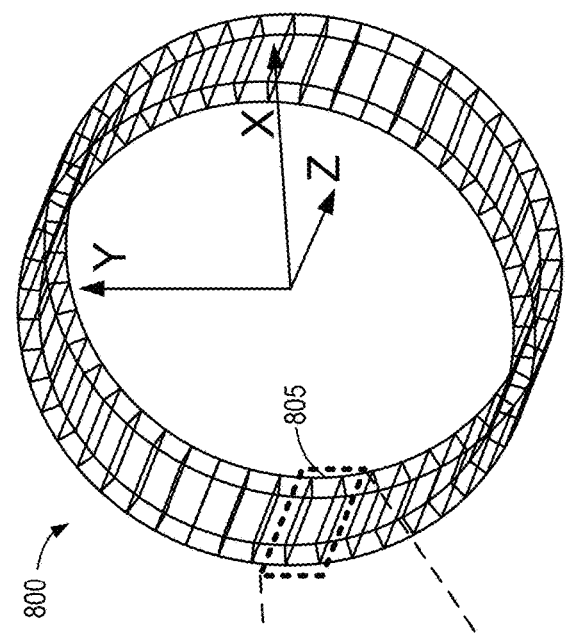
FIG. 8A
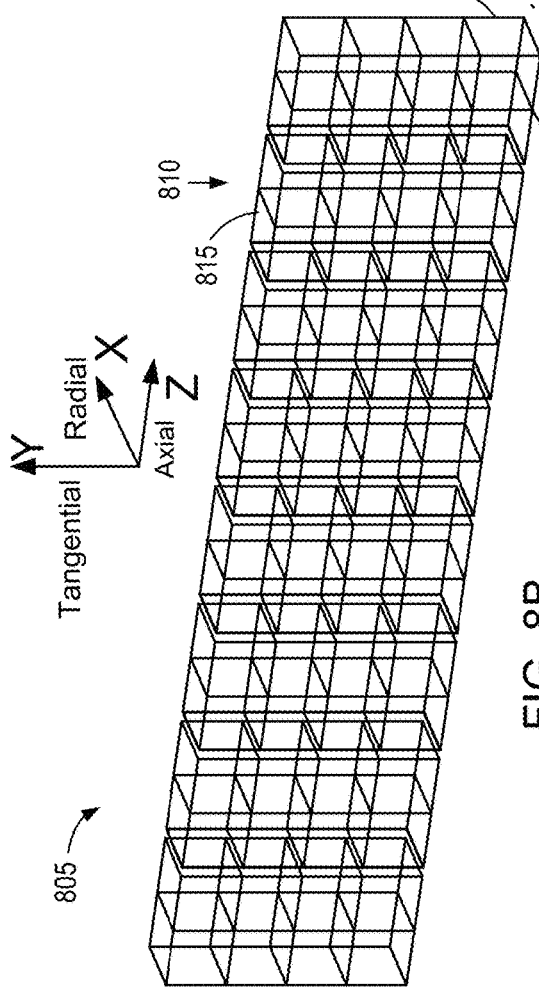
FIG. 8B
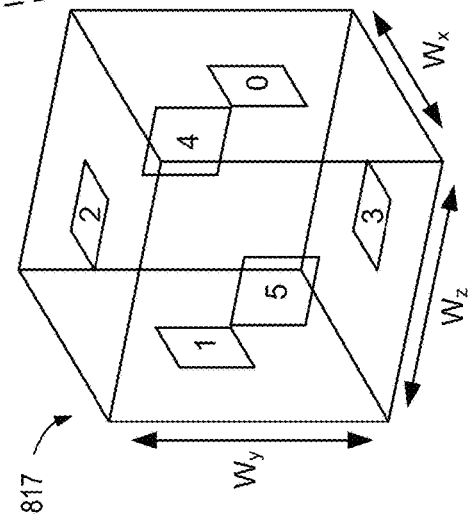
FIG. 8C
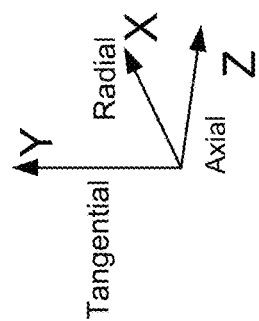

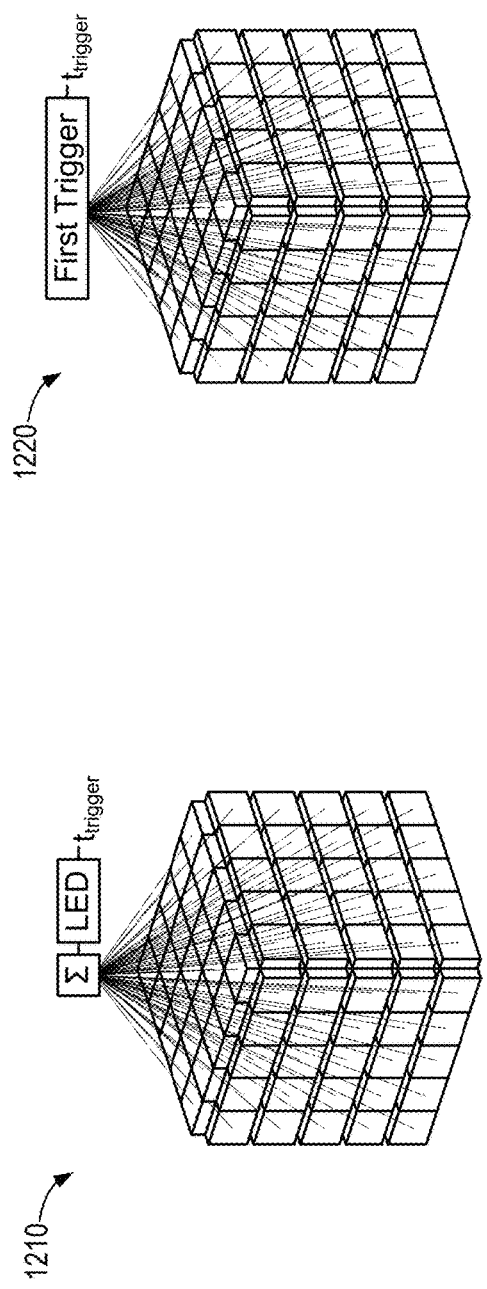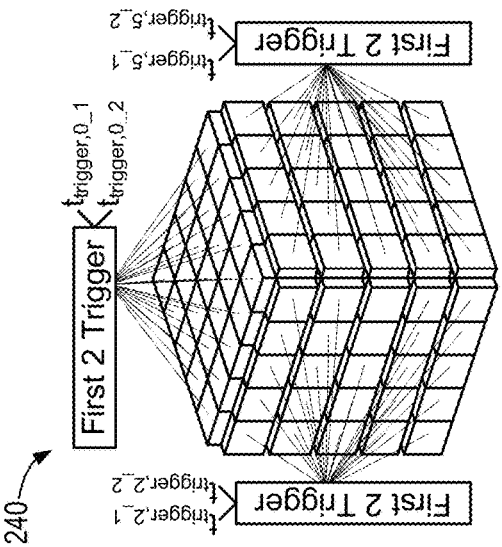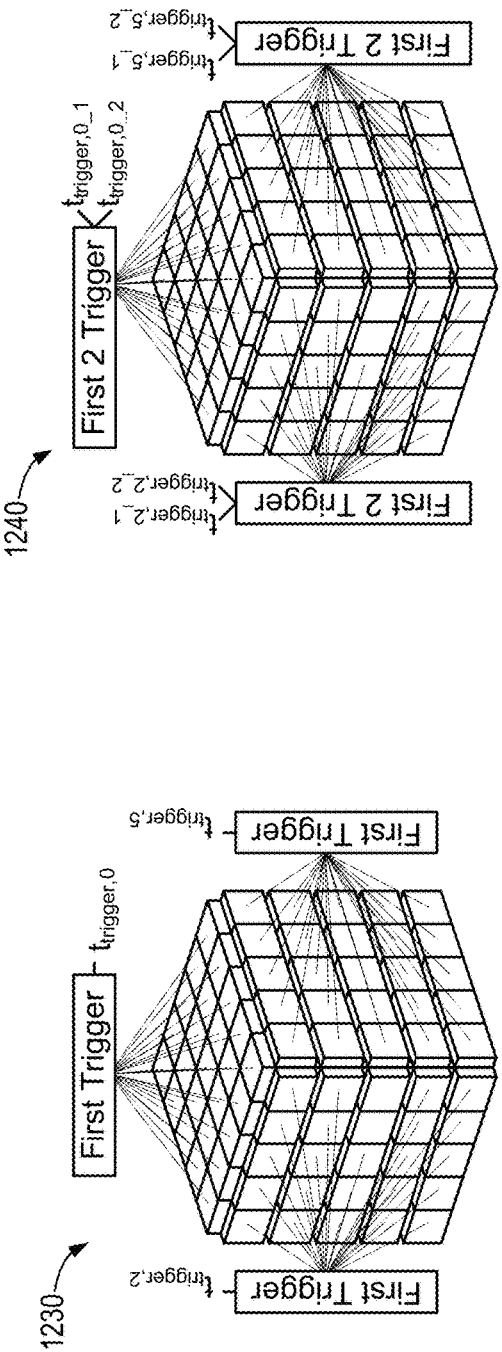
FIG. 12A
FIG. 12B
FIG. 12C
FIG. 12D

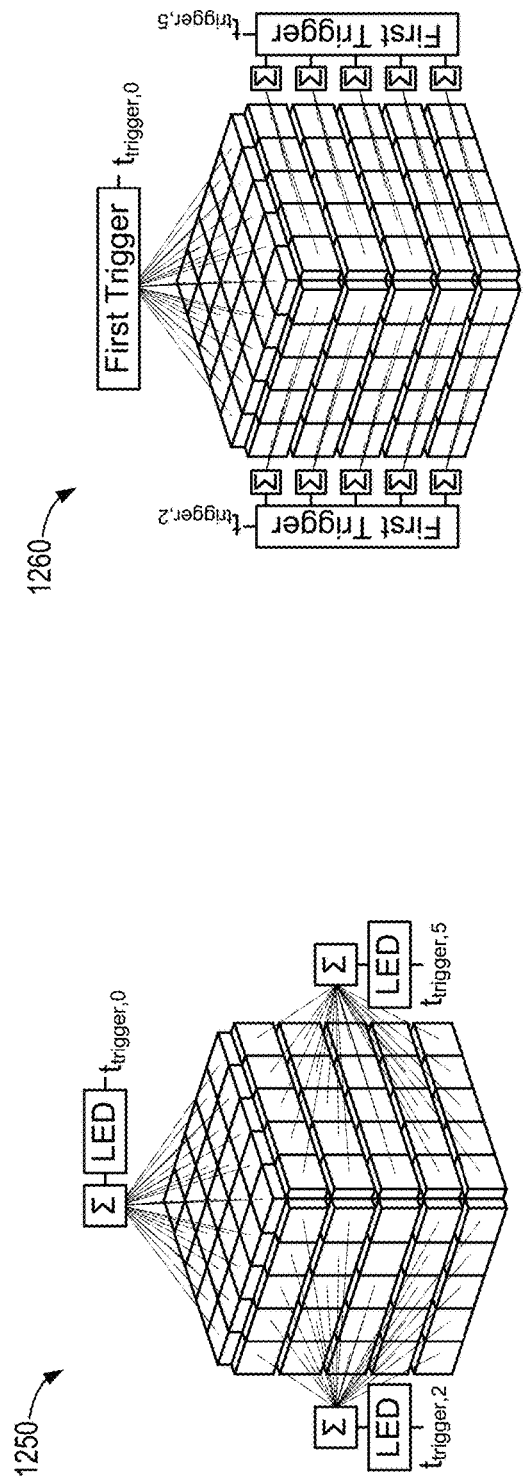
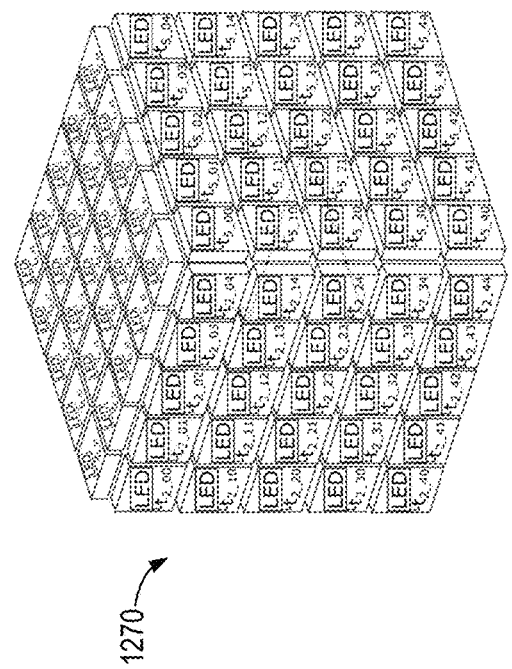
FIG. 12F
FIG. 12E
FIG. 12G

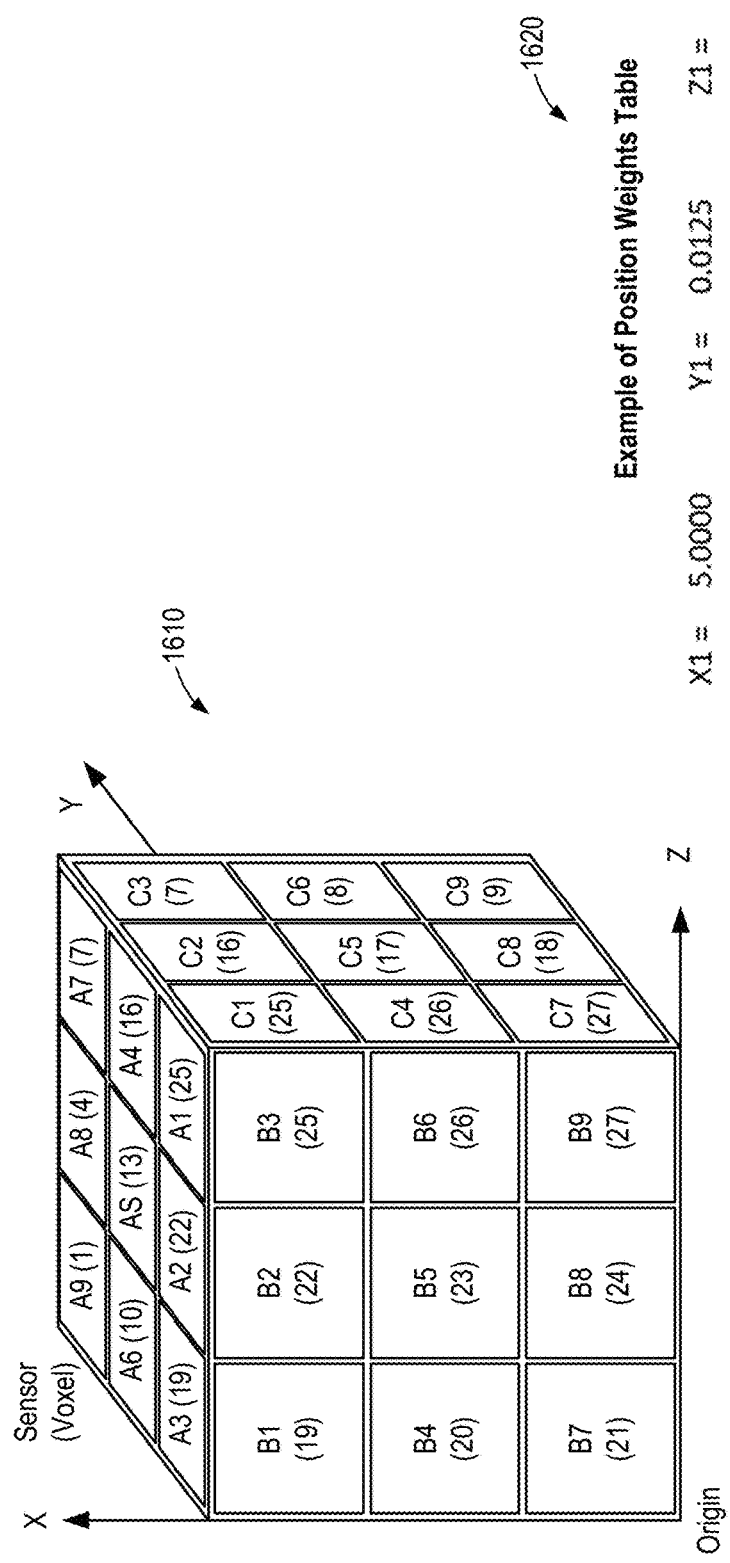

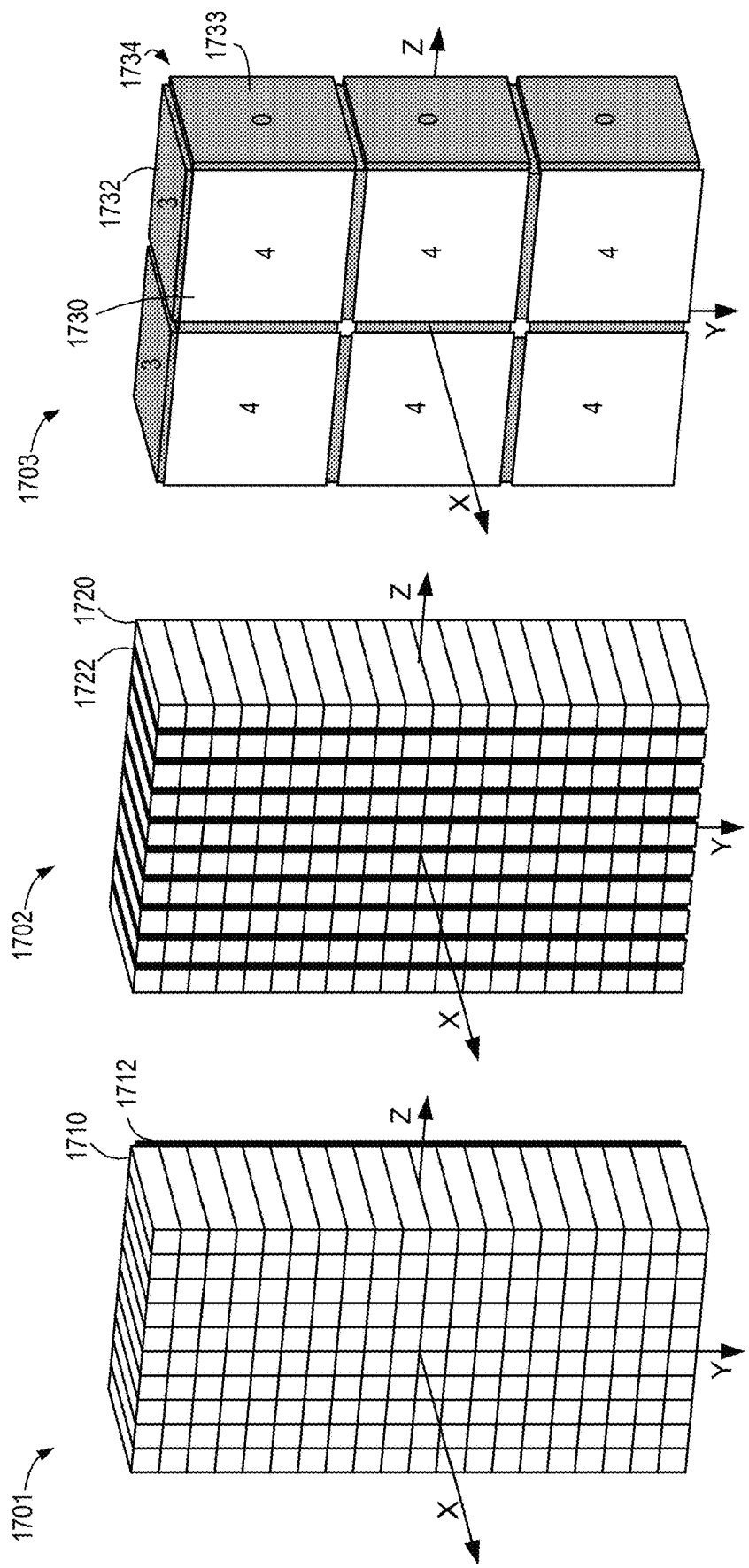

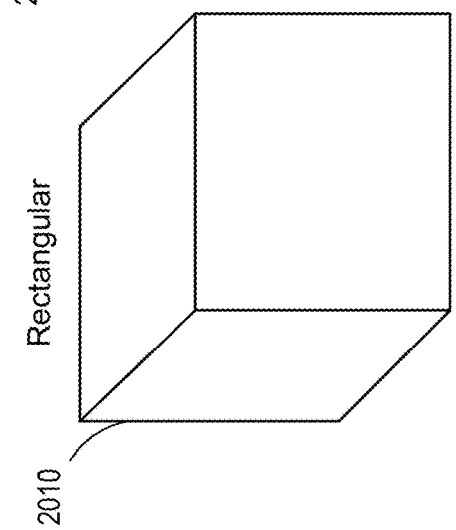
FIG. 21A
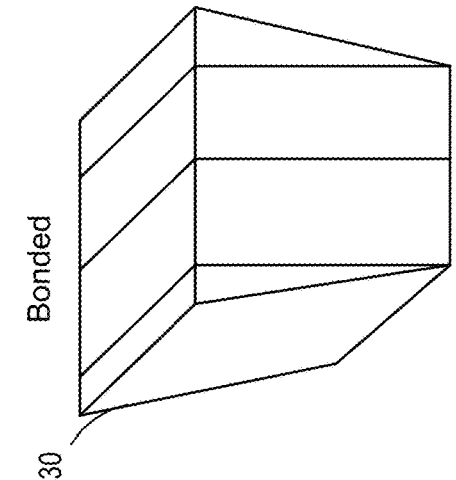
FIG. 20
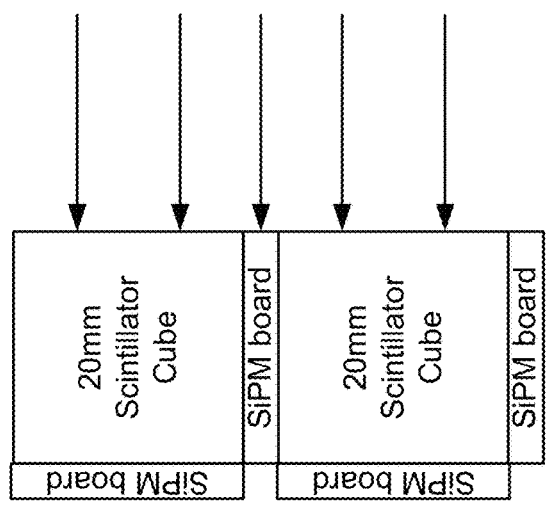
FIG. 21B
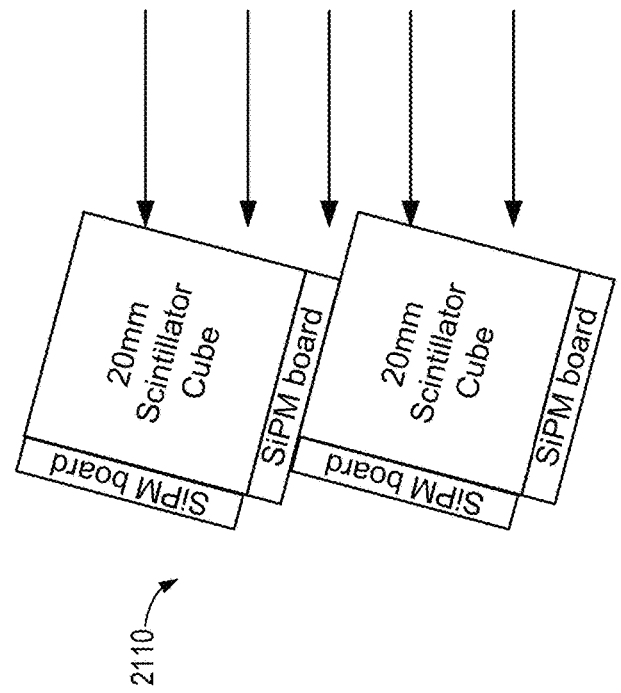

SCINTILLATOR DETECTORS AND METHODS FOR POSITRON EMISSION TOMOGRAPHY

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119 (e) for provisional patent applications, for any and all parent, grandparent, great-grandparent, etc., applications of the Priority Application(s)). In addition, the present application is related to the "Related Applications," if any, listed below.

PRIORITY APPLICATIONS

This application claims priority to and benefit under 35 U.S.C. § 119 to U.S. Provisional Patent Application No. 63/588,258, filed on Oct. 5, 2023, entitled "Scintillator Detectors and Methods for Positron Emission Tomography," which is hereby incorporated by reference in its entirety.

RELATED APPLICATIONS AND PUBLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. §§ 119, 120, 121, or 365 (c), and any and all parent, grandparent, great-grandparent, etc., applications of such applications are also incorporated by reference, including any priority claims made in those applications and any material incorporated by reference, to the extent such subject matter is not inconsistent herewith.

BACKGROUND

This disclosure relates to gamma radiation measurements, circuits for scintillation detection, and coincidence circuit arrangements. Previous approaches to gamma radiation detection have typically involved the use of scintillation crystals arranged in various configurations to detect and measure gamma photons (referred to interchangeably with gamma-ray). These configurations have included single-crystal detectors, as well as arrays of scintillation crystals positioned in different orientations to optimize detection efficiency and spatial resolution. In some cases, photodetectors have been coupled to the scintillation crystals to convert the scintillation light into electrical signals for further processing. However, these conventional configurations have often been limited in their ability to accurately detect and localize gamma radiation events due to factors such as crystal size, positioning, and light collection efficiency.

Some configurations of gamma radiation detector modules maximize detection efficiency by increasing the volume of scintillation crystals and photodetectors. Other configurations of gamma radiation detector modules reduce system complexity with simple detector layouts and signal processing circuitry. However, these approaches result in trade-offs between detection performance and practical implementation, highlighting the need for more comprehensive, efficient, and application-specific solutions.

The system, methods, practical applications, and uses of the embodiments described in this disclosure can be understood in the context of the following publications, each of which is hereby incorporated by reference in its entirety: Schaart DR. Physics and technology of time-of-flight PET detectors. Phys Med Biol. 2021 Apr. 21; 66 (9); E. Berg and S. Cherry, "Innovations in instrumentation for positron emission tomography," Seminars in nuclear medicine, vol. 48, no. 4, pp. 311-331, 2018; S. R. Cherry and M. Dahlbom, PET: Physics, Instrumentation, and Scanners, 2006; J. S. Reddin, J. S. Scheuermann, D. Bharkhada, A. M. Smith, M. Casey, M. Conti and J. S. Karp, "Performance evaluation of the SiPM-based Siemens Biograph Vision PET/CT system," in IEEE Nuclear Science Symposium and Medical Imaging Conference Proceedings (NSS/MIC), Sydney, 2018; G. F. Knoll, Radiation Detection and Measurement, Hoboken: John Wiley & Sons, Inc., 2000; S. Gundacker, E. Auffray, N. D. Vara, B. Frisch, H. Hillemanns, P. Jarron, B. Lang, T. Meyer, S. Mosquera-Vazquez, E. Vauthey and P. Lecoq, "SiPM time resolution: From single photon to saturation," Nuclear Instruments and Methods in Physics Research Section A: Accelerators, Spectrometers, Detectors and Associated Equipment, vol. 718, pp. 569-572, 2013; M. Conti, "Focus on time-of-flight PET: the benefits of improved time," European Journal of Nuclear Medicine Molecular Imaging, vol. 38, p. 1147-1157, 2011; S. Strother, M. Casey and E. Hoffman, "Measuring PET scanner sensitivity: relating count rates to image signal-to-noise ratios using noise equivalent counts," IEEE Trans Nuclear Science, vol. 37, pp. 783-788, 1990; and Saint Gobain, "LYSO Scintillation Crystals," June 2018. [Online]. Available: https://www.crystals.saint-gobain.com/radiation-detection-scintillators/crystal-scintillators/lyso-scintillation-crystals.

BRIEF DESCRIPTION OF THE DRAWINGS

FIG. 8A illustrates an example of a detection ring of a PET scanner with a plurality of radial sectors, according to one embodiment.

FIG. 8B illustrates a larger view of the radial sector, according to one embodiment.

FIG. 8C illustrates the individual scintillation crystal of one of the modules of the radial sector of the detection ring of the PET scanner, according to one embodiment.

FIGS. 12A-12G illustrate examples of various photodetector configurations for determining a scintillation event timing signal for a scintillation crystal with photodetector arrays on multiple faces, according to one embodiment.

FIG. 16A illustrates a scintillator detector with three photosensing array faces, according to one embodiment.

FIG. 16B illustrates a table of example position weights, according to one embodiment.

FIG. 17A illustrates a detector module with a two-dimensional array of elongated scintillation crystals, according to one embodiment.

FIG. 17B illustrates a detector module with a two-dimensional array of elongated scintillation crystals, according to one embodiment.

FIG. 17C illustrates a detector module with an independent photodetector array positioned on more than one side of each scintillation crystal, according to one embodiment.

FIG. 20 illustrates examples of scintillation crystals with various possible geometries, according to various embodiments.

FIG. 21A illustrates aligned scintillation crystals that receive a gamma-ray substantially perpendicular to the inner end-face, according to one embodiment.

FIG. 21B illustrates scintillation crystals 1910 that are angled to reduce or eliminate the gap between the adjacent scintillation crystals 1910, according to one embodiment.

DETAILED DESCRIPTION

The embodiments of the systems and methods provided within this disclosure are not intended to limit the scope of the disclosure but are merely representative of possible embodiments. In addition, the steps of a method do not necessarily need to be executed in any specific order or even sequentially, nor do the steps need to be executed only once. Numerous specific details are set forth in the following description in conjunction with the figures. to provide a thorough understanding of the possible variations of the systems and methods. However, the disclosed concepts, systems, methods, apparatuses, etc., may be practiced without some or all the specific details. For clarity, technical material that is known in the technical fields related to this disclosure is not described in detail.

Positron emission tomography (PET) is a medical imaging scanning system incorporating a plurality of gamma radiation detector modules, which may be arranged in a multi-ring formation for the detection and subsequent image reconstruction of annihilating radiation-emitting material positioned within the scanner's field of view. Human medical imaging utilizing PET can be facilitated by intravenous injection of positron-based radiotracers with sufficient radioactive duration to enable PET scanning. Examples of such tracers include fluorine-18 labeled glucose compounds serving the purpose of identifying highly metabolic tumor activity. Upon a positron encountering an electron, an annihilation event occurs, emitting two opposing gamma photons approximately 180° apart, each possessing approximately 511 kilo-electron-volts (keV) of energy.

The extent of migration prior to a positron encountering a free electron is referred to as the positron range. Depending upon the positron's initial kinetic energy and the density of electrons within the medium, the in-vivo range is typically less than one millimeter for fluorine-18-based radiotracers. The kinetic energy of the positron also results in an undesirable non-collinearity effect whereby the annihilation's gamma photons traverse slightly more or less from 180°, resulting in an imaging error of approximately 1.8 millimeters for common scanner bore sizes. The positron range and errors resulting from non-collinearity limit some PET imaging resolutions to approximately 2 mm for whole-body human imaging.

Figure 1:
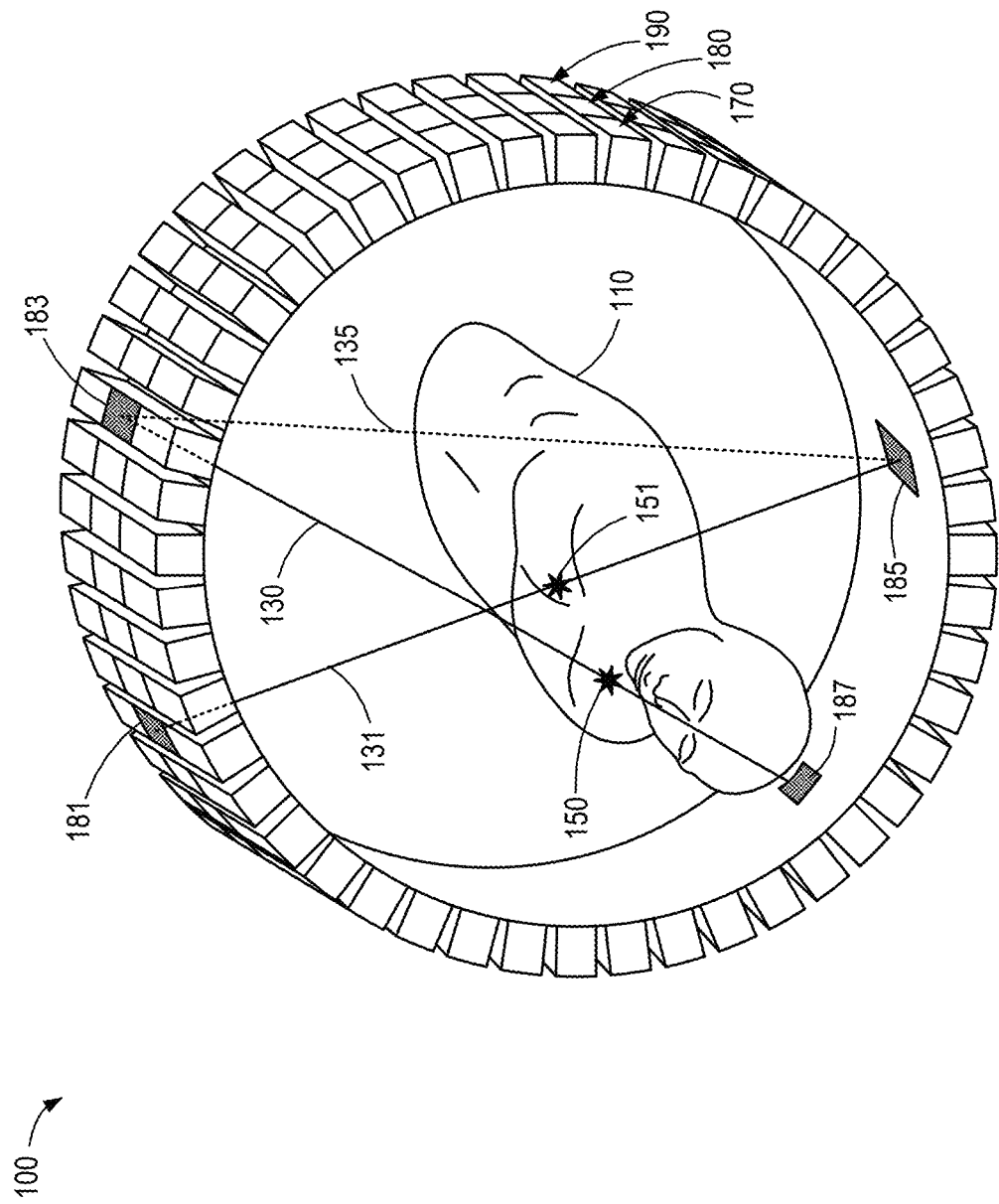
FIG. 1 illustrates a perspective view of a block diagram of a portion of a positron emission tomography (PET) detector system, according to one embodiment.

FIG. 1 illustrates a perspective view of a PET detector system 100 and positron sources 150 and 151 within a patient 110 (illustrated as a human torso), according to one embodiment. In the illustrated embodiment, the PET detector system 100 includes three rings of gamma radiation detector modules. The first ring 170 of gamma radiation detector modules is closest to the viewer, the second ring 180 of gamma radiation detector modules is in the middle, and the third ring 190 of gamma radiation detector modules is farthest from the viewer. In the illustrated example, each ring 170, 180, and 190 includes forty-eight gamma radiation detector modules. The number of detector modules and the number of rings of detector modules may vary based on a particular application, cost considerations, target size, target resolution, etc.

The positron sources 150 and 151 represent boluses of positron activity that result in annihilation radiation in which two opposing gamma photons are emitted in opposite directions. The opposing gamma photons emitted by the positron source 150 are detected by detector modules 183 and 187. A processor or other circuitry can use the known detector location and measured arrival times of the gamma photons detected by detector modules 183 and 187 to compute the line-of-response (LoR) 130 and determine the location of the positron source 150. The processor or other circuitry may identify a detected gamma photon as being a salient annihilation event based on the total detected energy being equal to or within a threshold range of the expected 511 keV.

The opposing gamma photons emitted by the positron source 151 are detected by detector modules 181 and 185. The processor or other circuitry can use the known detector location and measured arrival times of the gamma photons detected by detector modules 181 and 185 to compute the line-of-response 131 and determine the location of the positron source 151. As discussed in greater detail below, if the positron sources 150 and 151 emit their respective pairs of opposing gamma photons at the same time (or nearly the same time), there is a risk that the processor or other circuitry may erroneously compute a line-of-response 135.

Throughout this disclosure, the detector modules are described and illustrated that can be used in any shape that defines a volume with bounded lines of response. In many examples, detector modules are described as being used in a detector ring (e.g., a ring of detector modules). The scintillation crystals in each detector module have a distal end-face (inner end-face) that faces into the detector (e.g., into the ring, wherein the distal end-faces are located on the inner diameter of the ring) to receive a gamma photon. However, it is appreciated that a detector ring may include detector modules in the shape of a ring without forming a complete or full ring (e.g., with only the top and bottom detector modules in place). Moreover, a detector system may be embodied as two (or more) panels of detector modules that act in concert to detect annihilation events. For example, a detector system may include a first planar panel of detector modules and a second, opposing planar panel of detector modules. A subject may be positioned within a volume defined by the detector system, such as between the two opposing planar panels of detector modules.

As such, a detector module may include a plurality of scintillation crystals (e.g., in a one-dimensional or two-dimensional array) that have distal ends oriented into the detector (e.g., into the cavity or space between the opposing panels, such that the distal end-faces are located on the inner diameter of the ring). As such, the term "radial" as it is used to describe the orientation of a detector module, scintillator detector, or individual scintillation crystal, is used to broadly describe an orientation into a region to be scanned from which gamma rays are anticipated to originate (e.g., in the direction of the field of view of the scanner or other detector system). In the context of planar-aligned opposing panels of detector modules, radially oriented detector modules are oriented into the space between the opposing panels. In the context of a ring of detector modules (which may be faceted and not continuously curved), radially oriented detector modules may be oriented into the circular (or oval) volume encircled by the (faceted) ring. Tangential and transaxial directions are orthogonal to the radial direction and to each other.

Figure 2:
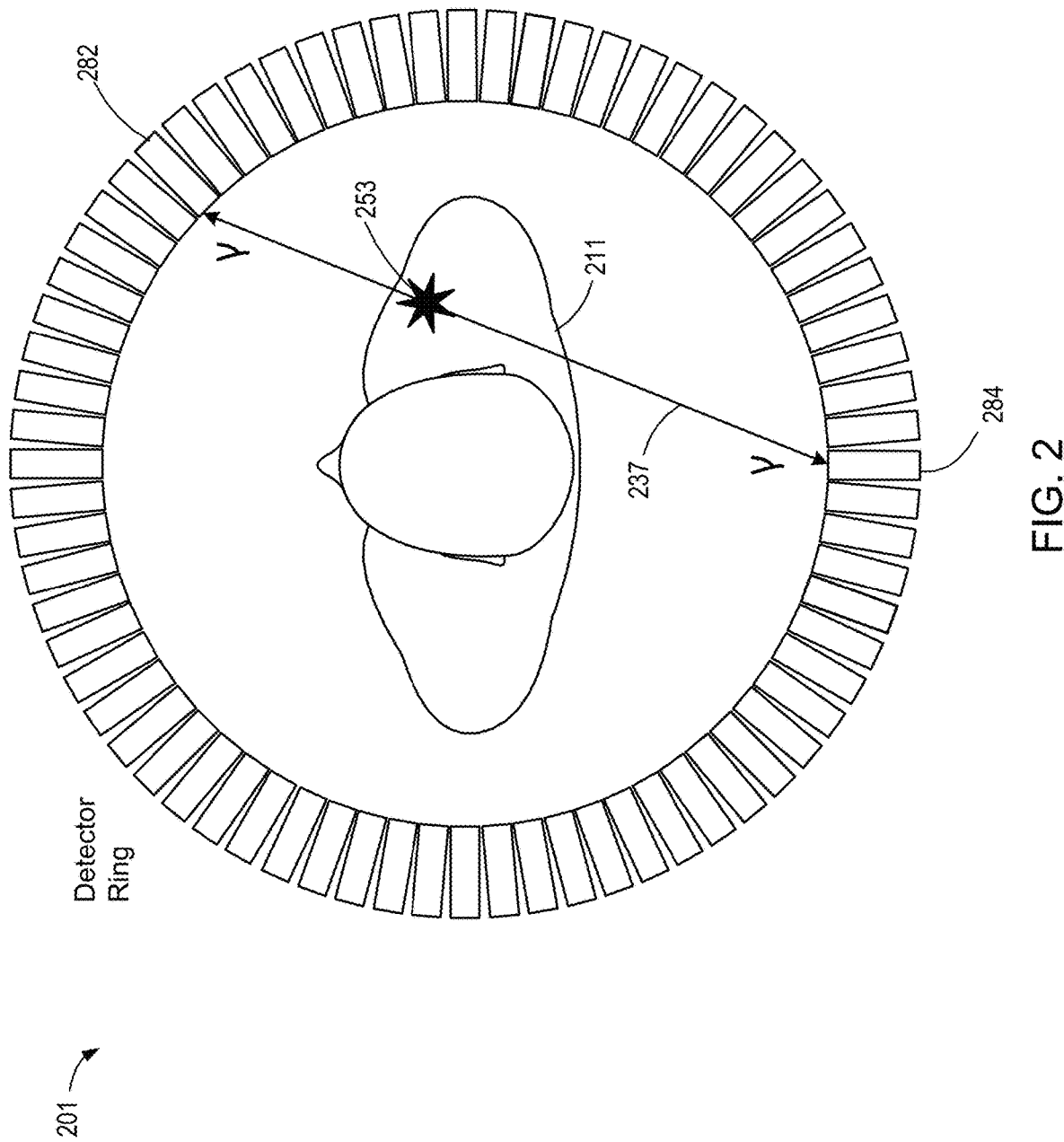
FIG. 2 illustrates another view of a block diagram of a portion of the PET detector system, according to one embodiment.

FIG. 2 illustrates a side view of another example of a PET detector system 201 and a positron source 253 within a human 211, according to one embodiment. In the illustrated embodiment, the PET detector system 201 includes a ring with seventy-two gamma radiation detector modules. The opposing gamma photons emitted by the positron source 253 are detected by detector modules 282 and 284. A processor or other circuitry can use the detector module locations and arrival times of the gamma photons detected by detector modules 282 and 284 to compute the line-of-response 237 and determine the location of the positron source 253.

Figure 3:
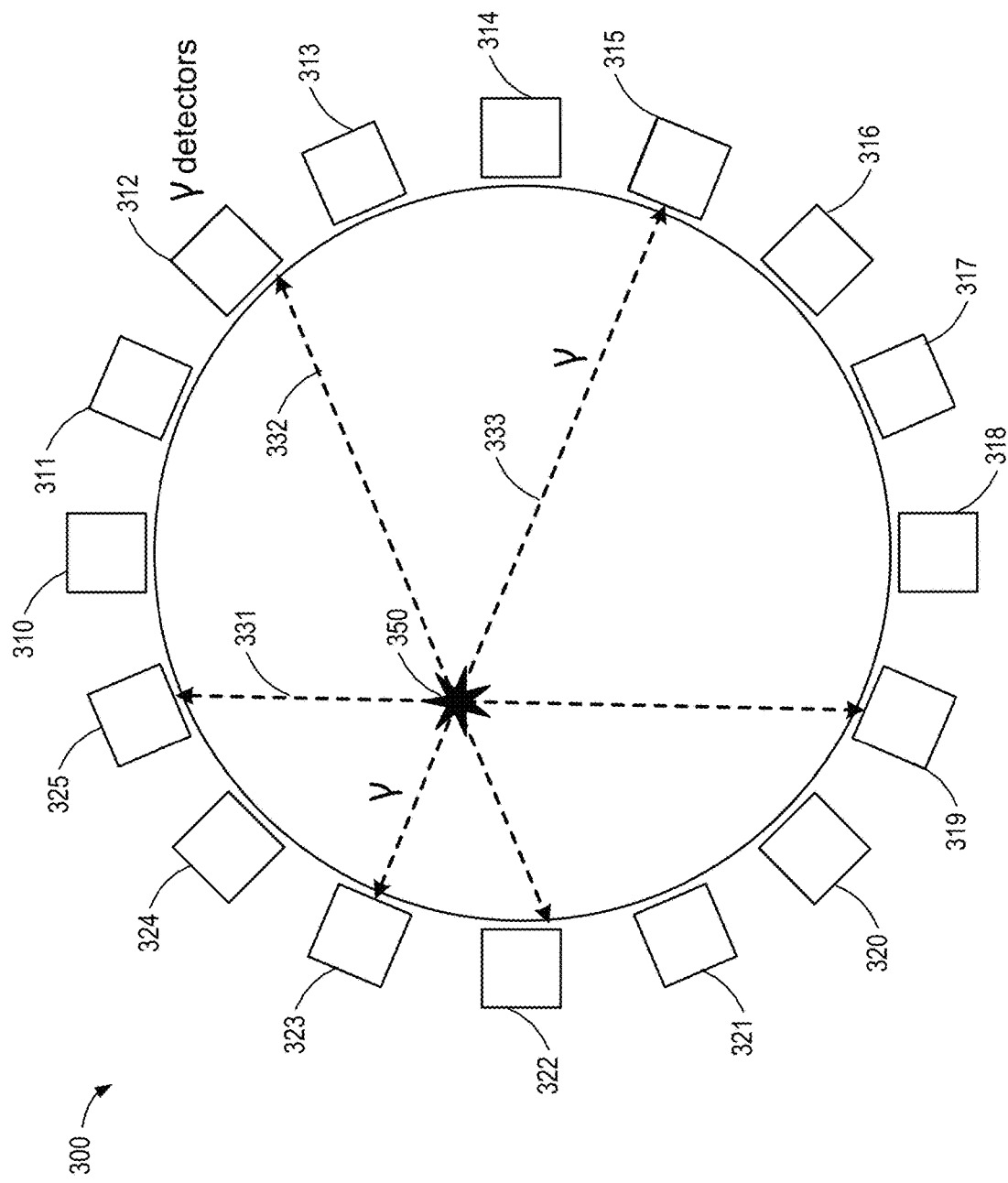
FIG. 3 illustrates a positron source with multiple lines-of-response, according to one embodiment.

FIG. 3 illustrates a block diagram of a PET detector system 300, according to one embodiment. The simplified block diagram includes a single ring of sixteen gamma radiation detector modules 310-325. Multiple lines-of-response 331, 332, and 333 are shown that intersect a bolus 350 of positron activity, according to one embodiment. Annihilation radiation from the bolus 350 of positron activity generates numerous emissions of equal and opposite gamma photons. The system 300 can determine a range for a positron's point of origin along the line-of-response 333 extending between its two detection points (e.g., within detector modules 323 and 315).

Additional lines-of-response 331 and 332 are computed during a measurement period in which subsequent annihilation events occur within the bolus 350. A period of time during which annihilation events are detected from the bolus 350 is referred to as a scan. The system 300 is used to capture a scan that provides multiple lines-of-response for localizing a positron matter's point or region of origin. A PET scanner (e.g., including or embodied as a PET detector system as described herein) may use the ring of detector modules 310-325 to develop images of varying concentrations and locations of positron material without the use of shielding collimators, such as those employed in single photon emission computed tomography (SPECT), which filter oblique angles of origin. In other embodiments, a PET scanner may utilize axial collimators, referred to as septa, between multiple detector rings to reduce scatter radiation originating from the field of view (e.g., within a human body). However, other PET scanners operate in "3D" mode, without septa, given faster scintillator detectors and advancements in electronic processing, which can handle larger event rates, leading to enhanced system sensitivity.

Annihilation radiation's dual gamma events are discriminated against (e.g., identified relative to) a multitude of other unrelated gamma events (generally referred to as "singles events") through the use of a time-based coincidence window. The coincidence window, which may be, for example, less than five nanoseconds (e.g., two nanoseconds), is used to filter singles events that could not have occurred from a corresponding single annihilation within the field of view, given the scanner's bore diameter (corresponding to the diameter of the ring of detector modules 310-325) and the propagation speed of gamma radiation. For example, for a PET scanner with detector modules in a ring with a diameter of 70 centimeters (e.g., a bore diameter of 70 centimeters), a positron annihilation in the center of the bore would necessitate approximately 1.167 nanoseconds for each gamma photon, traveling at the speed of light (29.98 centimeters per nanosecond), to arrive within a scintillator detector of one of the detector modules in the ring. The diameter may be, for example, between 20 and 800+ centimeters, and so the times may be shorter or longer. A positron annihilation located along the circumference of the bore would necessitate twice this amount of time for one of the gamma photons to scintillate into a detector module on the opposite side of the ring. As such, a coincidence window, along with select pairings of detector modules comprising only reasonable geometric lines-of-response, reduces uncorrelated gamma events from being otherwise recorded as coincident.

When two gamma events meet the criteria for being recorded as a singular coincident event (e.g., within the time window and detected by appropriate detector modules), such an event is referred to as a "prompt" event. Prompt events may still yet be comprised of two uncorrelated and independent gamma events originating from different annihilation events or other radiation sources, which are referred to as "random" coincident events. However, when two gamma detections authentically originate from a single positron annihilation, then such an event is referred to as a "true" coincident event. Hence, "true" coincident events occurring from bona fide positron annihilations are equated to the number of "prompt" coincident events (e.g., coincident events from an unknown source) less the number of "random" coincident events (coincidence events known or statistically determined to be random singles measured within the coincidence window).

In various embodiments, a PET scanner may further filter "scatter" events, which result when a gamma photon partially deposits its energy into a nearby material and then propagates its remaining energy into a detector module. Such scatter events are typically filtered since their point of origin is uncertain, given their possible deflection. Scatter events usually terminate in a detector with substantially less energy than their original 511 keV. Therefore, filtering may involve measuring the amount of energy deposited by a gamma event and rejecting such events that fall below a lower-level-discrimination (LLD) threshold. Additionally, upper-level-discrimination (ULD) may also be utilized to reject any near simultaneous accumulation of multiple events into a detector or the possibility of a single higher energy nuclear particle deposition. According to various embodiments, a PET scanner may utilize an LLD threshold value between 325 keV and 511 keV and a ULD threshold value between 511 keV and 675 KeV.

Some embodiments of gamma detector modules for PET scanners include inorganic scintillation crystals (e.g., Bismuth Germanate, $Bi_4Ge_3O_{12}$, referred to as BGO, or Lutetium Oxyorthosilicate, $Lu_2(SiO_4)O$, referred to as LSO, $Lu_{2(1-x-y)}Y_{2x}SiO_5$, referred to as LYSO, etc.) coupled to a photodetector or photodetector array.

As used herein, references to a "photosensor," "photodiode," and/or "photodetector" are not meant to be restrictive or exclusive to any particular embodiment unless explicitly stated otherwise. For example, a photodetector array may include an array of semiconductor-based PIN photodiodes, avalanche photodiodes (APD), or single-photon-avalanche-photodiode (SPAD). In various embodiments, a photodetector array may include an array of SPADs and be referred to as a silicon photomultiplier (SiPM). An SiPM produces a signal proportional to light intensity resulting from the corresponding number of triggered SPAD cells. In this manner, the SiPM behaves as an analog photon counter whereby each individually triggered SPAD contributes to the total photocurrent output of the sensor and results in a much higher gain than that of a single APD or a PIN photodiode. SiPM photosensors may include tens, hundreds, or even thousands of single-photon avalanche photodiodes per square millimeter on a single silicon substrate. Silicon photomultipliers may be used where timing resolution and photonic dynamic range are both required, desired, and/or otherwise determined to be useful in a specific application or use case.

Figure 4:
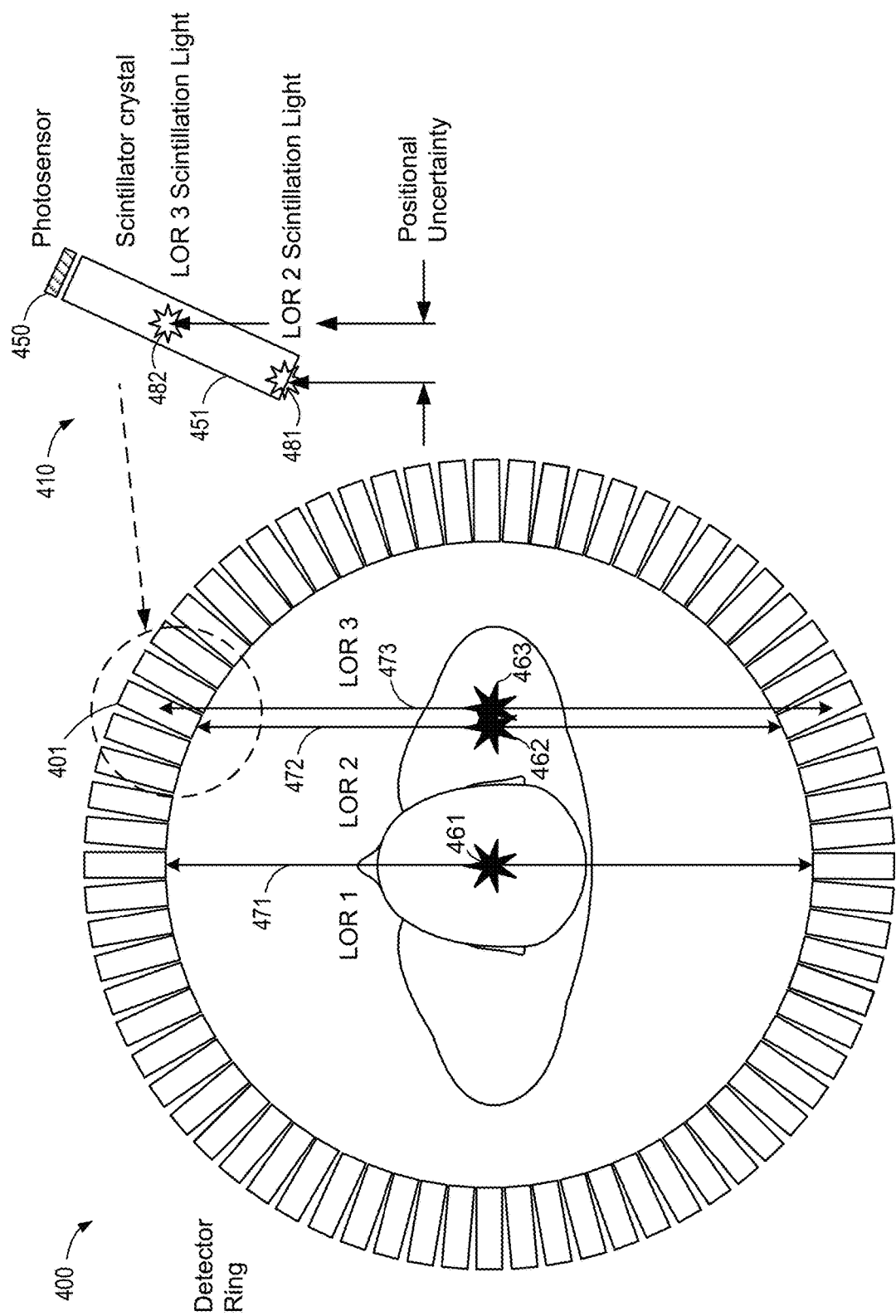
FIG. 4 is a block diagram of a ring of detector modules with multiple lines-of-response, according to one embodiment.

FIG. 4 is a block diagram of PET scanner 400 with a ring of detector modules 401 and multiple lines-of-response 471, 472, and 473, according to one embodiment. A positron annihilation 461 from the center of the ring results in the line-of-response 471 that orthogonally impacts the end-face of the elongated scintillation crystal of a pair of detector modules. Positron annihilations that occur off-center, such as positron annihilations 462 and 463, result in gamma photons that impinge upon scintillator detectors at an oblique angle, resulting in a parallax effect. As shown in the exploded view of an elongated scintillation crystal 410 of a detector module 401 (in the upper right corner of the drawing), two gamma events 481 and 482 scintillate within the same elongated scintillation crystal 410 yet originate from separate locations (at positron annihilations 462 and 463, respectively) within a patient body. An end-face photosensor 450 on the proximal end-face of the elongated scintillation crystal 410 detects the scintillation photons generated by the elongated scintillation crystal 410 in response to the received gamma photon.

The true lines-of-response 472 and 473 for the annihilation events 462 and 463 are illustrated. However, these two gamma scintillation events 481 and 482 within the same crystal 410 may be processed such that the two different positron annihilation events 462 and 463 are detected as originating from the same position, thus resulting in imaging errors. Such a parallax effect results in geometric uncertainty, including the further possibility for a random event given that some embodiments of detector module 401 cannot discern between an event normal to the face of an elongated scintillation crystal 451 versus that arising from a severe oblique angle. The position of the end-face photosensor 450 on the proximal end-face of the elongated scintillation crystal 451 allows the end-face photosensor 450 to detect scintillation photons generated within the elongated scintillation crystal 451 but without the ability to determine a depth-of-interaction. For example, the end-face photosensor 450 does not distinguish between scintillation events 481 and 482.

Figure 5:
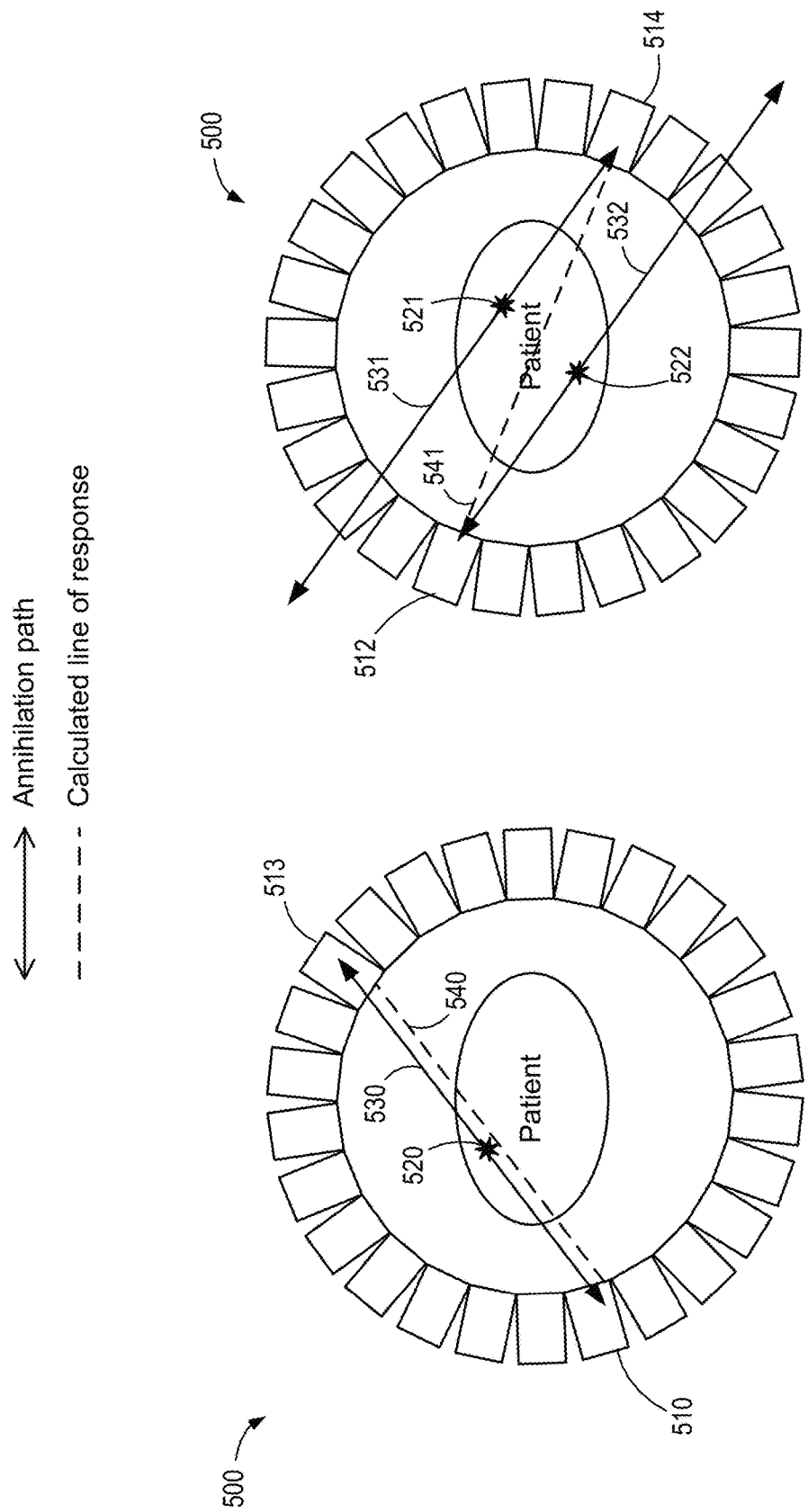
FIG. 5A illustrates a block diagram of a ring of detector modules with a single off-center line-of-response (LoR), according to one embodiment.
FIG. 5B illustrates a block diagram of the ring of detector modules with multiple off-center lines-of-response, according to one embodiment.

FIG. 5A illustrates a block diagram of ring 500 of detector modules, including detector modules 510 and 513, with a single off-center line-of-response 530 from a single annihilation event 520, according to one embodiment. Scintillation events within the detector modules 510 and 513 are used to calculate a line-of-response 540 (a "calculated line-of-response) that corresponds to the true line-of-response 530 but is offset by a parallax error, as described herein. Nevertheless, the detection of scintillation events within detector modules 510 and 513 are representative of a "true" coincidence event, having a pair of detected gamma photons that originated from single annihilation 520.

FIG. 5B illustrates the ring 500 of detector modules with two off-center lines-of-response 531 and 532 based on multiple annihilation events 521 and 522, according to one embodiment. In the illustrated example, the annihilation event 522 produces opposing gamma photons whereby one gamma photon is absorbed and detected by detector module 512 while the opposite corresponding gamma photon escapes the detector ring by virtue of its trajectory outside the ring. Similarly, annihilation event 521 produces opposing gamma photons; however, only one of the gamma photons from the annihilation event 521 is detected (e.g., by detector module 514). If a pair of disassociated scintillation photons from the gamma photons generated by the annihilation events 521 and 522 are detected by detector modules 512 and 514 simultaneously or within a few nanoseconds of each other, the PET scanner may erroneously calculate an artefactual line-of-response 541 referred to as a "random" event. That is, the PET scanner may erroneously estimate that the gamma photon detected by detector module 512 and the gamma photon detected by detector module 514 originate from the same annihilation event. The resulting line-of-response calculated by the PET scanner is "artefactual" in that the calculated line-of-response does not correspond with a true or authentic line-of-response, wherein the coincident prompt is actually a random event instead of a true coincident event.

Figure 6:
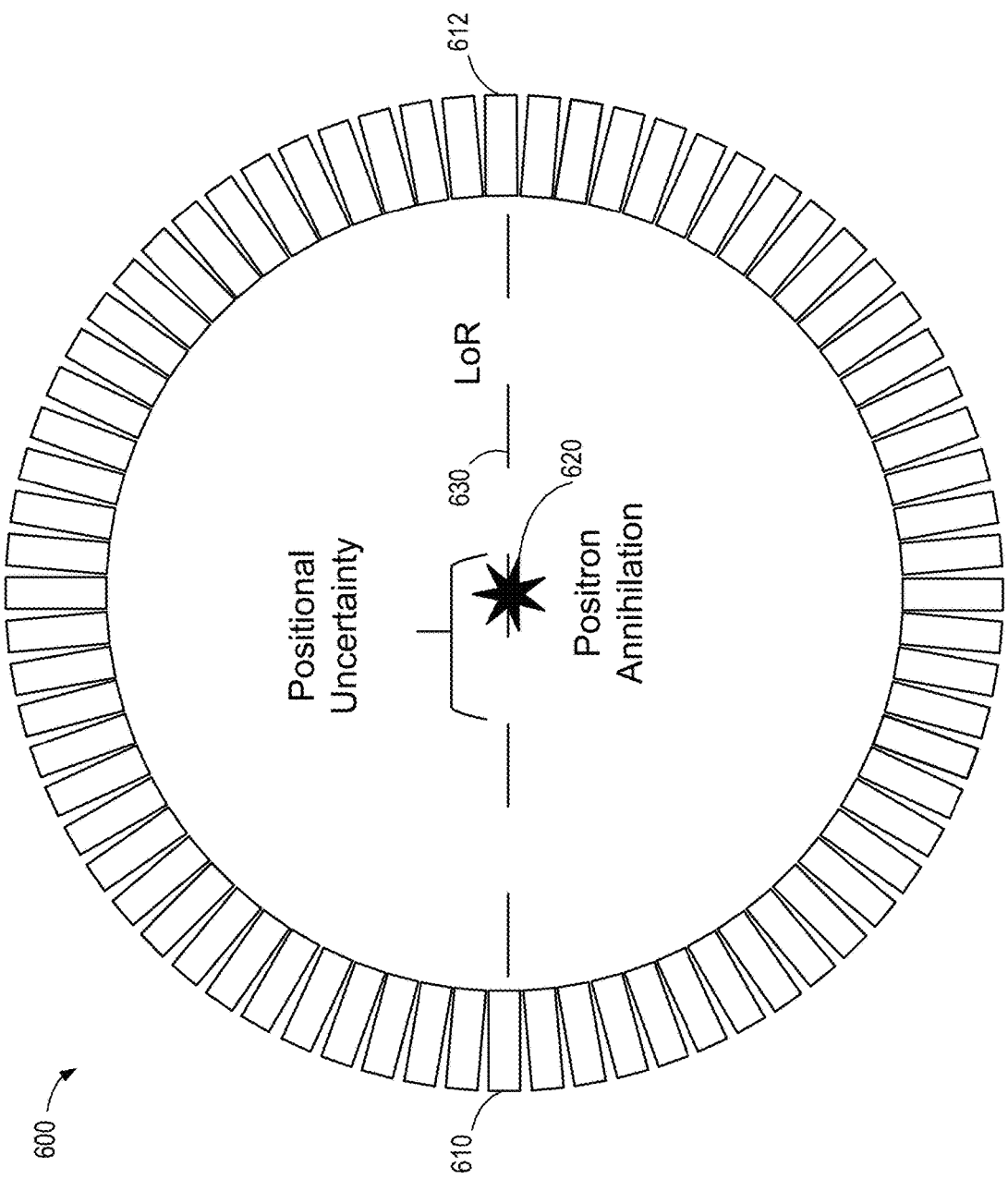
FIG. 6 illustrates a line-of-response segmented for its time and space relationship, according to one embodiment.

FIG. 6 illustrates a ring 600 of detector modules with a line-of-response 630 segmented for its time and space relationship, according to one embodiment. The line-of-response 630 corresponds to a positron annihilation 620 detected by opposing detector modules 610 and 612. According to various embodiments described herein, improved photosensor technology, configuration, placement, and/or the high-speed electronics described herein may facilitate improved measurements of the difference in the time of arrival between two detected gamma photons. Such methodology, referred to in the art as time-of-flight (ToF), enhances the ability to compute the point of origin of the positron annihilation 620 along the line-of-response 630.

For example, a 500-picosecond timing resolution enables the localization of the origin of the positron annihilation 620 along the line-of-response 630 to within about +/−7.5 centimeters, segmenting a scanner's 70-centimeter field of view, for example, into 4.68 sections (or more than +9 sections) for each line-of-response. Improvements in the localization of annihilation events reduce uncertainty, or noise, in image reconstruction, thereby improving the scanner's signal-to-noise ratio. This increase in signal-to-noise is essentially realized as an increase in sensitivity, compared to non-ToF scanners, wherein the realized sensitivity gain is proportional to the square of the signal-to-noise improvement. According to various embodiments, a PET scanner may have a timing resolution of approximately 210 picoseconds.

Various embodiments of the presently described systems and methods facilitate more accurate and precise PET data acquisition. Examples of systems and methods are described herein that reduce, and therefore improve, coincidence time resolution (CTR); improve depth of interaction resolution in the radial direction; improve position accuracy, especially in the tangential and axial directions; improve energy resolution; allow for the use of thicker SiPMs; improve position delineation for a line-of-response for a given positron annihilation event and to reduce parallax error; increase sensitivity to afford better image clarity, reduce scan duration, and/or reduce radiation imaging; and/or a combination thereof.

Specific embodiments of this disclosure include a gamma radiation detector module with an array of scintillation crystals positioned on a detector ring with axial, tangential, and radial axes. Each scintillation crystal includes an inner end-face that is radially oriented inward to receive gamma photons and an outer end-face radially oriented outward, opposite the inner end-face. In various examples, each scintillation crystal has opposing first and second lateral faces, which are axially oriented, and opposing third and fourth lateral faces, which are tangentially oriented. A set of photodetector arrays detects scintillation photons. In various examples, one photodetector array is positioned on the outer end-face and another on one of the lateral faces. Reflective material is applied to the surfaces of the scintillation crystal that do not contain a photodetector array to internally reflect scintillation photons. In some embodiments, at least one of the axially oriented or tangentially oriented faces does not have a photodetector array and instead includes reflective material. Reflective material may include, for example, an enhanced specular reflector (ESR) material, a specular or diffuse reflector material, or a retroreflective material. In some examples, the reflective material may be Teflon. In some embodiments, the reflective material is a thermally conductive reflective material comprising materials such as, but not limited to, one or more of aluminum, magnesium, silver, stainless steel, and/or combinations thereof.

In various examples, the scintillation crystal is a cuboid, such that the first photodetector array is orthogonal to the second. In other embodiments, each scintillation crystal may be non-cuboid, have sides that are not 90 degrees with respect to one another, include more (or fewer) than six sides, or otherwise deviate from standard cuboid shapes. The presently described systems and methods can be adjusted to compensate for deviations from standard six-sided cuboid scintillation crystals. In various embodiments, a first photodetector array is positioned on one face of a scintillation crystal and a second photodetector array is positioned on another face of a scintillation crystal, such that the two photodetector arrays are nonparallel with respect to one another.

In various examples, each photodetector array comprises multiple silicon photomultipliers (SiPMs). In various examples, the reflective material is positioned on at least the inner end-face, and the second photodetector array may be placed on either the axially or tangentially oriented lateral faces. In some configurations, the detector module includes a third photodetector array positioned on another lateral face, resulting in photodetector arrays orthogonal to each other, with further potential for a fourth photodetector array and/or a fifth photodetector array.

A monolithic scintillator or monolithic scintillation crystal may include a block or blocks of scintillating material with an unsegmented optical clarity larger than a spatial detection pitch. For example, a monolithic scintillator may include a single block of material that allows photon interactions to occur uniformly throughout its volume. The monolithic scintillator may be a continuous or functionally continuous block of scintillating material. The monolithic scintillator may be fabricated from a single piece of scintillating material. In other embodiments, a monolithic scintillator may be fabricated from multiple pieces of scintillating material that are substantially identical and bonded together to preserve the optical and physical properties, thereby behaving as a single, continuous scintillator.

In other embodiments, a monolithic scintillator or monolithic scintillation crystal may include a block of scintillating material in which photon interactions occur nonuniformly throughout the volume. The approaches, calculations, and estimates described herein can be adjusted based on a known, non-uniform photon interaction response of the volume. In some embodiments, a monolithic block may comprise two different scintillator materials, different dopants within different regions of the block, quantum dots, impurities, or other non-uniform characteristics or materials. In such embodiments, the monolithic scintillator may still exhibit an unsegmented optical clarity larger than a spatial detection pitch.

The terms "monolithic scintillation crystal" and "monolithic scintillator" are used interchangeably herein to refer to a functionally continuous volume of scintillating material, regardless of whether it is a single piece of material or multiple pieces of material joined or bonded together. In some instances, a "monolithic scintillator" is referred to as a "scintillator" for simplicity, as can be contextually understood. The precise localization of photon interaction points within a monolithic scintillator can be performed by analyzing the distribution of scintillation light over a photodetector array.

In contrast, a pixelated scintillator includes an array of discrete scintillating crystals, each individually segmented and typically separated by reflective or absorptive material. In a pixelated scintillator, each crystal acts as an independent detection element, thereby simplifying photon localization but limiting spatial resolution to the predefined pixel size. The absence of internal segmentation in monolithic scintillators allows for higher spatial resolution and more flexible interaction position encoding, although it generally includes more complex signal processing compared to the inherently localized signals in pixelated scintillators.

Pixelated scintillator elements typically feature a high aspect ratio, where the dimension in one direction ($W_x$) is greater than in the other directions ($W_y$ and $W_z$) (e.g., at least two times greater). An example of a pixelated configuration includes scintillation crystals with dimensions $W_x \times W_y \times W_z = 20$ mm×3 mm×3 mm (180 mm$^3$), emphasizing the elongated depth compared to the lateral dimensions. In contrast, monolithic scintillators generally have a smaller aspect ratio, with dimensions similar between $W_x$, $W_y$, $W_z$. For example, a monolithic scintillator may have dimensions $W_x \times W_y \times W_z = 20$ mm×32 mm×32 mm (20,480 mm$^3$), 20 mm×20 mm×20 mm (8,000 mm$^3$), 20 mm×16 mm×16 mm (5,120 mm$^3$), or 15 mm×16 mm×16 mm (3,840 mm$^3$). Additionally, pixelated scintillators are generally smaller in total volume (e.g., often less than 500 mm$^3$). In contrast, monolithic scintillators may have a total volume of at least 500 mm$^3$ (e.g., total volumes of at least 1,000 mm$^3$, 2,000 mm$^3$, or volumes up to or exceeding 25,000 mm$^3$). Some pixilated scintillators may have slightly large volumes but are still characterized as having an elongated shape with one dimension being at least two times larger than the other dimensions. The example monolithic scintillator dimensions are examples of monolithic scintillators in which no one dimension is less than 75% of any other dimension.

In various examples, each scintillation crystal is associated with or otherwise includes a processing circuit. The processing circuit may include an electronic readout channel for each photodetector array. The term "scintillator detector" is used herein to refer to a scintillation crystal, photodetector arrays positioned on one or more faces of the scintillation crystal, and/or any processing circuitry or readout electronics associated with the photodetector arrays. For example, a scintillator detector with three photodetector arrays positioned on three faces of the scintillation crystal may include three electronic readout channels. The processing circuit may include, for example, one or more timing discriminator circuits (e.g., one or more leading-edge discriminator circuits), time-to-digital converters (TDCs), energy measurement circuits, and additional components such as a position module for accurate calculation of scintillation event locations. The processing circuit may comprise one or more boards, which may be flexible or rigid, that are, for example, local to the photodetectors or combining multiple sides of multiple boards. The processing circuit may include time correction modules and may use position information to correct estimated, measured, and/or calculated times. For example, the circuit can adjust timing signals for amplitude time walks to improve detection accuracy, and it is capable of identifying errors in photodetector arrays through diagnostic functions.

Furthermore, in various examples, the processing circuit calculates the total energy of a scintillation event based on signals from all photodetector arrays and ensures precise timing signals via distinct readout channels. This design may optimize the detection and processing of scintillation events, ensuring accurate energy measurements and location determination within the gamma radiation detector module.

The detector performance in a PET scanner significantly affects the image quality attainable by the PET scanner. A useful figure of merit (FOM) for a time-of-flight PET scanner (TOF-PET) can be expressed as:

$$FOM_{det} = \frac{S_{eff}}{\$} = \frac{SNR^2}{\$} = \eta_{det}^2 \frac{\eta_{geom}}{\$} \frac{D}{CTR}$$

where:
$S_{eff}$=Effective sensitivity of a TOF-PET system,
SNR=Signal to Noise Ratio. In clinical PET studies the lesion signal-to-noise ratio can be calculated as the difference between the lesion signal and background signal compared to the noise (standard deviation $\sigma$) in the background. Another metric is contrast to noise ratio:

$$CNR = \frac{\text{Signal} - \text{Background}}{\sigma}.$$

CNR is used in the following instead of SNR as FOM, $S_{eff} \sim CNR^2$,
$\eta_{det}$=detection efficiency of the detectors for 511 keV photons,
$\eta_{geom}$=the system geometrical efficiency (solid angle subtended by the PET rings),
$\$$=total cost of the detector,
CTR=Coincidence time resolution of the detector, and
D=diameter of the imaged subject.
The coincidence time resolution (CTR) is a measure of a PET system's time accuracy of the detection of two gamma-rays that are emitted in opposite directions from a positron annihilation event in a PET scanner. The CTR is calculated as the full-width-at-half-maximum (FWHM) of the distribution of time differences between the detected gamma-rays for coincidence events (e.g., from a central point source or as deviations from nominal time differences). The CTR reflects the accuracy of the time measurement and, thus, the temporal spatial resolution of a TOF-PET system. A low CTR means that the PET scanner can more accurately detect the time difference between the gamma-ray pairs, resulting in a high temporal spatial resolution. The typical CTR for modern PET systems is in the range of 200-500 picoseconds FWHM. Some commercial PET systems show a CTR of 210 picoseconds (ps) utilizing LSO scintillators with approximately 3.2×3.2×20 mm dimensions, wherein SiPM photosensors are coupled to the outward radial end of the scintillator. The figure of merit equation highlights system design tradeoffs. For example, significantly reducing the scintillator length can improve the CTR but will conversely reduce $\eta_{det}$, with a potential overall negative impact on the $FOM_{det}$.

Figures 7A, 7B:
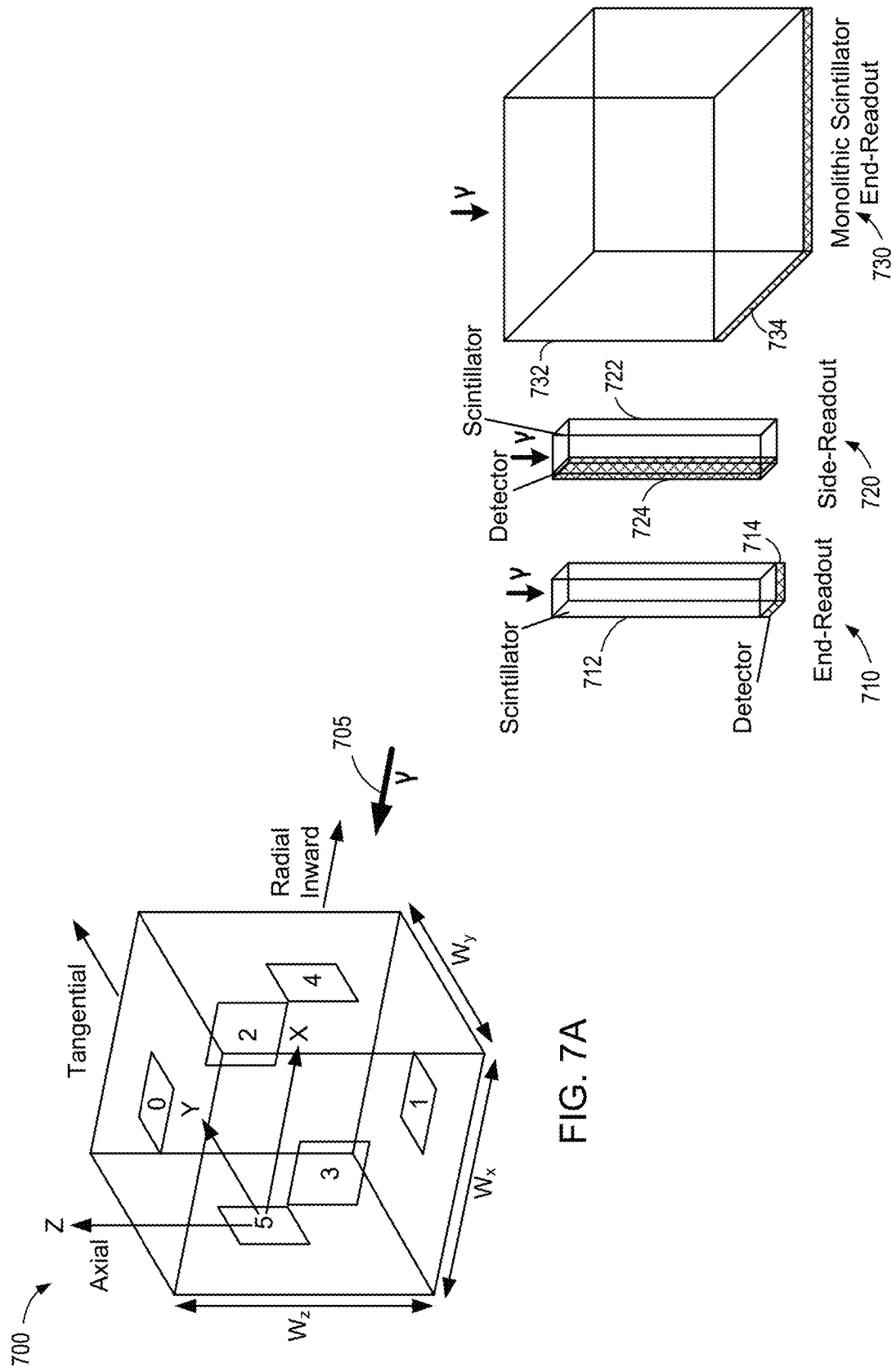
FIG. 7A shows a coordinate system used with respect to a scintillator detector geometry, according to one embodiment.
FIG. 7B illustrates simplified block diagrams of various scintillator detector readout configurations, according to various embodiments.

FIG. 7A illustrates a scintillation crystal 700 with an overlaid coordinate system and face numbering, according to one embodiment. The scintillator dimensions are expressible as $W_x \times W_y \times W_z$, which correspond to the x, y, and z axes, respectively. Each scintillator face is labeled with a number from 0-5. In the illustrated example, the x-axis corresponds to a radial axis oriented into a detector ring, the y-axis corresponds to a tangential axis or (transaxial axis) tangent to the detector ring, and the z-axis corresponds to the axial axis extending along the axis of the detector ring.

The direction of the gamma-ray photon 705 is modeled in the negative x-direction relative to the numbered faces or "sides" 0-5 of the scintillation crystal 700. The inner end-face (labeled as face "4") is radially oriented into a detector ring to receive the gamma-ray photon 705. The outer end-face (labeled as face "5") is opposite the inner-end-face 4 and is radially oriented outward relative to the detector ring. Opposing lateral faces labeled "1" and "0" are axially oriented with respect to the detector ring, and opposing lateral faces labeled "2" and "3" are tangentially oriented with respect to the detector ring. The numeric labeling of the faces of the scintillation crystal 700 is for convenience only, and it is appreciated that other labeling or descriptive identifiers may be utilized. In the illustrated example, the monolithic scintillation crystal 700 is a cuboid, such that each face is orthogonal to other edge-connected faces along one of the axes. For example, face 5 is orthogonal to faces 0, 1, 2, and 3. In the illustrated example, the scintillation crystal 700 is a cube where the dimensions $W_x = W_y = W_z$.

In some instances, the configurations of scintillation crystals and photodetector arrays are named based on the faces or sides that include photodetector arrays. For example, a scintillation crystal with photodetector arrays on faces 0, 2, and 5 is referred to as a scintillator detector with a Side025 configuration, where faces or sides 1, 3, and 4 have reflective material but no photodetector arrays. As another example, a Side0125 configuration includes four photodetector arrays on each of the faces 0, 1, 2, and 5. A scintillator detector comprising a scintillation crystal with photodetector arrays on all six faces would be referred to as a Side012345 configuration.

FIG. 7B illustrates simplified block diagrams of various scintillator detector readout configurations, according to various embodiments. The end-readout configuration 710 includes a photodetector, or a photodetector array, 714 along an outer end-face of an elongated scintillation crystal 712. The side-readout configuration 720 includes a photodetector array 724 along a lateral face of an elongated scintillation crystal 722. The monolithic scintillator end-readout configuration 730 includes a photodetector array 734 along an outer end-face of a monolithic or block scintillator 732.

FIG. 8A illustrates an example of a detection ring 800 of a PET scanner with a plurality of radial sectors, including radial sector 805. A coordinate system is used in which the z-axis corresponds to the axial axis, the x-axis corresponds to the radial axis, and the y-axis corresponds to the tangential axis (sometimes referred to as the transaxial axis). In some embodiments, the detector ring 800 may be formed using between 30 and 90 radial sectors (e.g., 60 radial sectors). Each radial sector, including radial sector 805, may include a plurality of gamma radiation detector modules 810. Radiation detector modules may be separated in the axial direction by a small gap. This gap is often chosen to match the voxel or photodetector pixel resolution of the detector module, ensuring that the spacing between detector pixels remains consistent in the axial direction and/or transaxial direction. This gap may be referred to as a "virtual crystal" because it effectively maintains a uniform interval between the detector pixels, as if the gap itself were a part of the photodetector array. For example, each radial sector may include between 2 and 10 detector modules (e.g., 6 detector modules). Each detector module 810 may include between 1 and 32 scintillator detectors. For example, each detector module 810 may be formed with 4 scintillator detectors in a 2×2 array, 12 scintillator detectors in a 3×4 array, 25 scintillator detectors in a 5×5 array, etc.

FIG. 8B illustrates a larger view of the radial sector 805, according to one embodiment. The radial sector 805 includes 8 detector modules, each of which comprises a 2×4 array of individual scintillator detectors, including individual scintillator detectors 815. Each scintillator detector includes a scintillation crystal comprising a scintillation crystal material (e.g., LSO) with attached photodetector arrays and/or reflective material coatings or layers, as described herein. In the illustrated example, the photodetector arrays on the faces of the scintillation crystal of each scintillator detector are not shown to avoid obscuring the image.

FIG. 8C illustrates the individual scintillation crystal 817 of a scintillator detector one of the detector modules of the radial sector 805 of the detection ring 800 of the PET scanner, according to one embodiment. The individual scintillation crystal 817 includes a monolithic block of scintillator material (e.g., LSO, LYSO, or the like) with labeled faces 0-5, as described in conjunction with FIG. 7A, rotated for consistency with the orientation of the radial sector 805 within the detection ring 800. In some embodiments, the monolithic block of scintillator material may be instead formed as a two-dimensional or three-dimensional array of smaller scintillator prisms (e.g., having unsegmented optical clarity).

Figure 8D:
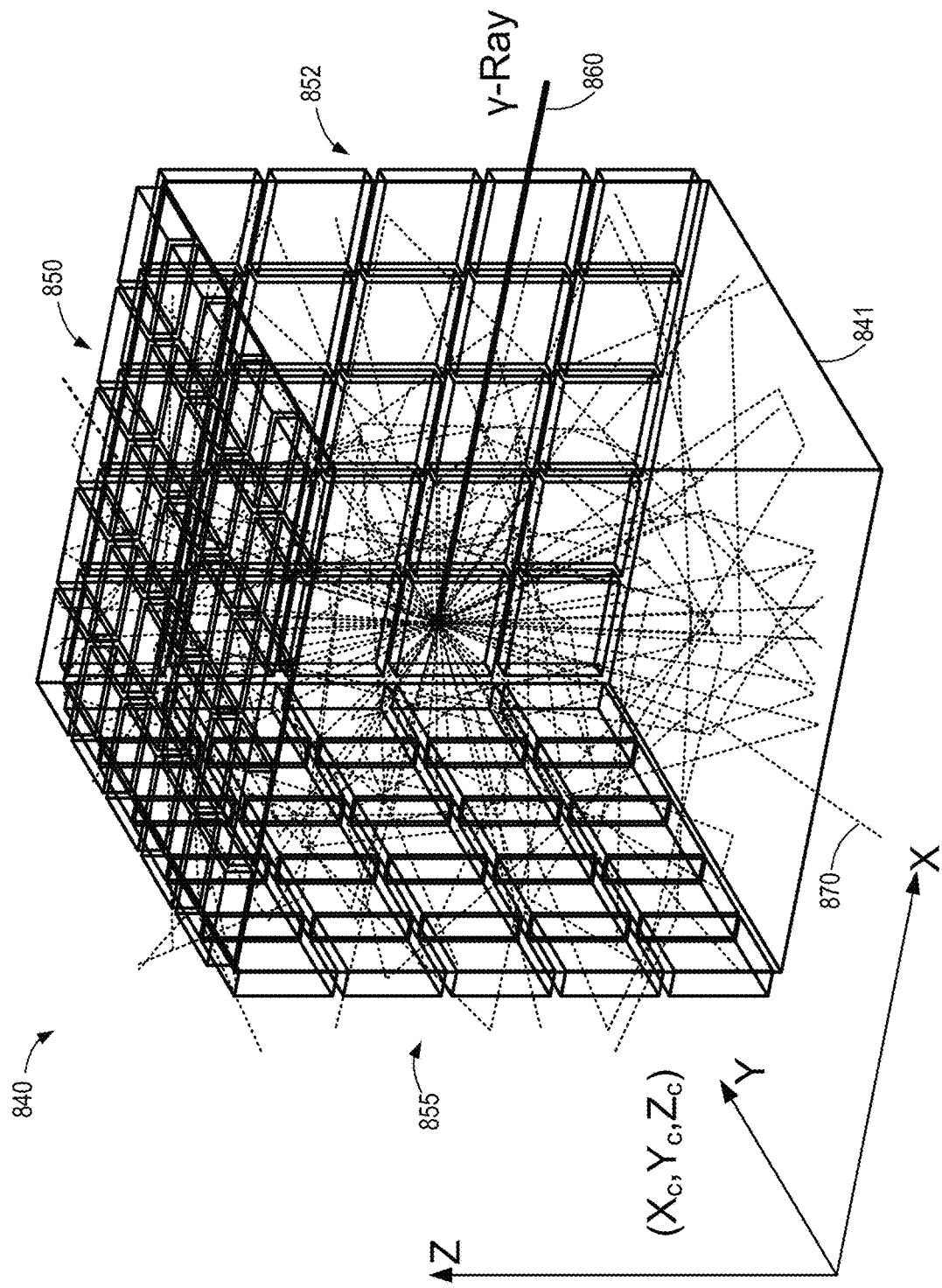
FIG. 8D illustrates an example scintillator detector comprising a monolithic scintillation crystal with three independent photodetector arrays, according to one embodiment.

FIG. 8D illustrates an example scintillator detector 840 comprising a monolithic scintillation crystal 841 with three separate photodetector arrays 850, 852, and 855 positioned on faces 0, 2, and 5, respectively, of the scintillation crystal 841 according to one embodiment. A gamma-ray 860 enters the monolithic scintillation crystal 841 and is scintillated as a plurality of isotropically emitted photons, represented by dashed lines 870. Simulation techniques, such as Monte Carlo simulations, can be used to model scintillation, photon emissions, specular reflection and diffusion, and detection. In some examples, each of the photodetector arrays 850, 852, and 855 comprises a plurality of SiPMs (e.g., a 2×2, 3×3, 4×4, or 5×5 array of SiPMs) or other photodetectors.

For example, rectangular SiPMs with length and width dimensions between approximately 2 millimeters and 8 millimeters may be used.

In some embodiments, the monolithic scintillation crystal 841 is a cuboid with equal length, width, and height dimensions of about 20 millimeters. The photodetector array 855 on face 5 of the monolithic scintillation crystal 841 may be, for example, a 5×5 array of 4 mm×4 mm SiPMs, as illustrated. In a different embodiment, the scintillator detector 840 may include a 20 mm×20 mm×20 mm monolithic scintillation crystal 841 with photodetector arrays formed as an 8×8 array of 2 mm×2 mm SiPMs or a 6×6 array of 3 mm×3 mm SiPMs, which may be equispaced upon each detection face of the monolithic scintillation crystal 841. Any face that is not a detection face (e.g., does not have a photodetector array thereon) and/or any surface area of a detection face that is not covered by a SiPM may be covered by reflective material.

The amount of light generated by a gamma-ray induced scintillation event varies according to a Gaussian distribution, with the mean amount of light dependent on the energy of the incident gamma ray. However, the variation in the amount of light produced is sufficiently small such that, for a given gamma-ray energy, the total light output for events remains approximately constant. Moreover, changes to scintillator geometry and light collection configurations do not affect this per-event scintillation light output. In conventional PET detectors, distributing the scintillation light across a larger number of photodetectors, rather than concentrating it on fewer photodetectors, is typically associated with a degradation in timing performance. Detector timing uncertainty is influenced by various factors, including scintillator rise ($\tau_{rise}$) and decay times ($\tau_{decay}$), the number of detected photons (N), single photon rise time of the photodetector ($\tau_{ser}$), dark count rate (DCR), and an uncorrelated noise component ($\sigma_u$). The relationship between these factors and the coincidence timing resolution (CTR) can be expressed as follows:

$$CTR \propto \sqrt{\frac{\tau_{decay}\tau_{rise}}{N} + \frac{\tau_{ser}DCR}{N^2} + \sigma_u^2}$$

In this equation, the first term represents the uncertainty from the scintillator, while the second term accounts for the photodetector's signal-to-noise ratio and photodetector noise. Both terms are signal-correlated, as they depend on N. The third term, representing uncorrelated noise, is independent of the signal strength. When multiple photodetectors are employed, the number of detected photons (N) is distributed across these detectors rather than concentrated on a single photodetector. If K photodetectors each read out the scintillation light, the CTR equation becomes:

$$CTR \propto \sqrt{\frac{\tau_{decay}\tau_{rise}}{N} + K*\frac{\tau_{ser}DCR}{N^2} + \frac{1}{K}*\sigma_u^2}$$

In this case, the first term, associated with the scintillator, remains unaffected by the number of detectors. The second term, which dominates the CTR, scales with K, indicating that increasing the number of detectors amplifies the timing uncertainty due to detector dark count rate and rise time. Thus, dividing the light signal across more photodetectors reduces the signal-to-noise ratio. The third term, representing uncorrelated noise, such as timing jitter from a time-to-digital converter (TDC), decreases inversely with K.

In PET detectors utilizing scintillators like LYSO or LSO and low-noise TDCs, the second term generally dominates the CTR. Therefore, adding more detectors while maintaining the same number of detected photons typically results in a deterioration of timing performance and thereby reducing temporal spatial resolution. For this reason, conventional detector designs use high aspect ratio scintillators with a small area in contact with the photodetector, along with reflective material on the sides, to concentrate all scintillation light onto a small detection area. This configuration ensures that the light is captured by a minimal number of photodetectors, maximizing the signal-to-noise ratio and optimizing the timing resolution equation.

In contrast, in a monolithic scintillator, the light is spread over a larger detection area, which dilutes the light signal across multiple detectors. Traditional monolithic designs generally lead to poorer timing performance compared to high aspect ratio scintillator detector geometries because the wider spread of light reduces the concentration of detected photons per photodetector, which increases timing uncertainty. Moreover, incorporating more photodetectors increases the cost and complexity of the detector and readout system. As a result, many traditional PET detectors employ high aspect ratio scintillators wrapped in reflective materials to focus scintillation light onto a small number of detectors to minimize light dispersion and improve timing resolution.

The preceding analysis assumes that the single photon rise time ($\tau_{ser}$) remains constant with the addition of more or larger photodetectors. However, this assumption does not hold for most photodetector types. In the case of SiPMs, each detector consists of numerous microcells, where each microcell comprises an avalanche photodiode (APD), and in this configuration, is often termed a single-photon avalanche photodiode (SPAD), and a quenching resistor. These microcells are connected in parallel, and their combined outputs produce the total photodetector current. When signals from multiple microcells or discrete SiPMs are combined, the effective $\tau_{ser}$ increases, leading to a further degradation in CTR.

This poses an additional challenge in detector configurations that utilize a larger number of photodetectors. As the number of SiPMs increases, the effective $\tau_{ser}$ is further degraded due to the combining of signals and parasitics, which raises the overall capacitance and slows the system's response time. A small number of SiPMs, or even a single SiPM, may be coupled to one end of a high aspect ratio scintillator in an attempt to improve or even optimize the photon rise time ($\tau_{ser}$). In such a configuration, all the scintillation light is concentrated onto a single SiPM, preventing $\tau_{ser}$ degradation, such as the $\tau_{ser}$ degradation that can occur when multiple SiPMs are combined. Existing literature widely regards a "one-to-one" configuration, where a high aspect ratio scintillator is paired with a single SiPM, as the optimal solution for minimizing the negative effects of increased capacitance and maintaining superior timing performance.

Monolithic detector designs spread scintillation light over a larger area than pixelated scintillator designs. Monolithic detector designs may use multiple SiPMs to cover the detection area. For example, the light may be distributed across many SiPMs (or another type of photodetector array), leading to a photon rise time $\tau_{ser}$ degradation as signals from multiple detectors are combined with increasing overall capacitance. As a result, traditional monolithic geometries suffer from poorer timing performance due to the increased capacitance and User degradation, making it difficult to achieve the same timing precision as in high aspect ratio scintillator-SiPM pairings.

Figure 9:
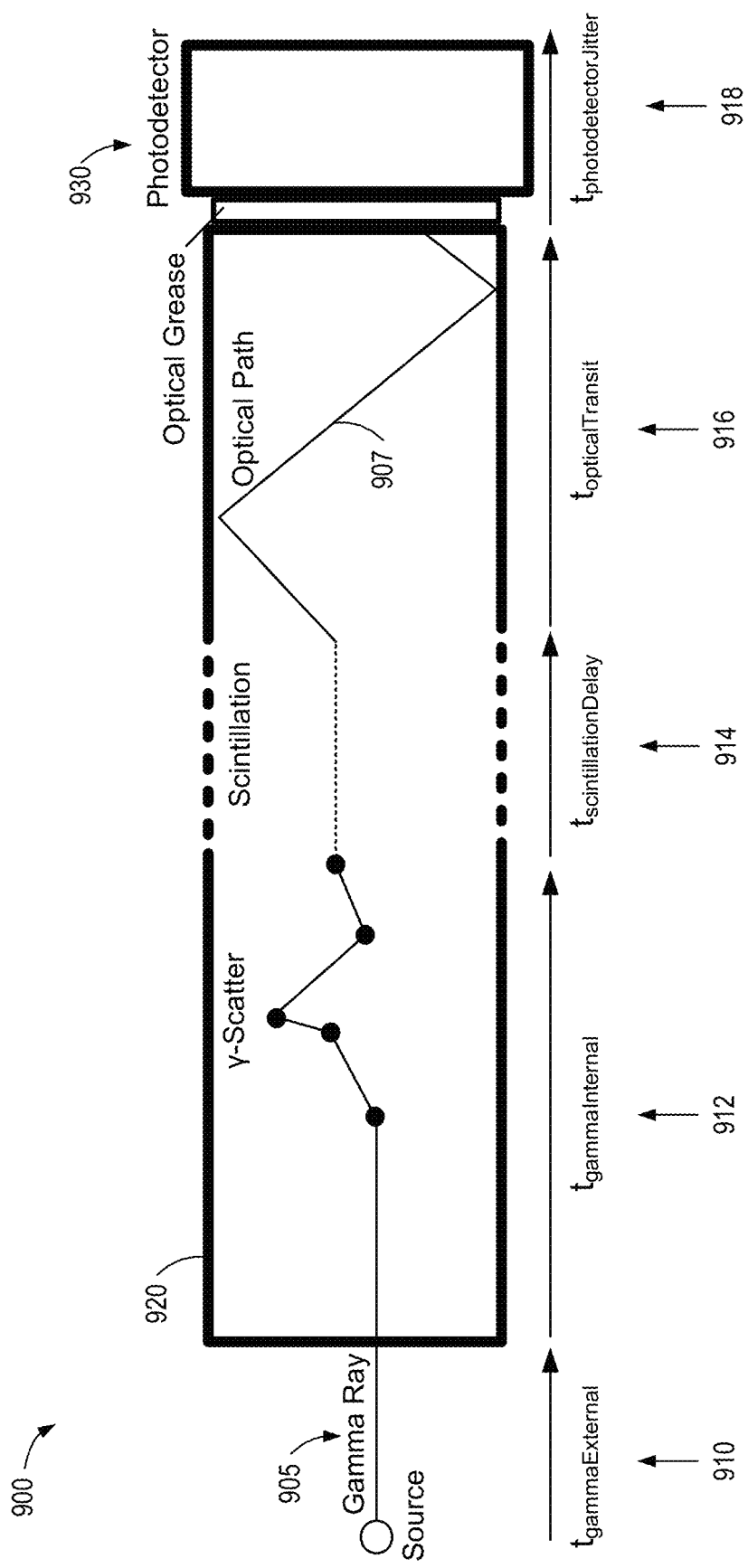
FIG. 9 illustrates a diagram of timing considerations associated with the photonic path in a scintillation crystal of a scintillator detector, according to one embodiment.

FIG. 9 illustrates a diagram 900 of timing considerations associated with the photonic path in a scintillation crystal or scintillator 920 of a scintillator detector 900, according to one embodiment. A PET scanner may determine a time-of-flight based on the time a gamma-ray 905 travels, $t_{gammaExternal}$, 910 before it reaches the scintillator 920 (e.g., a scintillation crystal). As illustrated, the gamma-ray 905 travels externally for a time, $t_{gammaExternal}$, 910 before entering the scintillator 920. Once inside, the gamma-ray 905 travels without interaction and/or scatters within the scintillator 920 for a time period, $t_{gammaInternal}$, 912. Scintillation photons 907 are emitted as part of a scintillation event lasting for a scintillation time, $t_{scintillationDelay}$, 914. The scintillation photons 907 travel within the scintillator 920 for a time, $t_{opticalTransit}$, 916 until they are detected by the photodetector array 930. The photodetector array 930 introduces additional timing uncertainty, $t_{photodetectorJitter}$, 918.

The time contributions $t_{gammaInternal}$ and $t_{opticalTransit}$ are influenced by the shape of the scintillator, photodetector array placement, and attenuation length of the scintillator. The following variables may be used to compare different configurations:

$$t_{transit} = t_{gammaInternal} + t_{opticalTransit}$$

$$t_{transitAndEmission} = t_{transit} + t_{scintillationDelay}$$

$$t_{Detector} = t_{transitAndEmission} + t_{photodetectorJitter}$$

The timing uncertainty of $t_{transit}$, $t_{transitAndEmission}$, and $t_{Detector}$ is measured as the Full Width at Half Maximum (FWHM) of the corresponding time variable distribution. In the case of coincidence time measurement, two such detectors are used in coincidence (e.g., the time difference between the detected events is used). Therefore, to describe timing uncertainty, Γ, of a detector pair based on a Monte Carlo simulation of a single detector, the following variables may be used: $\Gamma_T = \sqrt{2}\text{FWHM}(t_{transit})$, $\Gamma_{TE} = \sqrt{2}\text{FWHM}(t_{transitAndEmission})$, $\Gamma_{CTR} = \sqrt{2}\text{FWHM}(t_{Detector})$.

A positron annihilation event produces two gamma-rays that travel in opposite directions for detection by different detector modules. The gamma-ray 905 in FIG. 9 can represent one of the two gamma-rays produced by the positron annihilation event. The total travel time of the gamma-ray 905 corresponds to the sum of the time, $t_{gammaExternal}$, 910 it takes for the gamma-ray to reach the scintillator 920 and the time, $t_{gammaInternal}$, 912, the gamma-ray 905 travels within the scintillator 920 before the scintillation event ($t_{gammaExternal} + t_{gammaInternal}$). A portion of the flight time (i.e., $t_{gammaInternal}$) is dependent on the depth of interaction at which the gamma-ray 905 interacts first with the scintillator 920.

Gamma internal flight time, $t_{gammaInternal}$, can be expressed as:

$$\delta_\gamma = \frac{W_x - x_c}{c}$$

The optical transient time is dependent on the photodetector placement. Simplified as the perpendicular distance of the interaction centroid coordinate, $P_c$, and the center of the photodetector, $P_k$, the optical transient time can be expressed for each photodetector k as:

$$\delta_{OT,k} = \frac{n}{c} \frac{|(P_c - P_k) \cdot \vec{n_k}|}{\|\vec{n_k}\|}$$

Accordingly, the approximation for the total transit time for a detector k is given by: $\delta_{T,K} = \delta_\gamma + \delta_{OT,k}$, where c is the speed of light, $W_x$ is the length of the scintillator in x direction (radial direction), $x_c$ is the depth of interaction, $\vec{n_k}$ is the normal vector to the photodetector array, and n is the refractive index of the scintillator. $\delta_{T,K}$ and the associated timing uncertainty can be expressed analytically for a prism-shaped scintillator with detectors covering any combination of sides. The transit time averaged over all sensors (K) is expressible as:

$$\overline{\delta_T} = \sum_k^K w_k \delta_{T,k}$$

The terms $w_k$ are weights, such that $\tau_k^K w_k = 1$, and for the average, $w_k = 1/K$ may be used. To approximate the uncertainty ($\Gamma_T$) in $\delta_T$, the principle of propagation of uncertainty is employed and expressible as:

$$\Gamma_T = 4\sqrt{\ln(2)} \sqrt{\left(\frac{\partial \overline{\delta_T}}{\partial x_c}\sigma_{x_c}\right)^2 + \left(\frac{\partial \overline{\delta_T}}{\partial y_c}\sigma_{y_c}\right)^2 + \left(\frac{\partial \overline{\delta_T}}{\partial z_c}\sigma_{z_c}\right)^2}$$

The foregoing approach provides a rough approximation and, in the case of a 20×20×20 mm³ scintillator block of LYSO, $\sigma_{xc}$=5.4 mm, $\sigma_{yc}$=5.8 mm, and $\sigma_{zc}$=5.8 mm.

Values of IT can be simulated using a Monte Carlo simulation for various detector geometries for an exemplary monolithic block of 20×20×20 mm³ LYSO. If a single photodetector array is placed on face 5 (Side5), the simulated uncertainty, IT, in the internal transit time of the gamma photon is approximately 49 ps ($\Gamma_T$=49 ps). If a photodetector array is placed on face 4 (Side4), the uncertainty, IT, is approximately 167 ps. If a photodetector array is placed on one of the tangential or axial sides (faces 0, 1, 2, or 3), the uncertainty, IT, is approximately 127 ps.

Adding a second photodetector array side can deteriorate the overall uncertainty, IT, compared to only using the best configuration of one-sided readout (e.g., Side5 configuration). For example, with photodetector arrays positions on face 0 and face 5 (a Side05 configuration), the uncertainty, $\Gamma_T$, is 59 ps, and with two photodetector arrays on faces 4 and 5 (a Side45 configuration), the uncertainty, $\Gamma_T$, is 63 ps. With two photodetector arrays on faces 0 and 4 (a Side04 configuration), the uncertainty, $\Gamma_T$, is 124 ps. Notably, each of the above configurations (Side05, Side45, and Side04) is worse than only a Side5 configuration while at the same time increasing system cost and complexity.

Adding photodetector arrays on all faces (a Side012345 configuration) results in an uncertainty, $\Gamma_T$, of 62 ps, which, again, is worse than simply placing the photodetector array on a single Side5. The simulation results above demonstrate that the use of photodetectors on multiple sides can lead to a significant deterioration in timing performance. As described above, the deterioration in timing performance is due to the uncertainty induced by a larger fluctuation in the transient time of photons inside the scintillator before being detected by a photodetector, particularly when the photodetectors are placed on a face other than face 5 (e.g., configurations other than Side5 configurations).

In some implementations, the uncertainty contribution of the scintillation delay, $t_{scintillationDelay}$, 914 is only 16 picoseconds (e.g., for LYSO). In contrast, the uncertainty, $\Gamma_T$, in the internal transit time can be more than 100 picoseconds. The presently described systems and methods utilize multiple photodetector arrays (e.g., orthogonally positioned on two or three different faces) to reduce the uncertainty, IT, which corresponds to (i) the uncertainty in determining the time the gamma-ray 905 travels within the scintillator 920, $t_{gammaInternal}$, 912 and (ii) the uncertainty in determining the time that the scintillation photons travel within the scintillator 920, $t_{opticalTransit}$, 916. Reducing the uncertainty, IT, can yield large improvements in $\Gamma_{CTR}$. The uncertainty metric $\Gamma_{TE}$ is useful to compare different scintillator-photodetector setups independent of the photodetector used.

Adding photodetectors to the sides of a scintillator used in a PET system is generally undesirable because it increases the spacing between adjacent scintillator detectors in the tangential and/or axial directions. A larger gap between adjacent scintillator detectors results in greater parallax error and a lower pixel density, which significantly reduces the effective sensitivity of the PET system. Moreover, gamma pair collection efficiency declines as the gap between adjacent scintillator detectors increases.

Figure 10:
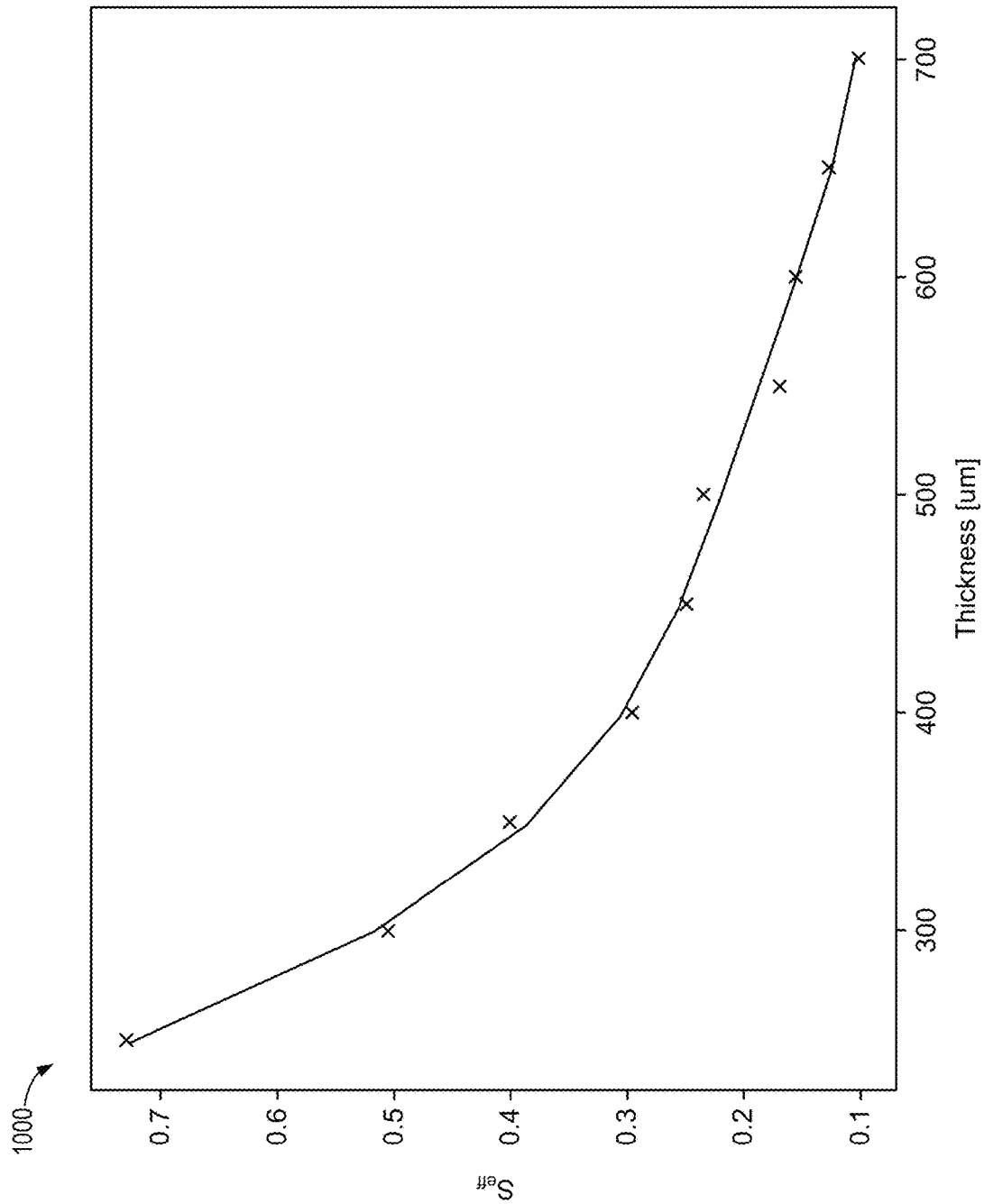
FIG. 10 illustrates a graph of the effective sensitivity of lateral side readout configurations for various thicknesses of lateral detectors, according to one embodiment.

FIG. 10 illustrates a graph 1000 of the relative effective sensitivity of lateral side readout configurations for various thicknesses of lateral detectors, according to one embodiment. The $S_{eff}$ values are normalized to the configuration without lateral photodetectors. The y-axis shows the relative effective sensitivity gain, $S_{eff}$. A negative correlation can be seen with increasing photodetector thicknesses. SiPMs are often thicker than 400 microns, at which the effective sensitivity gain is about 0.3, excluding any depth of interaction or timing uncertainty related to improvements that could be attained using lateral side readout. Accordingly, the increased spacing between photodetectors using 400-micron SiPMs results in a roughly 3× sensitivity loss. To avoid these issues, traditional photodetector arrays are placed on the face of the scintillator that faces the outside of the ring (Side5 configuration), which allows for dense packing of the scintillators without losing space to the photodetectors.

Monolithic scintillator block detectors may be considered as an alternative to segmented high aspect ratio scintillation crystal arrays. However, one limitation of monolithic scintillators is their low intrinsic spatial resolution compared to segmented crystal arrays. The scintillation light produced within a monolithic block spreads unevenly when it reaches the crystal's boundaries. As a result, the positioning algorithms, which rely on interpreting this light distribution, become less accurate near the edges. This leads to reduced spatial resolution and sensitivity in these regions, making it difficult to accurately determine where the gamma-ray interacted within the crystal. Data from these edge regions often have poorer performance and are sometimes discarded, further reducing the overall detection volume and sensitivity of the system.

The systems and methods described herein utilize photodetector arrays on multiple faces, while addressing many of the challenges described above. First, distributing the scintillation light across multiple SiPMs results in a lower signal-to-noise ratio since the light per SiPM decreases, which in turn dilutes the signal. Second, the use of multiple SiPMs increases the overall capacitance of the photodetector array, leading to a slower rise time ($\tau_{ser}$), which negatively impacts the timing performance of the system. Third, the optical transit time spread becomes more pronounced when light is detected by multiple SiPMs placed on various sides, causing further degradation in timing precision due to variations in light travel paths within the scintillator. Fourth, the inclusion of photodetectors on lateral sides reduces the packing density of the system, limiting the ability to construct compact photodetector arrays which has an overall effect of lowering the effective sensitivity. Fifth, in the case of monolithic scintillators, the position resolution suffers from edge effects that result in lower spatial resolution along the edges of the scintillator. Lastly, the addition of more photodetectors increases the cost and complexity of the overall system, posing a significant economic and engineering challenge that, unless a significant overall effective sensitivity gain is obtained to offset the additional cost, is not economical. The presently described systems and methods include multiple SiPMs on various sides of a monolithic scintillator while addressing the lower light per SiPM, the increased capacitance and slower rise time, the optical transit time spread, the reduced packaging density, the lower spatial resolution due to edge effects, and the higher costs.

Figure 11A:
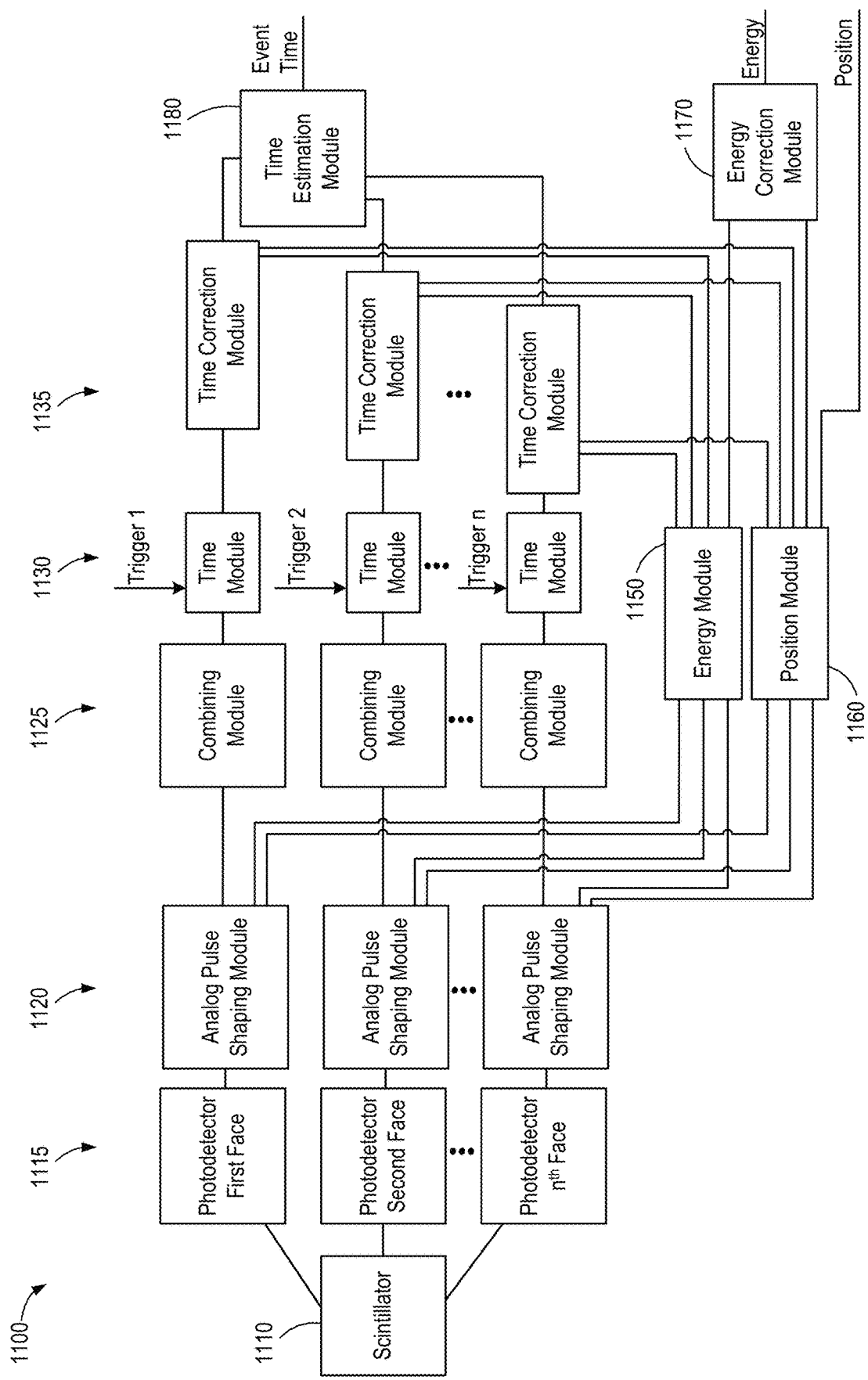
FIG. 11A shows an example block diagram of a scintillator detector, according to one embodiment.

FIG. 11A shows a block diagram 1100 of a scintillator detector, according to one embodiment. A monolithic scintillator 1110 with photodetector arrays 1115 on at least two different faces. As illustrated, up to n photodetector arrays 1115 may be utilized, where n is an integer between 1 and 6. For example, the scintillator 1110 may be a cuboid, where each side with photodetectors is approximately equal in area, and the total scintillator volume is at least 500 mm³. Each photodetector array 1115 on each side may comprise at least a 2×2 array of photodetectors. Each photodetector array 1115 on a given face or side may cover the entire face or side (e.g., 100%), or a substantial portion thereof (e.g., 50%-99%)

In some embodiments, the first photodetector side and the second photodetector sides are selected to be orthogonal (e.g., approximately orthogonal). In embodiments in which a third photodetector side is used, the third photodetector side may be selected to be orthogonal or substantially orthogonal to the first and second photodetector sides. For example, the first photodetector side may be on face 5, the side facing radially outward (e.g., a Side5 configuration), and the second and third photodetector arrays may be positioned on sides that are in the axial and tangential directions, respectively.

Each photodetector array 1115 on each side may be electronically connected to an analog pulse shaping module 1120 and a combining module 1125 that combines the signal output into a single timing channel for each side. The combined signal output of each side from the combining module 1125 is connected to a time module 1130, which converts the analog temporal signal to a time-encoded digital signal. Each side includes a time correction module 1135 that corrects the digital time value based on the output of an energy module 1150 and a position module 1160. A time estimation module 1180 receives the value of the time correction modules 1135 of each side and generates a single trigger time estimation. In some embodiments, a single time correction module 1135 may correct the digital time values from the individual time modules 1130 associated with each photodetector side 1115.

The output of each photodetector side 1115 of the scintillator 1110 is also provided to the energy module 1150 and the position module 1160. The energy module 1150 calculates the overall energy deposited by the event based on the output of the photodetector arrays of all sides. The position module 1160 may, for example, calculate the energy centroid coordinate of the scintillation event within the scintillator 1110. For example, the position module 1160 may calculate or estimate the X, Y, and Z coordinates of the scintillation event within the scintillator 1110 using, for example, an analog center of photoluminescence (e.g., center of measured light intensity) calculation and further utilize an analog-to-digital converter (ADC). In some embodiments, the output of the energy module 1150 is used as the final energy output. In other embodiments, an energy correction module 1170 uses the X, Y, and Z position module output to apply a correction factor to the energy module output.

The term "processing circuit" is used to generally describe the analog pulse shaping modules 1120, combining modules 1125, time modules 1130, time correction modules 1135, time estimation module 1180, energy module 1150, position module 1160, and/or energy correction module 1170, depending on the specific embodiment. In some implementations, one or more of the modules associated with the photodetector arrays on an individual face or side of the scintillator 1110 may be physically or functionally combined. Notably, in various embodiments, each photodetector array on each side of the scintillator is processed separately with distinct time modules and distinct time correction modules. In some embodiments, the photodetector array on each side may include multiple photodetector subarrays. For example, the photodetector array on each side of a scintillator may include an array of SiPMs or multiple subarrays of SiPMs, where each subarray of SiPM (or SiPM subarray) comprises multiple SIPMs.

In some embodiments, all the SiPMs (or other detectors) on a given side are associated with a single time module 1130 that generates a per-side pre-correction timing signal. In other embodiments, each SiPM or other photodetector on a side may be associated with a distinctly triggered time module 1130, such that a pre-correction timing signal is generated for every photodetector array or photodetector subarray on each side of the scintillator. In still other embodiments, a time module 1130 is triggered to identify a pre-correction timing signal for each of a plurality of subarrays of SiPMs or other detectors on a given side. For example, a photodetector array on each side of a scintillator may include twenty SiPMs or thirty-six SiPMs arranged in subarrays of four SiPMs. Distinct analog pulse shaping modules 1120, combining modules 1125, and/or triggered timing modules 1130 may be associated with each subarray of four SiPMs. The five pre-correction timing signals (for twenty SiPMs in 2×2 subarrays) or nine pre-correction timing signals (for 36 SiPMs in 2×2 subarrays) of a given side may be used to determine a per-side pre-correction timing signal. For example, the pre-correction timing signals of the subarrays may be averaged to determine the per-side pre-correction timing signal. Alternatively, the first of the pre-correction timing signals of the subarrays to trigger may be used as the per-side pre-correction timing signal.

Each module may be implemented with, for example, discrete analog components, as part of an integrated circuit, as an application-specific integrated circuit (ASIC), as part of a programmable circuit, as a digital circuit, using a microcontroller, or the like, as may be suitable and appropriate for the particular module. For example, analog pulse shaping modules 1120, combining modules 1125, and time modules 1130 may be implemented using analog circuit components (e.g., as discrete components, as an integrated circuit, or as an ASIC). Other modules may be implemented digitally using, for example, microcontrollers, microprocessors, and/or other digital processing techniques to implement functions of a given module by executing computer-readable program instructions.

In some embodiments, each photodetector array on each side of the scintillator may be processed separately by analog components (e.g., analog pulse shaping modules 1120, combining modules 1125, independently triggered timing modules 1130, etc.). In such embodiments, each photodetector array on each side of the scintillator has its own analog timing channel processing components, including distinct trigger timing for each face having a photodetector array thereon. The output of the time modules 1130 may be a digital signal that is transmitted to the time correction modules 1135 for processing. In some embodiments, one or more of the time corrections modules 1135, time estimation modules 1180, energy module 1150, position module 1160, and/or the energy correction module 1170 may share digital processing resources and/or be co-located on a common digital circuit board of the scintillator and/or multiple scintillators.

As generally described above, the processing circuit (e.g., the various modules) of each scintillator detector uses the analog signals from each photodetector array to determine one or more of the total energy of the gamma-ray, the time at which the gamma-ray interaction (i.e., the scintillation event) occurred within the monolithic scintillation crystal, and the spatial location (i.e., interaction centroid) of the interaction. In various embodiments, the scintillator detector may include a distinct energy channel (e.g., energy module 1150 and/or energy correction module 1170), a distinct timing channel (e.g., time estimation module 1180), and one or more channels to determine the location of the interaction (e.g., position module 1160), as detailed above. Analog pulse shaping module 1120 may utilize various filtering techniques to produce distinct time-triggering signals and energy signals, such as with low-pass, band-pass, or high-pass filters.

At the physical interface between the scintillator 1110 and each photodetector array 1115, a refractive index mismatch may occur. For instance, the scintillating material LSO has a refractive index of approximately 1.82 at optical wavelengths, while optical grease that may be used to couple the scintillator 1110 to the photodetectors 1115 has a refractive index of 1.41. When a scintillation photon encounters this interface, those with an incidence angle smaller than the critical angle are transmitted through to be detected by a photodetector. In contrast, photons with an incidence angle greater than the critical angle undergo internal reflection.

The critical angle $\theta_c$ refers to the incidence angles of scintillation photons on the face of the scintillator that are able to pass through to the photodetector and is given by:

$$\theta_c = \arcsin\left(\frac{n_2}{n_1}\right),$$

where $n_2$ is the refractive index of the coupling medium or photosensor of the photodetector array, and $n_1$ is the refractive index of the scintillator. The critical angle for LSO and the coupling medium may be approximately 51°, using the example values above. Gamma-rays interacting with the scintillator initiate a scintillation process, emitting photons isotropically (e.g., in all directions). The vector of a photon can be represented as:

$$\vec{r} = r \begin{pmatrix} \sin(\theta)\cos(\varphi) \\ \sin(\theta)\sin(\varphi) \\ \cos(\theta) \end{pmatrix} + \vec{r}_0,$$

where θ is the polar angle, φ is the azimuth angle, and $\vec{r}_0$ the location of the scintillation event within the scintillation crystal. The coincidence angle (Ω) between the photon and the face of the photodetector array is expressible as $$\cos(\Omega) = \frac{\vec{r} \cdot \vec{n}}{|\vec{r}||\vec{n}|},$$

with $\vec{n}$ being the normal vector to the detector face.

For a rectangular scintillation crystal with photodetector arrays attached to one or more faces (e.g., a detector face or detector plane), the incidence angle depends solely on the direction of $\vec{r}$ and $\vec{n}$, and not on the origin position $\vec{r}_0$. For a rectangular prism with mirror-like surfaces (e.g., specular reflection), the incidence angle between a photon and any detector plane that covers one of the six faces can be expressed analytically. Consequently, the fraction of photon directions that are transmitted for detection by a photodetector array and the fraction of photon directions that are internally reflected until they are absorbed can be calculated.

In a rectangular scintillation crystal with specular reflective surfaces, the direction of a photon at the detector face after internal reflections is predictable. The photon's post-reflection direction is given by:

$$\vec{r}' = \vec{r} - 2(\vec{r} \cdot \vec{n})\vec{n}$$

where $\vec{r}'$ is the photon's direction after reflection, $\vec{r}$ is the photon's original direction and n is the normal to the reflecting surface.

In the context of a rectangular scintillator, the coincidence angle between a photon and a detector plane that is parallel to any of the axes remains constant. This invariance holds regardless of the number of reflections or the photon's starting point within the prism. Further trigonometric analysis gives the conditions on the polar and azimuth angles for photon transmission to photodetector array(s) for different axes. For example, the polar and azimuth angles for photon transmission in a scintillator with photosensor arrays on sides 4 and 5 (xy-plane detection) are expressible as:

$$|\cos(\theta)| > \sqrt{1 - \left(\frac{n_2}{n_1}\right)^2}.$$

The polar and azimuth angles for photon transmission in a d scintillator with photosensor arrays on sides 0 and/or 1 (yz-plane detection) are expressible as:

$$|\sin(\theta)\cos(\varphi)| > \sqrt{1 - \left(\frac{n_2}{n_1}\right)^2}.$$

The polar and azimuth angles for photon transmission in a scintillator with photosensor arrays on side 2 and/or 3 (xz-plane) are expressible as:

$$|\sin(\theta)\sin(\varphi)| > \sqrt{1 - \left(\frac{n_2}{n_1}\right)^2}.$$

The proportion of scintillation photons that are successfully received by a photodetector array is quantified as a light transmission efficiency (LTE) metric. The remaining scintillation photons are either internally trapped within the scintillator, eventually absorbed, or escape through the reflector material. Higher light transmission efficiencies increase the detected signal, which facilitates more accurate measurements, improves the accuracy of calculations, and improves the signal-to-noise ratio (SNR), all contributing to reducing the overall timing uncertainty and improving energy and position resolution.

In various embodiments, a processing circuit of a scintillation crystal includes a position module 1160 to calculate the location information of the scintillation event. The position module 1160 calculates the location information based on the independent scintillation event timing or positioning signals from each of the photodetector arrays of the scintillation crystal. A time correction module 1135 may adjust the digital scintillation event timing signal of at least one of the photodetector arrays based on the calculated location information of the scintillation event.

Due to Compton scattering, photoelectric absorption, and other interactions, the location information may correspond to a centroid position of the energy distribution (as opposed to a single point). The centroid position represents an average position where the gamma-ray interacted with the scintillator and released scintillation photons. In some examples, the processing circuit (e.g., the position module 1160 of the processing circuit) determines the centroid position $P_c=(x_c, y_c, z_c)$ using a center of photoluminescence method that is adapted from or analogous to a center of gravity (CoG) method, a generalization of Anger logic, which uses the energy ($E_k$) deposited on a photodetector k and the center position of the photodetector $P_k=(x_k, y_k, z_k)$.

For photodetectors that are placed on the XY plane (face 0 and face 1), this can be expressed as:

$$x_c = \frac{\sum_k^K E_k x_k}{\sum_k^K E_k} \text{ and } y_c = \frac{\sum_k^K E_k y_k}{\sum_k^K E_k}.$$

For photodetectors on the XZ plane (face 2 and face 3), this can be expressed as:

$$x_c = \frac{\sum_k^K E_k x_k}{\sum_k^K E_k} \text{ and } z_c = \frac{\sum_k^K E_k z_k}{\sum_k^K E_k}.$$

For photodetectors on the YZ plane (face 0 and face 1), this can be expressed as:

$$y_c = \frac{\sum_k^K E_k y_k}{\sum_k^K E_k} \text{ and } z_c = \frac{\sum_k^K E_k z_k}{\sum_k^K E_k}.$$

In configurations that include photodetector arrays on opposing sides of the scintillation crystal along the same axis (e.g., photodetector arrays on face 0 and face 1 on the XY plane), the quantities are calculated separately for each side and averaged. The calculated values for each photodetector array (or averaged values for photodetector arrays on opposing faces) are combined to obtain a final centroid position.

In some embodiments, the processing circuit may implement a truncated center of gravity (TCoG) method or an adapted center of photoluminescence method where, for each scintillation event, only signals from photodetector arrays are considered with energy levels above a truncation threshold. In other embodiments, the processing circuit may implement a raise to the power (RTP) variant of a center of gravity or an adapted center of photoluminescence approach, in which the signal allocated to a given position is raised to a power for non-linear weighting of high-intensity regions. In other embodiments, the processing circuit may implement a position-weighted center of gravity (PW-CoG) or adapted position-weighted center of photoluminescence approach that gives the signals from different photodetector arrays different weights based on position. In still other embodiments, the variables used for center of gravity or center of photoluminescence calculations can be post-processed in multivariant models or machine learning algorithms to predict the interaction or scintillation position. In some embodiments, a circle-of-progression method is used to detect a relative location of a scintillation event based on the sequence of individual photodiodes within a SiPM that are triggered.

In a conventional PET detector system, only one photodetector array is used on one side (e.g., face 5). Accordingly, the centroid position can only be determined in two dimensions and is less accurate. For example, with a photodetector array on face 5, the centroid position can be determined in the lateral directions (e.g., $y_c$, $z_c$), but not in the depth direction (e.g., $x_c$). In contrast, the proposed systems and methods utilize independent photodetector arrays on two or more orthogonal faces, which provides an overdetermined system with multiple independent $x_c$, $y_c$, and $z_c$ values. The processing circuit can use the overdetermined system of independent values to accurately and reliably determine the gamma-ray interaction location (e.g., scintillation location information).

Moreover, in some embodiments, the processing circuit may include a fault detection module to detect errors or faults in photodetector arrays or connected circuits. For example, when centroid positions derived from different photodetector arrays are compared, consistent discrepancies can indicate the presence of faulty detector elements. For instance, if the centroid position from one photodetector array consistently deviates from those predicted by other photodetector arrays, the processing circuit may report an anomaly and pinpoint malfunctioning or mis-calibrated photodetector arrays, circuitry, or SiPMs. In some embodiments, the processing circuitry implements automatic correction algorithms. For example, the processing circuitry may dynamically adjust the weight of signals from the identified faulty detectors or apply specific calibration corrections to their outputs in response to, for example, temperature gradients, photodetector gain variations, irregular dark currents, etc. Over time, these corrections can compensate for the inaccuracies introduced by faulty elements, thereby enhancing the overall precision of the interaction position determination. Additionally, real-time monitoring of centroid discrepancies can facilitate immediate diagnostics and corrective actions, ensuring the sustained performance and reliability of the scintillator detection system. This approach not only improves the accuracy of position estimation but also contributes to the robustness and longevity of the detection system.

The overall PET scanner spatial resolution ($R_{scanner}$) can be described by: $R_{scanner} = \sqrt{R_{det}^2 + R_{range}^2 + R_{180°}^2 + b^2}$, where $R_{det}$ is the detector spatial resolution, $R_{range}$ is the positron range, $R_{180°}$ is the annihilation photon acollinearity, and the term b is the blurring factor due to imperfect reconstruction. $R_{range}$ is the positron range and is approximately 0.2 mm for $^{18}$F. $R_{180°}$ is the annihilation photon acollinearity and is about +/–0.25° and scales with the scanner diameter, D, as $R_{180°} = 0.0022*D$ and thus for an 800 mm diameter scanner $R_{180°} \approx 1.76$ mm. The term b is the blurring factor due to imperfect reconstruction. In current detector designs with discrete crystals, the scanner spatial resolution, $R_{scanner}$, is dominated by the crystal element dimensions, which are generally 3-4 mm in width. Sub-millimeter scanner spatial resolution, $R_{scanner}$, can be obtained with smaller scintillator pixels; however, the use of smaller scintillations in clinical detectors comes with several costs, including increased financial cost and the trade-off between improved spatial resolution with smaller crystals and the associated loss in scintillation light collection, which results in degraded timing resolution and energy resolution.

The term $E_k$, or energy of a photodetector array (or set of photodetector arrays associated with a scintillation crystal), refers to the amount of scintillation light detected by the photodetector array(s), which is proportional to the total number of photons detected during a scintillation event. In some embodiments, the processing circuit includes an energy module that sums all $E_k$ to obtain a total energy that was deposited by the event in the scintillator. Energy resolution in positron emission tomography refers to the ability of the PET system to accurately measure the energy of incoming gamma photons. It is a critical parameter because precise energy measurement allows for better discrimination between true coincidence events and scattered or random events, thereby enhancing the overall image quality. Good energy resolution directly contributes to improved PET image quality by reducing the contribution of scattered radiation, which can blur the image and reduce contrast.

To measure energy resolution, the pulse height spectrum is obtained from the detector output. The photopeak at energy $E_\gamma$, which corresponds to the full energy deposition by the gamma photons, is analyzed. The full width at half maximum of the photopeak is determined (FWHM($E_\gamma$)), and energy resolution (R) is calculated using the formula:

$$R = \frac{FWHM(E_\gamma)}{E_\gamma} * 100\%.$$

When an event occurs in proximity to the detector, a high concentration of photons impinges upon a localized area of the detector. SiPMs configured with a finite number of Single-Photon Avalanche Diode (SPAD) cells, each possessing a recovery time of a few nanoseconds. In instances where a SPAD cell has already detected a photon, its subsequent electrical response is reduced, resulting in inaccurate energy recording of the incoming photons. Empirical observations indicate that events occurring within approximately 1 mm of the photodetector surface yield a significantly reduced total detected energy. Accordingly, some embodiments of the presently described systems and methods include an energy correction module 1170. The energy correction module 1170 receives the position coordinates (e.g., $x_c$, $y_c$, $z_c$) from the position module 1160, calculates the perpendicular distance from the event centroid to the photodetector array(s), and applies a correction factor to the computed energy based on this distance. Alternatively, or additionally, the energy correction module 1170 may apply a correction factor that adjusts a detection threshold at which detected energy is considered part of a scintillation event.

According to various embodiments, each scintillator detector includes multiple photodetector arrays on two or more orthogonal faces of a scintillation crystal. In some embodiments, the photodetector arrays may be alternatively (or additionally) positioned on two or more faces of the scintillation crystal that are not orthogonal (e.g., on two opposing faces). The processing circuit associated with each scintillation crystal may include an independent electronic readout channel for each photodetector array. For example, a scintillation crystal configured with three photodetector arrays might include a first electronic readout channel connected to the first photodetector array, a second electronic readout channel connected to the second photodetector array, and a third electronic readout channel connected to the third photodetector array, or possess multiple readout channels for each array. The processing circuit may be connected to each of the first, second, and third electronic readout channels with electrical conductors. In some embodiments, the electrical conductors have the same electrical length.

In various embodiments, the processing circuit associated with a given scintillation crystal processes and/or corrects the signals from each photodetector array independently (e.g., time correction modules 1135). The processing circuit may sum the analog signals indicating the total energy (e.g., energy module 1150) detected by each independent photodetector array 1115 to determine the total energy detected for a given scintillation event. The processing circuit may use the individual timing signal information from each photodetector array or photodetector subarray (e.g., from time modules 1130 and/or time correction modules 1135) to determine a scintillation detection time signal for a given scintillation event (e.g., time estimation module 1180).

In some embodiments, the processing circuit may use scintillation event timing information from each of a plurality of photodetector subarrays of each photodetector array. For example, combined or binned analog detection signals from subarrays may be compared and/or combined to determine timing information for each detection face of the scintillation crystal. A final or total timing signal may be determined based on the timing information for each detection face, as detailed in conjunction with various specific embodiments and examples herein. In some embodiments, the processing circuit may average the independent scintillation detection time signals of each photodetector array to determine the final scintillation detection time signal. Alternatively, the processing circuit may use the earliest scintillation detection time signal from one of the photodetector arrays (i.e., the first to trigger the time module 1130) as the final scintillation detection time signal. In still other embodiments, the processing circuit may use the earliest two or more scintillation detection time signals from one or more of the photodetector arrays or subarrays of photodetectors to determine the final scintillation detection time signal.

For example, the processing circuit may use a comparator circuit to compare detection or timing signals from the electronic readout channel of each photodetector array to a detection threshold. A leading-edge discriminator or other triggering/discrimination circuit or device generates a scintillation event timing signal based on the detection signal from the electronic readout channel that first exceeds the detection threshold during a given scintillation event. A time-to-digital converter transmits a digital scintillation event timing signal, defined with respect to a common system clock, based on the scintillation event timing signal from the leading-edge discriminator circuit. As such, the digital scintillation event timing signal is based on the first triggered photodetector array, while the reported energy total is provided as the sum of the energy collection by all the photodetector arrays.

Figure 11B:
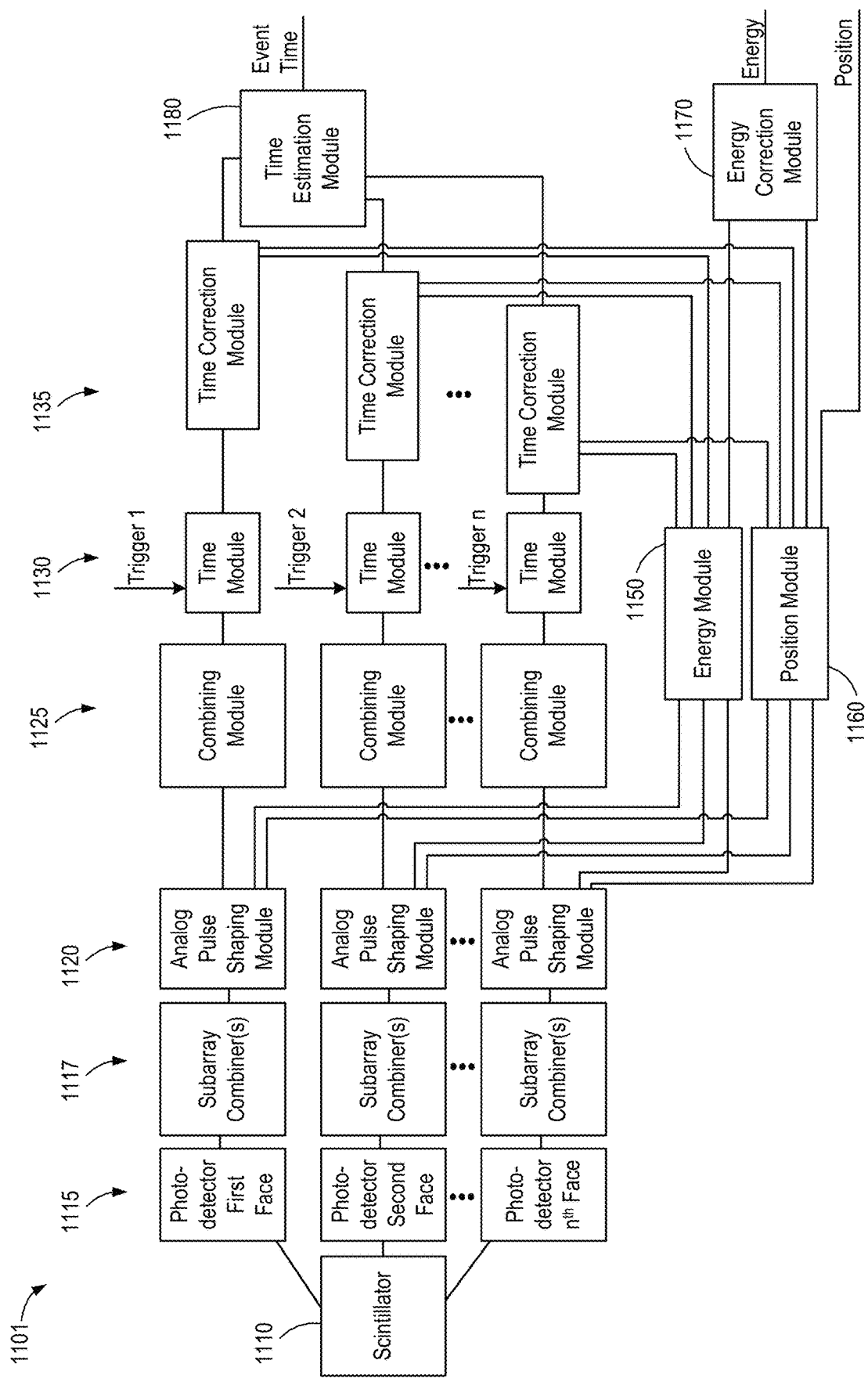
FIG. 11B shows another example block diagram of a scintillator detector, according to another embodiment.

FIG. 11B shows another example block diagram 1101 of a scintillator detector, according to another embodiment. In the illustrated example, a monolithic scintillator 1110 with photodetector arrays 1115 on at least two different faces. As previously described, up to n photodetector arrays 1115 may be utilized, where n is an integer between 1 and 6. Each photodetector array 1115 on each side comprises at least a 2×2 array of photodetectors. In some embodiments, the photodetector array 1115 on each side may include multiple photodetector subarrays. For example, the photodetector array 1115 on each side of the scintillator 1110 may include an array of SiPMs or even multiple subarrays of SiPMs.

For example, a photodetector array 1115 on each side of the scintillator 1110 may include subarrays of 2×2 SiPMs. Each photodetector array 1115 may include a 3×3 array of SiPM subarrays, wherein each subarray comprises 2×2 SiPM photodetectors, such that each overall photodetector array 1115 on each side of the scintillator 1110 comprises 36 SiPMs (or other photodetectors). As illustrated, the outputs of the subarrays of SiPMs (or other photodetectors) may be combined by a subarray combiner 1117. In some embodiments, each subarray combiner 1117 may include multiple combiners (e.g., in parallel or in a cascaded arrangement). The subarray combiner(s) 1117 of a given face may combine the signals from the detectors (e.g., SiPMs) of each subarray for subsequent analog pulse shaping by the analog pulse shaping modules 1120. The combined and pulse-shaped signals from each subarray may be combined by the combiner modules 1125. As such, the single line connecting each analog pulse shaping module 1120 to a combiner module 1125 may represent any number of analog signal lines (e.g., a connection for each photodetector subarray output).

In the example above, the signals from each 2×2 subarray of SiPMs are combined by the subarray combiners 1117, such that nine distinct analog signals from the 3×3 array of SiPM subarrays on each face may be shaped by the analog pulse shaping modules 1120. In some embodiments, the analog pulse shaping modules 1120 may be omitted. The nine analog signals are combined by the combining modules 1125, and a timing signal (pre-corrected timing signal) is determined by the time module 1130 for the corresponding side of the scintillator 1110.

The energy module 1150 calculates the overall energy deposited by the event based on the output of the photodetector arrays of all sides. The position module 1160 may calculate an energy centroid coordinate of the scintillation event within the scintillator 1110. The energy correction module 1170 receives the position information (e.g., position coordinates $x_c$, $y_c$, $z_c$) from the position module 1160 and applies a position-based correction factor to the computed energy from the energy module 1150. A time correction module 1135 corrects the digital time value of each side based on the output of an energy module 1150 and a position module 1160, as described in conjunction with FIG. 11A. A time estimation module 1180 receives the value of the time correction modules 1135 of each side and generates a single trigger time estimation.

FIGS. 12A-12G illustrate various examples of photodetector configurations for determining a scintillation event timing signal (the trigger timing) for a scintillation crystal with photodetector arrays on multiple faces. In the illustrated examples, each photodetector array comprises a 5×5 grid of SiPMs. It is appreciated that the same concepts can be applied to a configuration in which photodetector arrays are positioned on two or more faces of a scintillation crystal and/or where the number and size of the individual SiPMs in each photodetector array are different.

FIG. 12A illustrates a photodetector configuration 1210 in which the processing circuit uses a timing discriminator, such as a leading-edge discriminator or a constant-fraction discriminator, to detect a trigger time based on the sum of each individual SiPM on all sides of the scintillator. This approach is an extension of the traditional approach used for a traditional detector with a single end-readout photodetector. This approach leads to a large overall capacitance and a slow signal rise time.

FIG. 12B illustrates a photodetector configuration 1220 in which the processing circuit triggers based on the first SiPM to cross a detection threshold. The processing circuit processes a signal from each individual SiPM, and the first to trigger is used as the overall timing signal.

FIG. 12C illustrates a photodetector configuration 1230 in which the processing circuit includes an independent trigger time per side. This configuration allows for the correction or adjustment of the signal on each side and reduces large capacitance and noise from any non-triggering sensors.

FIG. 12D illustrates a photodetector configuration 1240 in which the processing circuit uses the first and second photodetector (e.g., SiPM) on each side are used to output two trigger times per readout side.

FIG. 12E illustrates a photodetector configuration 1250 in which the processing circuit that sums the signals of the individual photodetectors (SiPMs) on each side. The processing circuit may, for example, include a leading-edge discriminator circuit for each side that provides one trigger time output per readout side based on the summed signals of the photodetectors.

FIG. 12F illustrates a photodetector configuration 1260 in which the processing circuit sums a subset or subarray of individual photodetectors (e.g., a row, a column, or another arbitrary subset of photodetectors) on each side. The processing circuit determines a trigger time for each side based on the first summed subarray on each side to trigger (e.g., based on the first summed subarray signal value to exceed a threshold value).

FIG. 12G illustrates a photodetector configuration 1270 in which the processing circuit comprises a leading-edge discriminator for each individual photodetector. The processing circuit may determine a trigger time for each individual photodetector. A final trigger time may be found by combining or comparing all the outputs of the various timing discriminators. This configuration utilizes a large number of TDCs and thus may be expensive or impractical to implement.

In various embodiments, a scintillator detector includes a processing circuit, including any of the modules and circuits described herein, including those described in conjunction with FIGS. 11A and 11B. In some embodiments, one or more scintillator detectors in a detector module may share some circuit components and/or processing resources. A processing circuit of a given scintillator detector may include an independent electronic readout channel for each photodetector array. For example, the processing circuit may include a first electronic readout channel connected to the first photodetector array, a second electronic readout channel connected to the second photodetector array, and a third electronic readout channel connected to the third photodetector array. The electrical conductors connecting each photodetector array with the processing circuit may have an identical or substantially identical electrical length to ensure time synchronization or may otherwise be corrected. The processing circuit may include a timing discriminator circuit, such as a leading-edge or constant-fraction discriminator, for example, and/or an independent time-to-digital converter (TDC) circuit.

The time-to-digital converters (TDCs) digitize the trigger time from the timing discriminator circuit, based on a clock common to a plurality of detectors. High-quality TDCs that have a low root mean square (RMS) timing jitter can be a relatively expensive part of the detector unit. In configurations in which the trigger time is determined for each photodetector array (e.g., for each side), multiple TDCs may be used and/or a TDC with multiple channels may be used. For multiple side readout the contribution of uncorrelated noise such as the RMS of the TDC scales with a factor $1/\sqrt{K}$, where K is the number of independent TDCs. There is a substantial degradation of coincidence time resolution for TDCs with an RMS greater than about 50 picoseconds in single-side readout configuration. The degradation is much more gradual for multiple-side readout configurations, and, unexpectedly, even for a TDC RMS of 150 picoseconds, the overall coincidence time resolution degradation is less than 10 picoseconds using three independent TDCs. Thus, while multi-side readout configurations may include more TDCs, lower-quality TDCs can be employed to save costs and still obtain high performance.

The timing discriminator circuit is used to mark and estimate the scintillation event time. A signal from each photodetector array may be compared with a detection, or "trigger," threshold. As the signal pulse rises from zero to a peak value, a leading-edge discriminator circuit may trigger a response as soon as the pulse exceeds the detection threshold. The time at which this threshold is crossed ($t_{trigger}$) is used as an estimate of the event time.

In some embodiments, a leading-edge discriminator circuit generates a scintillation event timing signal based on the detection signal from the electronic readout channel that first exceeds the detection threshold during a given scintillation event. For example, in a configuration that has three photodetector arrays, the photodetector array closest to the scintillation event is likely to detect the event first. The leading-edge discriminator circuit may use this value as the detection time for the signals received from all three photodetector arrays, even though the signals from the other two photodetector arrays are likely to exceed the detection threshold a few picoseconds later. This first-to-trigger approach may increase the accuracy of the timing detection.

In other embodiments, the scintillation event timing signal for the scintillation crystal is generated based on an average scintillation event timing signal of each independent photodetector array. In other embodiments, the scintillation event timing signal of each independent photodetector array is adjusted based on a position or location determination of the scintillation event within the scintillation crystal. In such an embodiment, the scintillation event timing signal for the scintillation crystal may be generated based on an average of the position-adjusted scintillation event timing signals of the photodetector arrays. The time-to-digital converter may transmit a digital scintillation event timing signal based on the scintillation event timing signal from the timing discriminator circuit.

The coincidence time resolution (CTR) is calculated using the scintillation event timing signal. In a scenario where two simultaneous events generate signal pulses in two separate scintillator detectors, the event times are estimated using a timing discriminator circuit for each scintillator detector. The time difference between two events is determined for numerous pairs of simultaneous events to build up a distribution of time differences. The full-width half maximum (FWHM) of this distribution represents the CTR. It provides a measure of the precision with which the time difference between two simultaneous events can be determined, thereby offering a measure of the timing resolution of the system.

In some embodiments, the processing circuit estimates the time components of $t_{transit}$ based on the calculated interaction location $P_c$ and the detector position $P_k$. The components of $t_{transit}$ significantly contribute to timing uncertainty. The processing circuit uses the location information to correct these delays and thereby improve the coincidence time resolution (CTR). For instance, the processing circuit may adjust a trigger time, $t_{trigger,k}$, for a scintillation event as follows: $t_{trigger\ corrected,k} = t_{trigger,k} - \delta_{T,k}$.

In various embodiments, each independent photodetector array of a scintillation crystal of a scintillator detector may identify a trigger time associated with a scintillation event at a slightly different time based on the relative distance between the photodetector array and the location of the scintillation event within the scintillation crystal or relative to the total amount of photons received by this photodetector. The variance or drift in the trigger time correlated with the number of detected photons (and/or correlated with the detector to centroid position) is referred to herein as the amplitude time walk.

In some embodiments, the processing circuit may include an amplitude correction module to adjust an "amplitude time walk" of the timing signal from at least one of the photodetector arrays based on calculated location information of the scintillation event relative to the photodetectors or based on energy determination.

As previously described, the processing circuit may utilize the calculated centroid position (e.g., location information) of the scintillation event to adjust or correct a timing signal associated with the scintillation crystal as a whole and/or independently adjust a timing signal associated with each photodetector array of the given scintillation crystal. The scintillation event can occur at any position within the scintillator, leading to position-based time delays that correlate with the interaction location $P_c$ and the detector position $P_k$.

The time-dependent signal of photodetector k is represented as $I_k(t)$, which in a simplified model follows the exponential rise and decay time profile of the scintillator with a rise time, $\tau_{rise}$, a decay time, $\tau_{decay}$, a start time of the detection of photons $t_0$, and amplitude of the signal A, where the amplitude of the signal A is directly correlated to the number of photons or $E_k$ (i.e. $A \propto E_k$). The time-dependent signal of photodetector k is expressible as:

$$I_k(t) = A\left(e^{-\frac{t-t_0}{\tau_{decay}}} - e^{-\frac{t-t_0}{\tau_{rise}}}\right).$$

Using the approximation $\tau_{rise} \ll \tau_{decay}$ and given that $t-t_0$ is small for the rising edge of the profile where the threshold is applied:

$$e^{-\frac{t-t_0}{\tau_{rise}}} \approx 1$$

Accordingly, the time-dependent signal of photodetector k is approximated as:

$$I_k(t) = Ae^{-\frac{t-t_0}{\tau_{decay}}}.$$

Solving for t, when the signal is equal to the trigger level with $I_k(t) = I_{trigger\ threshold}$, the time-dependent signal of photodetector k is expressible as approximately: $t = t_0 + \tau_{decay}(\ln(A) - \ln(I_{trigger\ threshold}))$ The terms $\tau_{decay}$ and $I_{trigger\ threshold}$ are constants that can be determined empirically by fitting $c_1$ and $c_2$ to an experimental dataset as: $t_{amplitude\ walk\ correction,k} = c_1 + c_2 * \ln(E_k)$.

Figure 13A:
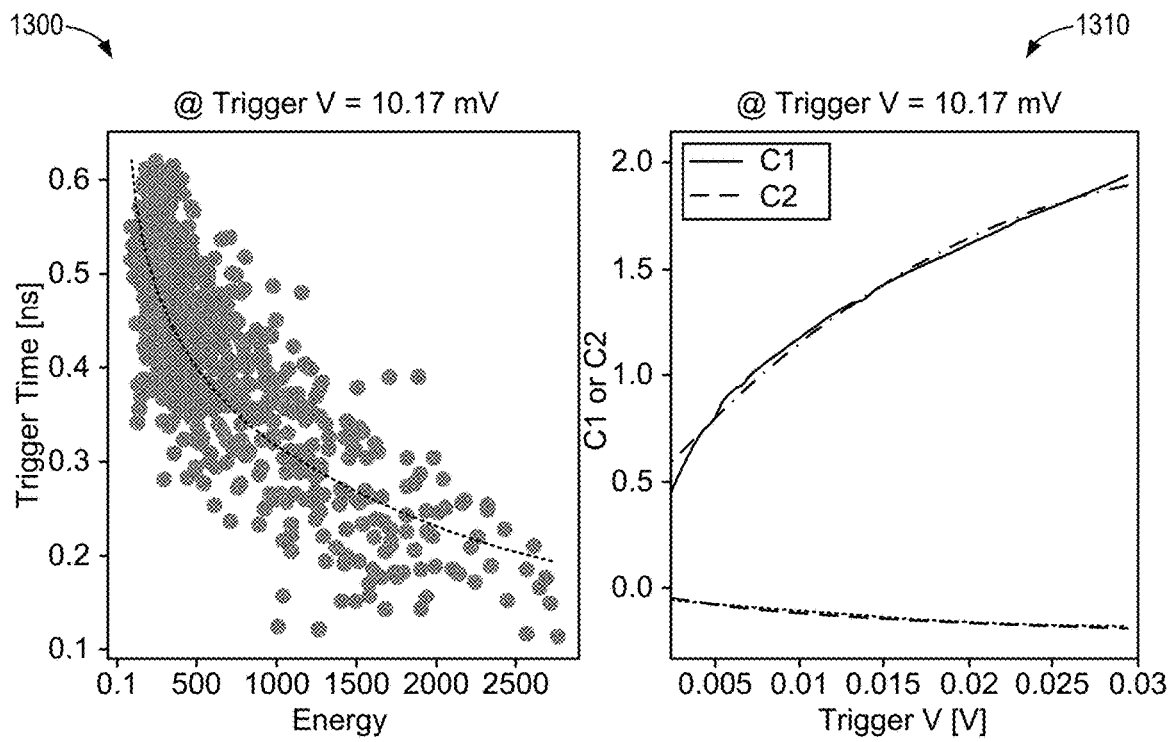
FIG. 13A includes a graph showing a correlation between the energy detected by one photodetector array and the corresponding trigger time, according to one embodiment.

FIG. 13A includes a graph 1300 showing a correlation between the energy detected by one photodetector array and the corresponding trigger time, with a detection threshold or trigger threshold of 10.17 mV, according to one embodiment. The graph 1310 shows the constants $c_1$ and $c_2$ fitted for different trigger thresholds. As illustrated, using the detection or trigger threshold of 10.17 mV, the values of constants $c_1$ and $c_2$ are 1.1 nanoseconds and −0.12 nanoseconds, respectively. The illustrated examples are based on a configuration referred to as Side025_20×20×20_4MM, in which a cubic scintillation crystal that is 20 millimeters on each side is configured with three photodetector arrays on orthogonal faces 0, 2, and 5, where each photodetector array comprises a 5×5 array of 4 mm square SiPMs as well as the configuration 1230 in FIG. 12C, where the trigger time of the first triggering SiPM on each side is used.

The amplitude walk correction may be performed based on the energy $E_k$ from the particular SiPM that triggered first on this side. In some embodiments, an additional electronic circuit is used to determine the Energy $E_k$ of the first to trigger SiPM. Utilizing a first-to-trigger approach, as illustrated in 1220, 1230, 1240, or 1260, induces a large amplitude time walk on the trigger time. As described above, this amplitude time walk can be corrected based on $E_k$ the energy of the triggering SiPM. The large amplitude time walk arises due to the varying distance between the triggering SiPM and energy centroid location.

Figure 13B:
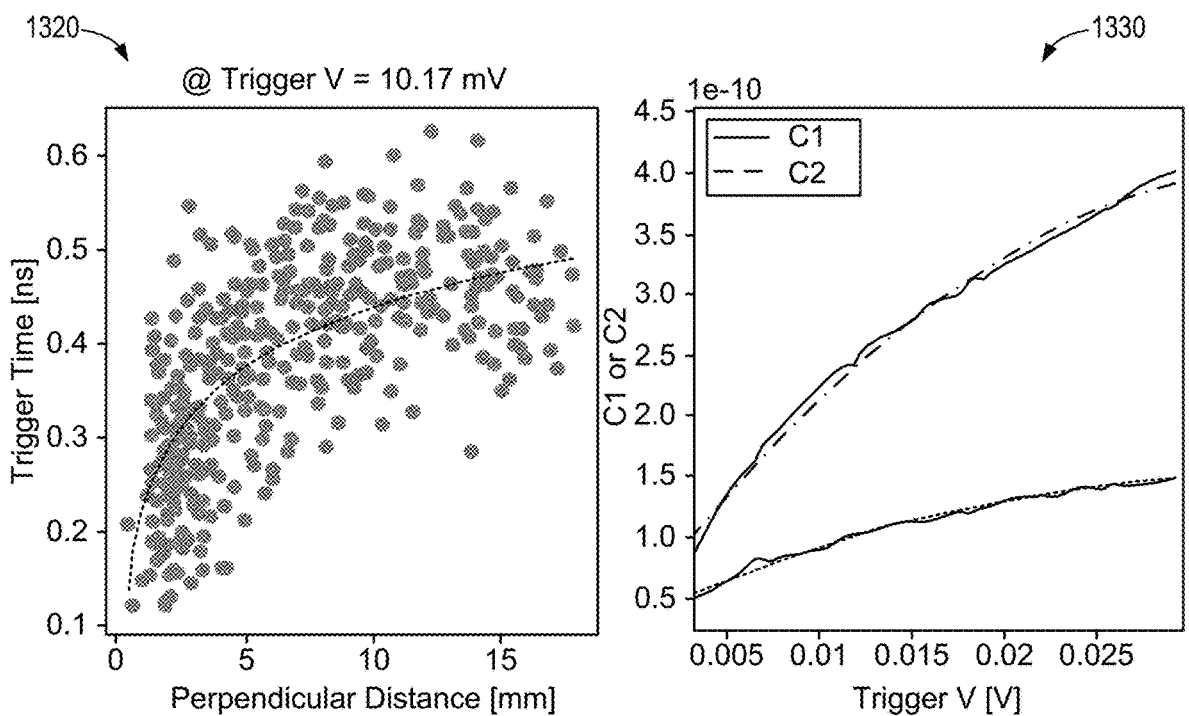
FIG. 13B illustrates a graph showing a correlation between the perpendicular distance of the photodetector array and the time drift, according to one embodiment.

FIG. 13B illustrates a graph 1320 showing a correlation between the perpendicular distance, $P_c$, of the photodetector array from the scintillation event and the time drift associated with the trigger time, with the detection or trigger threshold of 10.17 mV. The same approach used for energy-based correction can be applied to the perpendicular distance between the sensor plane and the centroid to correct for amplitude time walk.

This perpendicular distance, $d_{perp}$, is the shortest distance from the sensor plane of the photodetector array to the centroid position, $P_c$. The time correction factor is derived using this distance, as expressible as: $t_{amplitude\ walk\ correction,k} = c_1 + c_2 * \ln(d_{perp,k})$, where $d_{perp,k}$ is defined as the perpendicular distance from the centroid position, $P_c$, to the sensor plane of photodetector array k.

In this configuration, the processing circuit corrects the amplitude time walk based on a spatial relationship (e.g., based on the location information). Accordingly, independent energy totals from each photodetector array may not be needed. In such embodiments, a single analog-to-digital encoder may be used to sum the total energy received by multiple photodetector arrays while still allowing for the time correction of the amplitude time walk.

The graph 1330 shows the constants $c_1$ and $c_2$ fitted for different trigger thresholds using the position-based correction approach described above. As illustrated, using the detection or trigger threshold of 10.17 mV, the values of constants $c_1$ and $c_2$ are 0.22 nanoseconds and 0.94 nanoseconds, respectively. The illustrated examples are based on the same Side025_20×20×20_4MM configuration described in conjunction with FIG. 13A.

According to various embodiments of the presently described systems and methods, a processing system may adjust the analog or digital scintillation event timing signal of each photodetector array independently or collectively based on a calculated location of the scintillation event within the scintillation crystal. The correction of the initial trigger time of a given photodetector array, $t_{trigger,k}$, may be expressed as: $t_{trigger\ corrected,k} = t_{trigger,k} - \delta_{T,k} - t_{amplitude\ walk\ correction,k}$.

The time estimation module of the processing circuit may derive a total event time using all $t_{trigger\ corrected,k}$. For example, the time estimation module may determine the total event time based on an average or a weighted average of the time-corrected outputs from the photodetector arrays on each of two or more sides or faces of the scintillator. In some embodiments, the time estimation module may determine the total event time based on a statistical or machine learning-based approach such as polynomial correlations, linear regressions, logistic regressions, decision trees, support vector machines, neural networks, convolutional neural networks, and the like, that combine the time-corrected outputs from each photodetector array of each face.

According to various embodiments of the presently described systems and methods, the independent readout circuitry from photodetector arrays on multiple faces of a monolithic scintillator significantly improves the coincidence time resolution and, at the same time, enables the determination of the radial, tangential, and axial positions of the incidence location within the scintillator block with a high degree of accuracy. For example, in configurations using 4 mm SiPMs in photodetector arrays on a 20×20×20 millimeter scintillation crystal, the position resolution using a center of gravity or photoluminescence approach is demonstrated to be as accurate as 5.34 mm with a photodetector array on only Side5, as accurate as 2.20 mm with photodetector arrays on Side05 (or equivalent Side15, Side25 or Side35), as accurate as 1.96 mm with photodetector arrays on Side025 (or equivalent Side035, Side125, or Side135), and as accurate as 1.30 mm with photodetector arrays on Side0125 (or equivalent Side0135, Side0235 or Side1235). Smaller SiPMs can be used to improve positional resolution further.

Figure 14A:
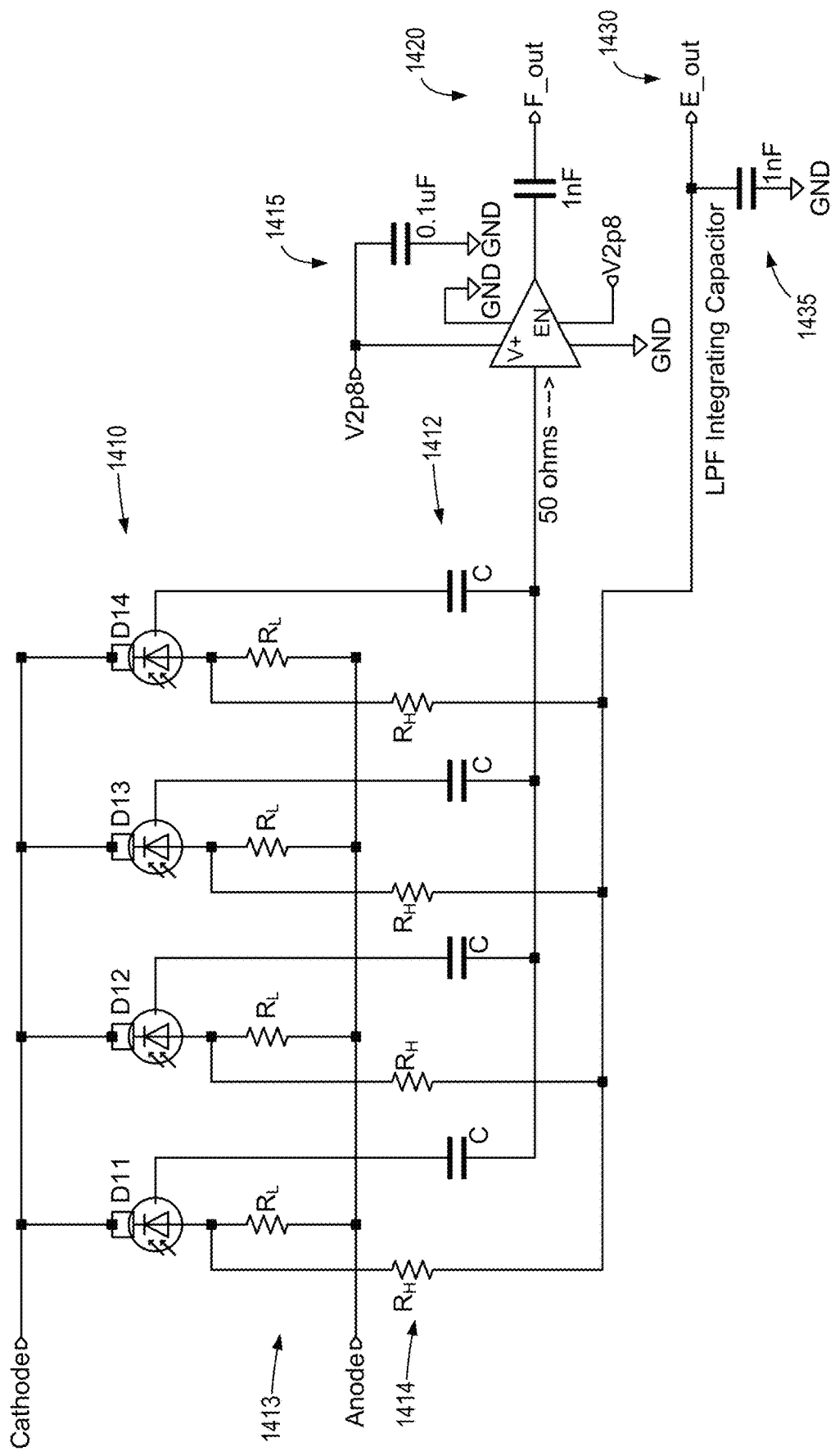
FIG. 14A illustrates an example of a subarray combining circuit to sum the signals of a subarray of four photodetectors, according to one embodiment.

FIG. 14A illustrates an example of a subarray combining circuit to sum the signals of a subarray of four photodetectors 1410, according to one embodiment. As illustrated, a common cathode bias rail and anode rail are connected to the four photodetectors 1410. The four photodetectors 1410 may be, as illustrated, operated in reverse bias or in Geiger mode, such that an avalanche of photocurrent results from incident photons. Each photodetector may be a two-terminal photodiode, such as an avalanche photodiode (APD) or an SiPM. In some embodiments, a three-terminal device, as illustrated, may be used that possesses a high-bandwidth timing signal intercepted from within the device's internal quenching circuit for a plurality of single-photon-photodiodes (SPADs) that form an SiPM. The circuit generates an overall combined fast, high-bandwidth output timing signal 1420 (a subarray analog detection signal) and a relatively slow, lower-bandwidth energy signal 1430, useful for measuring the timing and quantity of incident photons, respectively. Alternative circuit configurations may be utilized to derive the high-bandwidth timing signal 1420 and/or the lower-bandwidth energy signal 1430.

In the illustrated example, the high-bandwidth timing signal of each photodetector 1410 is capacitively coupled to a common signal fed into a wide-bandwidth low-noise amplifier 1415. The capacitors 1412 are sized to implement a wide-bandwidth high-pass filter to couple the high-frequency switching frequency components while blocking direct-current (DC) voltage bias levels. For example, the capacitors 1412 may have capacitances ranging from approximately 1 picofarad to approximately 1 microfarad. Photocurrent is also fed from the anode of each of four photodetectors 1410 through corresponding current-splitter resistive networks 1413 and 1414, which provide bias for the photodiodes 1410 as well as a suitable amplitude of signal current into the low-pass filtering RC network encompassing the capacitor 1435 where the energy signal 1430 is attained. The current-splitter resistive networks 1413 and 1414 may include lower impedance resistors 1413 and higher impedance resistors 1414 (e.g., an order of magnitude higher). For example, the current-splitter resistive networks 1413 and 1414 may use resistors between approximately 10 ohms and 10 kiloohms.

A suitable selection of equivalent resistance and capacitance is used to form an integrator having a time constant that is several times slower than that of the source signal rise time. The integrator is used to measure, on a relative basis, the energy deposited into the four photodetectors 1410, which may be obtained from the peak of the ensuing pulse signal from a low-pass filter. The four photodetectors 1410 forming the subarray is merely an example number of photodetectors. In some embodiments, each subarray may include one or more photodetectors (e.g., one or more SiPMs).

Figure 14B:
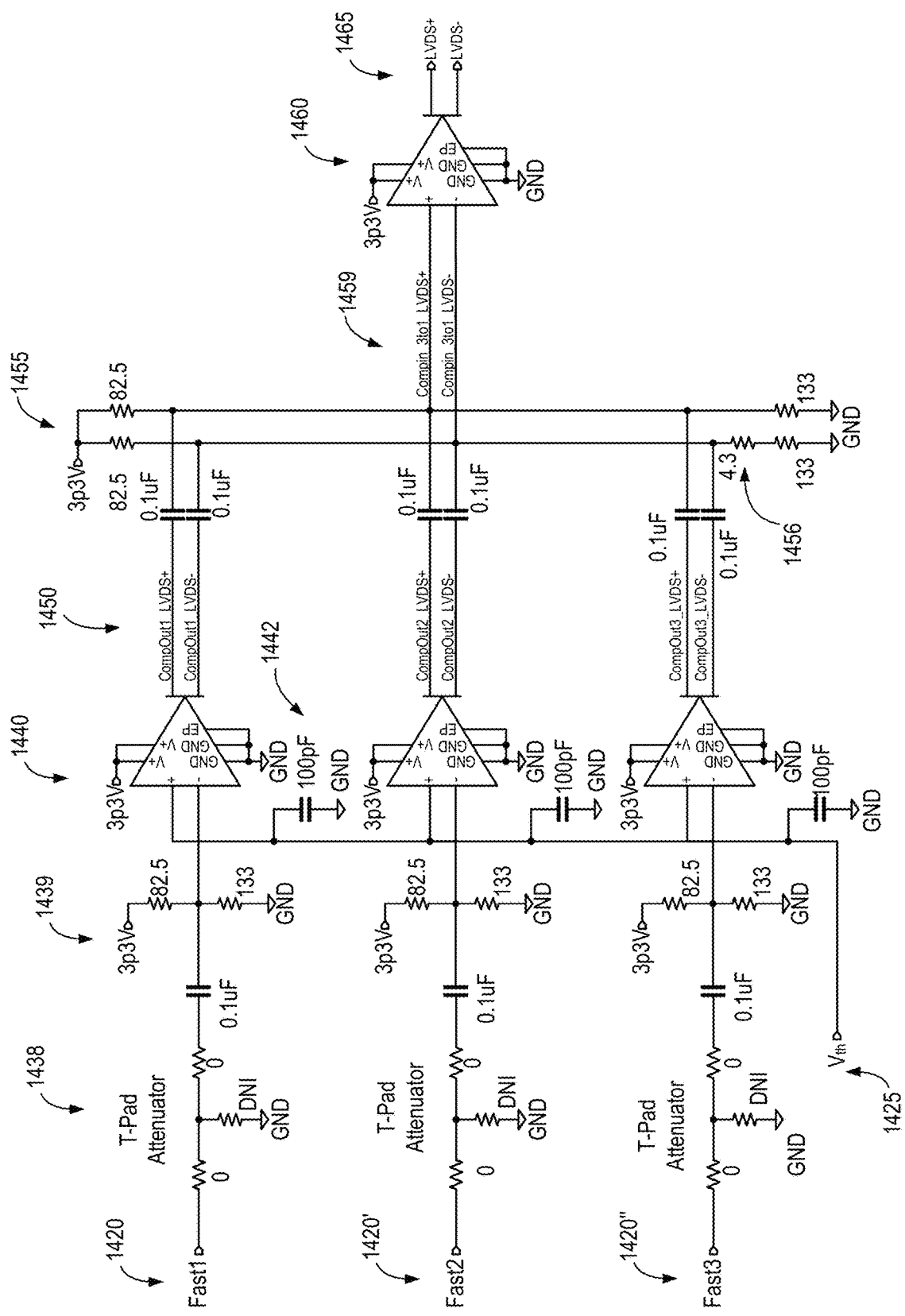
FIG. 14B illustrates an example of a two-stage combining circuit to combine multiple subarray analog detection signals from multiple subarrays of photodetectors, according to one embodiment.

FIG. 14B illustrates an example of a two-stage combining circuit to combine multiple subarray analog detection signals from multiple subarrays of photodetectors, according to one embodiment. As illustrated, the fast analog timing signal output from 1420 of FIG. 14A is capacitively coupled to a high-bandwidth comparator 1440 for generating a binary time-mark signal (e.g., an LVDS signal) 1450 based on a pre-determined first trigger threshold 1425 (e.g., a voltage value). Outputs 1420' and 1420" are similar to output 1420 of FIG. 14A, but from other subarray combining circuits of other subarrays of photodetectors on the same side or face of a scintillation crystal of a scintillator detector. Each of these outputs 1420' and 1420" from the other subarray combining circuits of other subarrays of photodetectors is capacitively coupled to a high-bandwidth comparator 1440 to generate a binary time-mark signal 1450 based on when the fast analog timing signal output 1420 from the subarray of photodetectors 1410 crosses a pre-determined first trigger threshold 1425. Stated another way, the binary time-mark signal 1450 may be generated based on when the combined subarray analog detection signal from the photodetectors 1410, which is negative-going in the given example, drops below the first trigger threshold 1425.

In other embodiments, in which the analog detection signal from the photodetectors 1410 is positive-going, the binary time-mark signal 1450 may be generated based on when the combined subarray analog detection signal from the photodetectors 1410 is greater than the first trigger threshold 1425. In general, the phrase "exceeds the trigger threshold" is used to describe both negative-going signals and positive going signals, where a trigger threshold is configured with a negative or positive value, and the triggering signals "exceeds" the value in the positive or negative direction, depending on whether the system is configured with negative-going signals or positive going signals.

Accordingly, three binary time-mark signals are generated at 1450 based on the signals from three different subarrays of combined photodetectors. The illustrated example of three high-bandwidth comparators 1440 to generate the three binary time-mark signals at 1450 is merely an example number of high-bandwidth comparators. In other embodiments, the two-stage combining circuit may include two or more high-bandwidth comparators 1440. The illustrated three-channel timing and combining circuit combines the three binary time-mark signals, at 1450, to form a quaternary time-mark signal 1459 via the resistor divider network 1455. The quaternary time-mark signal, at 1459, is provided as an input into combining comparator 1460. The combining comparator 1460 combines the quaternary time-mark signal, at 1459, to form the overall binary time-mark output 1465. Alternative examples with various configurations of comparators and combined subarray analog signals are illustrated in FIGS. 12A-12G.

In the illustrated example, the input of each channel presents a t-pad attenuator resistor network 1438 to tune (e.g., improve or optimize) the input signal dynamic range. Biasing input circuit 1439 includes resistor dividers and a wide-bandwidth input capacitor circuit to set DC bias points and block DC coupling. The t-pad resistor network 1438 and the biasing input circuit 1439 conditions (e.g., attenuates, normalizes, filters, and/or otherwise modifies) and propagates the high-frequency timing pulse signal 1420 from the output of a subarray of photodiodes 1410 for input into the wide-bandwidth comparator 1440. In some embodiments, the t-pad resistor network 1438 and the biasing input circuit 1439 provide a DC bias point selected for low-jitter operation and comparison to a trigger threshold voltage, (Vth). The first trigger threshold voltage 1425 may be, for example, set by a programmable digital-to-analog converter (DAC).

The input DC bias point may be set close to the first trigger threshold voltage 1425 for setting the sensitivity of the comparators 1440. The bias points and input polarity may be selected to accommodate positive-going or negative-going timing signals accordingly. Low pass filtering capacitors 1442 may be used to improve the timing performance of the binary time-mark output signals 1450 of each subarray of photodetectors by reducing the noise of the first threshold voltage 1425 (e.g., providing low-jitter performance).

In some embodiments, the high-bandwidth comparators 1440 and the combining comparator 1460 of the two-stage combining circuit generates low-voltage differential signaling (LVDS) signals at outputs 1450 and 1465, respectively, and/or updated versions thereof or an alternative differential, serial signaling standard. LVDS is a switching and signal transmission standard set by the Telecommunications Industry Association (TIA) and the Electronic Industries Alliance (EIA). TIA/EIA-644 is the most common standard utilized in communication circuits and provides for point-to-point transmission with a common-mode DC bias of about 1.25V. TIA/EIA-899 is a multidrop or multipoint LVDS standard that utilizes a common-mode DC bias of about 1.2V. TIA/EIA-644 specifies an input switching threshold of at least ±100 mV while that of TIA/EIA-899 is +50 mV. Commonly, TIA/EIA-644 drivers output 350 mV of differential voltage across a 100Ω termination. TIA/EIA-644 is point-to-point and commonly implemented with current-mode drivers, utilizing a switched current output source of about 3.5 mA, where a 100Ω differential termination is typically employed for voltage conversion. Another termination scheme employs split-termination resistors of 50Ω from each differential driver to ground, which may, for example, be capacitively coupled from a common node between the two 50Ω resistors to ground. Multi-drop LVDS is a distributed communication bus comprising a single driver with multiple receivers, while multi-point is implemented with multiple transceivers in which the bus employs two terminations, one at each end of the bus.

The differential output of each comparator 1440 forms a binary time-mark channel 1450 for a given subarray of photosensors (comprising one or more photosensors). The binary time-mark channel 1450 of each subarray of photosensors is capacitively coupled in series to a resistor divider 1455 for each differential driver pole (or complimentary output). Each resistor divider may, for example, equivalently provide approximately 50Ω to ground for AC signals, but also set the common-mode bias for the input to a subsequent wide-bandwidth low-jitter combining comparator 1460, which yields a composite, or combined binary time-mark signal output 1465, representing a first-to-fire (or first-to-avalanche) photodiode occurring in response to a gamma-scintillation event. Combined binary time-mark signal 1465 may be, for example, pulse-width modulated, encoding the duration of the scintillation event as provided by inputs 1420, 1420', and 1420". Therefore, the output signal 1465 may be utilized for measuring both first-to-fire photodetection of scintillation as well as the duration of scintillation for accomplishing time-over-threshold estimation of a total energy, based on the timing characteristics of the scintillator material utilized in the scintillator detector.

The offset resistance provided by resistor 1456 establishes a stable output state for the combining comparator 1460 of FIG. 14B. The unequal termination resistors for the complimentary LVDS output drivers yield a DC bias point offset. Combining the first-to-fire (or first-to-avalanche) photosensor signal is accomplished by combining the AC-coupled differential output signals 1450 to the input of the combining comparator 1460 through the resistor divider 1455. The switching AC-coupled differential output signals 1450 are propagated through the capacitive couplings, largely unimpeded, resulting in a switching current being applied to the otherwise steady-state bias of the resistor dividers 1455 to the input of the final, combining comparator 1460. The signal state present at the input of the combining comparator 1460 is quaternary, whereby the comparators 1440 may all be off or any combination of one to three switching such that their output currents become additive to the resistor dividers of 1455 by virtue of their AC coupling.

The offset provided by resistor 1456 applies to the DC bias of the network and to the AC switching current. The resistance value of the resistor 1456 may be selected to provide a stable input and output steady state and to minimize any negative effects on differential signaling while still providing a steady-state bias offset. Ordinarily, for LVDS circuits, an offset termination is undesirable, or even unacceptable, due to an unequally applied switching current and voltage resulting between the complimentary inputs relative to an LVDS receiver's input switching threshold. However, the presently described circuit utilizes the small bias offset resulting from resistor 1456 to stabilize the output 1465 of the final, combining comparator 1460 when the comparator is not otherwise receiving an input switching current, yet sized such that switching currents still result in a first-to-fire time-mark.

Figure 14C:
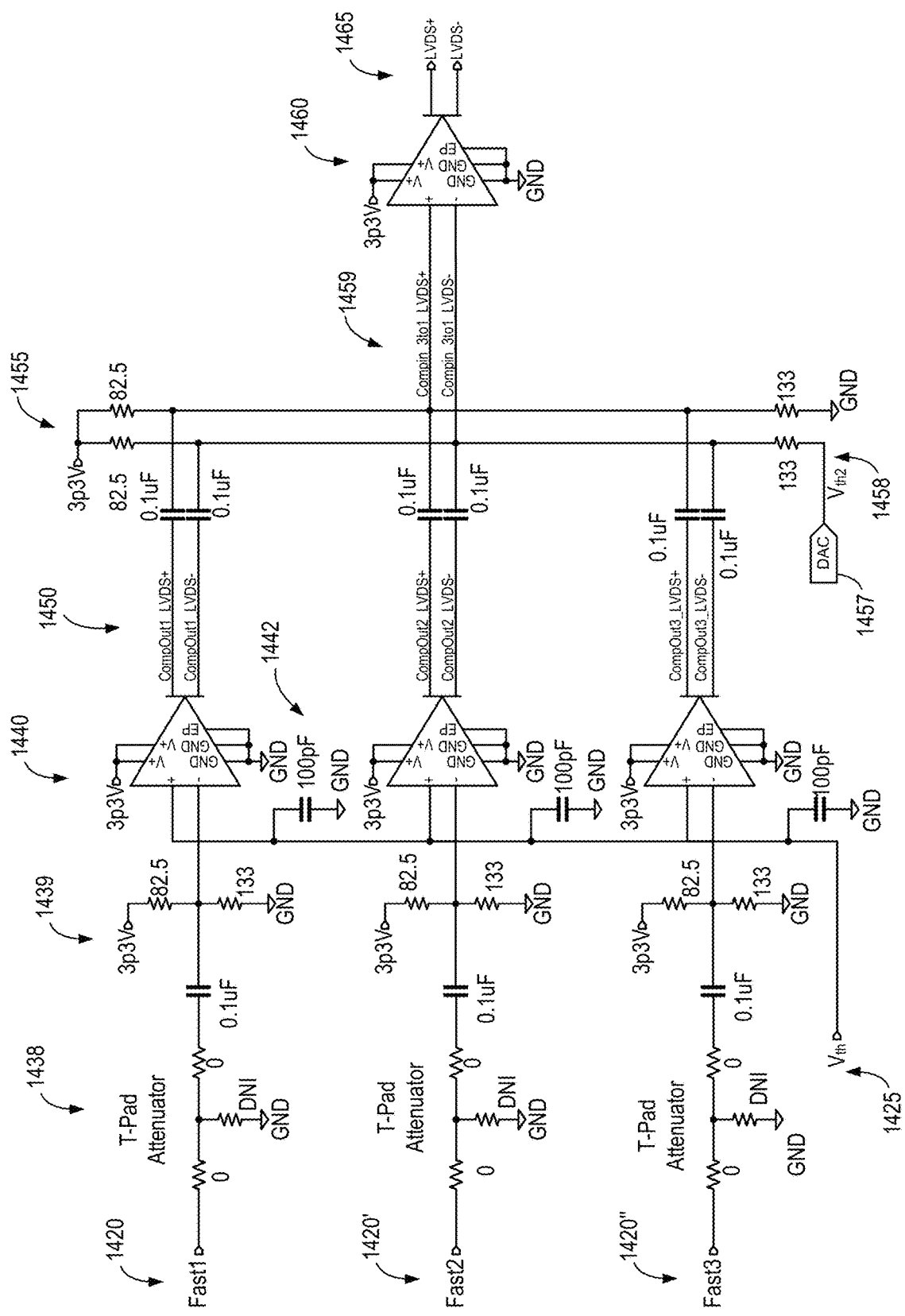
FIG. 14C illustrates an example of a programmable two-stage dual-trigger combining circuit, according to one embodiment.

FIG. 14C illustrates an example of a programmable two-stage dual-trigger combining circuit, according to one embodiment. The fast analog timing signal outputs 1420, 1420', and 1420" are capacitively coupled to the high-bandwidth comparators 1440 to generate binary time-mark signals 1450 (e.g., LVDS signals) based on the first trigger threshold 1425. Accordingly, three binary time-mark signals are generated at 1450 based on the signals from three different subarrays of combined photodetectors. In contrast to the embodiments described in conjunction with FIG. 14B, the illustrated embodiment includes a programmable digital-to-analog converter 1457 (or another programmable voltage driver) to set the target offset voltage on the resistor divider network 1455.

The programmable or adjustable offset voltage from the digital-to-analog converter 1457 operates as a second threshold trigger 1458. By implementing a programmable offset to the combining comparator 1460, the circuit of FIG. 14C becomes a two-stage, dual-trigger combiner circuit. The first stage includes the comparators 1440 to discriminate the signals from the photodetector subarrays to a minimum level of photonic signal (e.g. corresponding to the first trigger threshold 1425). The second-stage comparator functionality implements a linear combiner utilizing a final programmable discrimination threshold (second trigger threshold 1458) for combined photonic signal strength. The dual-trigger functionality is desirable in PET as it allows for multi-tiered event discrimination, which can, for example, be used to minimize false triggers occurring as a result of photodetector dark counts/signals.

For example, using a relatively low second threshold trigger 1458, a single photon signal from any of the three input channels, at 1450, may trigger the combining comparator 1460. In contrast, a higher second threshold trigger 1458 may be used to require more photons may be required before the combining comparator 1460 will trigger. With the second threshold trigger 1458 set sufficiently high, the circuit can be configured to trigger the combining comparator 1460 only after more than one of the input channels 1450 has triggered (e.g., after more than one of the binary time-mark signals 1450 are generated based the combined subarray analog detection signals from more than one of the signals 1420, 1420', and 1420" exceeding the first trigger threshold 1425. Thus, the two-stage dual-trigger combiner circuit may be used to trigger an output by the combining comparator 1460 in response to the triggering of one, two, or more of the binary time-mark signal channels 1450. The two-stage dual-trigger combiner circuit can be programmatically used to implement either an analog OR operation for photonic signal combining or an analog AND operation for photonic signal combining. The adjustable bias offset provided by the second threshold trigger 1458 can be set to a trigger point for comparator 1460 at any level within the range of the quaternary time-mark signal 1459, thereby allowing the comparator 1460 to trigger on the first, second, and/or third input to trigger the first-stage comparators 1440.

Typically, active LVDS output drivers, especially unsynchronized switching drivers, would not be connected in a directly combined passive configuration, even in the AC sense, due to substantial loading from any single driver with other drivers not switching in unison. Furthermore, multi-drop employs one transmitter for several receivers while multi-point is configured with multiple transceivers. The low impedance driver outputs 1450 of the various time-mark LVDS channels effectively load and reduce the signal swing from any single switching driver, thereby reducing signal-to-noise presented to the input of the final, combining comparator 1460. However, the low-value termination resistors 1455 and the LVDS output drivers 1440 provide a low impedance node that provides high bandwidth (e.g., maximized), which minimizes signal slope degradation and preserves the timing integrity of the time-mark's pulse or step response. Therefore, there exists a trade-off and optimization to the number of circuits, or timing channels 1420, 1420', and 1420" that can be combined. The maximum number of timing channels to be combined may be selected based on an acceptable signal-to-noise ratio at the input 1459 of the final, combining comparator 1460.

The signal 1459 is an intermediate quaternary time-mark signal, formed as a combination of the binary time-mark signals 1450 of each photodetector subarray. The intermediate quaternary time-mark signal output 1459 may provide a much lower signal swing than allowed by LVDS standards, such as a swing of only a few millivolts or tens of millivolts, instead of the minimum 100 mV differential signal swing of LVDS. One factor contributing to jitter dispersion (or the standard deviation) in timing circuits, and therefore affecting PET coincidence timing resolution, is the amount of noise present within a time-mark signal and a comparator's trigger threshold relative to a time-mark signal's rise-time. As the rise-time decreases and/or the noise increases, jitter performance degrades (i.e. jitter increases).

The low-impedance nodes present at the input 1459 of the combining comparator 1460 may be configured to maximize bandwidth so that a time-mark signal rise-time may be largely preserved compared to other higher impedance combining or multiplexing techniques. The time-mark signal swing may allowably be much lower, provided low-noise techniques prevail, versus lengthy LVDS bus lines where significant noise margin is required. Additionally, the simultaneous or successive photodiode timing signals become additive in magnitude, thereby improving signal-to-noise of the combined time-mark signal 1459 input into the final combining comparator 1460 for generation of the overall combined binary time-mark signal output 1465.

Figure 14D:
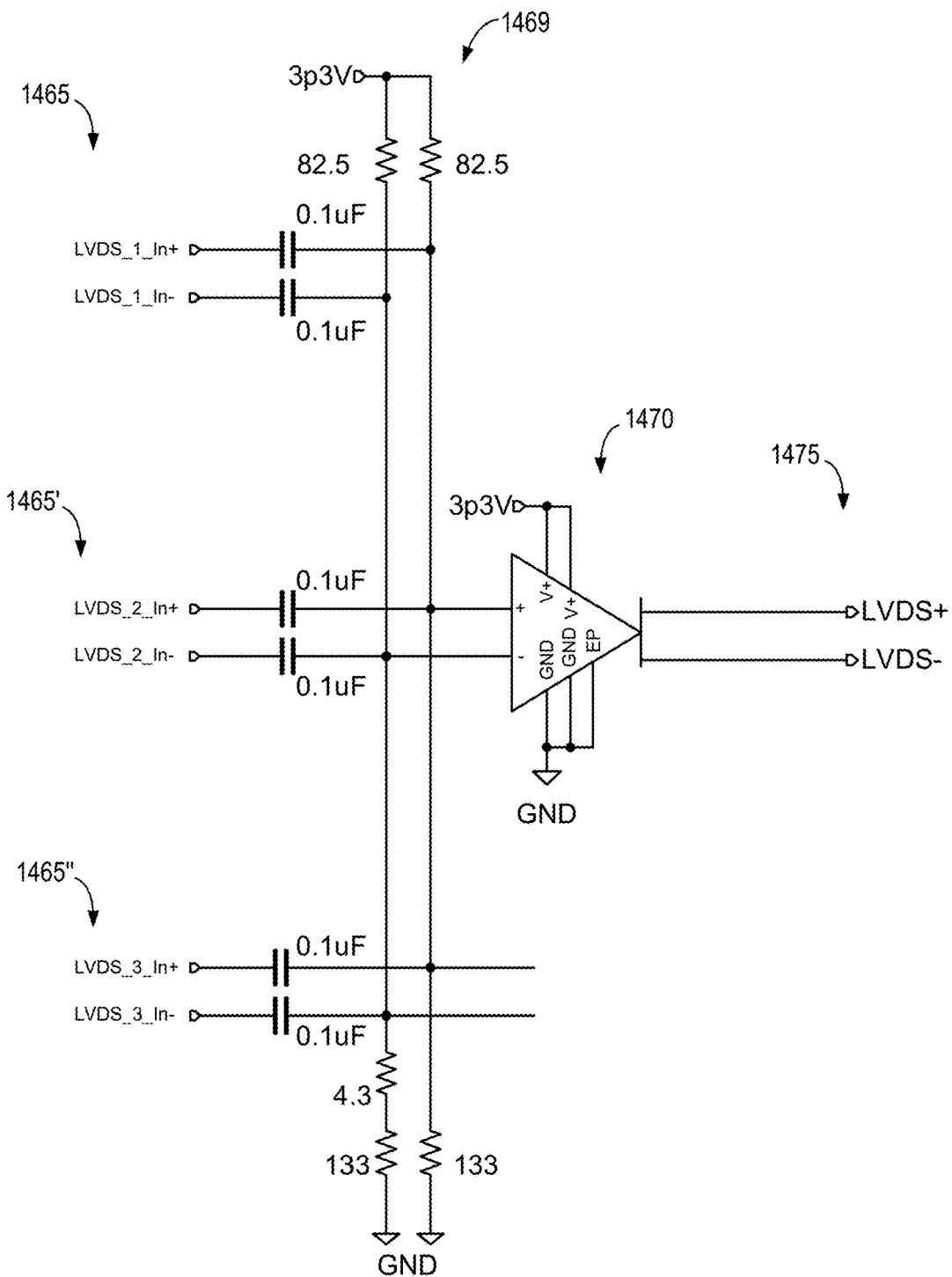
FIG. 14D illustrates an example of a subsequent-stage combining circuit to combine multiple binary timing signals into a single timing signal output, according to one embodiment.

FIG. 14D illustrates an example of a subsequent-stage combining circuit to combine multiple binary timing signals 1465, 1465', and 1465" into a subsequent output 1475 (e.g., a subsequent binary time-mark signal), according to one embodiment. As illustrated, the output 1465 of the final combining comparator 1460 (FIG. 14B) may be fed into another similar or identical combining circuit with resistor dividers 1469 to the input of the subsequent-stage combining comparator 1470 to generate a subsequent output 1475. The cumulative jitter erosion may increase with additional combining stages, which is summed by the variance of the jitter of each stage.

In some embodiments, an energy module (e.g., of a processing circuit) may determine the total energy of the scintillation event based on time-over-threshold calculation of the subsequent output 1475 (e.g., the final LVDS output signal or other binary time-mark output signal). The multi-stage cascaded combiner circuit (FIGS. 14A-14D) generates a single binary time-mark signal for each detection face (e.g., face with a photodetector thereon) based on analog signals from the subarrays of photodetectors. The output binary time-mark signal is cumulative in that the signal asserts based on the first subarray to detect the scintillation event (first to fire or trigger) and de-asserts after the last subarray ceases to detect the scintillation event (last to fire or trigger). Accordingly, the time between when the signal asserts and de-asserts corresponds to the total energy detected by the photodetectors on that face of the scintillation crystal. In some embodiments, using the processing circuit to determine the total energy based on the binary time-mark signals from the various photodetector arrays obviates the need for a dedicated or separate energy channel.

While the embodiment described above utilizes LVDS circuitry, it is appreciated that the same concepts and principles can be used to generate a more general current mode output or voltage-driven output. Furthermore, while differential switching signals with voltage swings of ±50 mV to ±100 mV are described herein, much smaller or larger signal magnitudes may be suitable in some embodiments. Moreover, an alternative circuit may generate single-ended comparator outputs, and in open-drain or open-collector configurations, such signals may be directly combined passively.

Figure 14E:
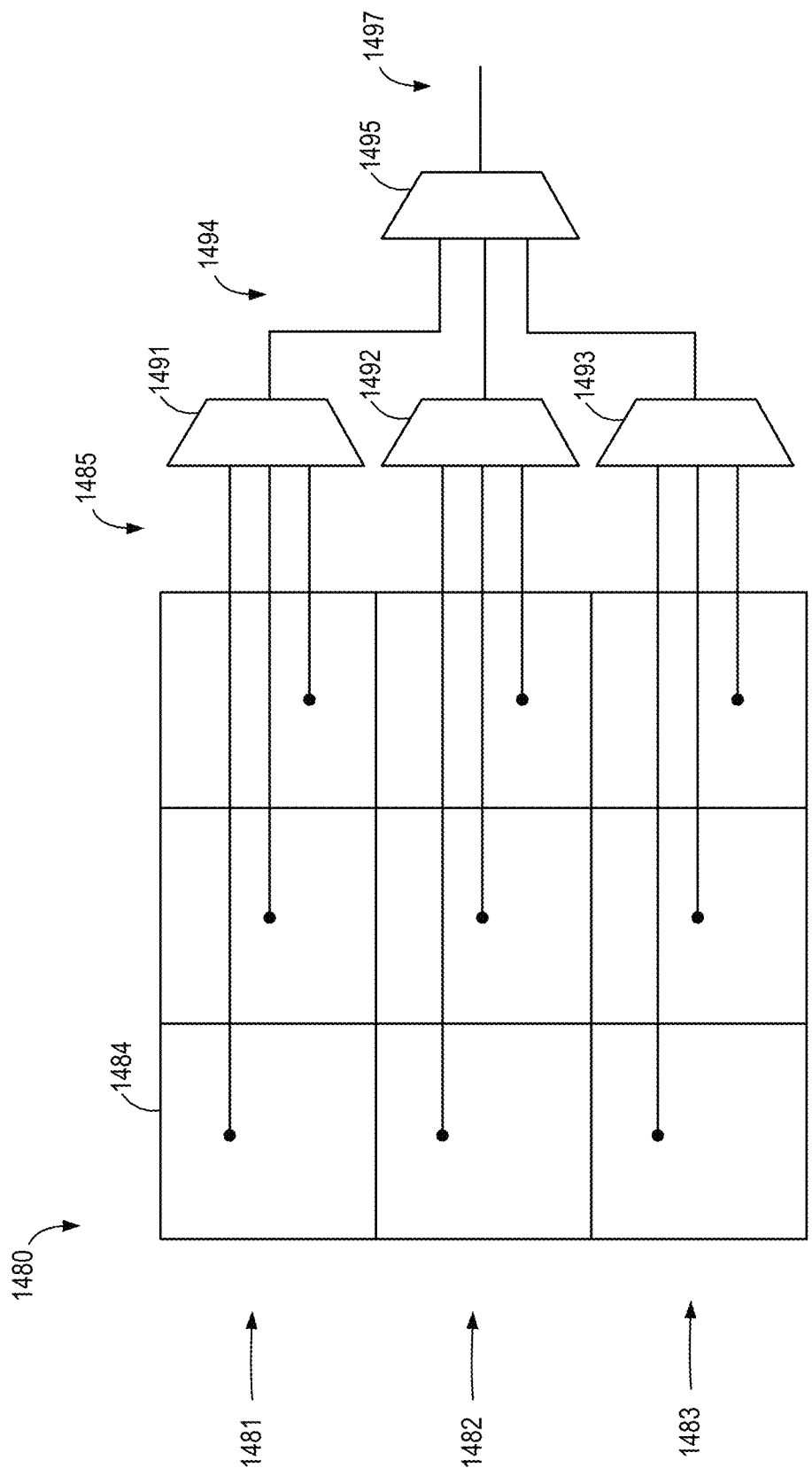
FIG. 14E illustrates a block diagram of an array of photodetector timing channels combined in cascading stages to a single timing channel, according to one embodiment.

FIG. 14E illustrates a block diagram of an array of photodetector timing channels 1485 combined in cascading stages to a single timing channel output 1497, according to one embodiment. The cascaded combining scheme combines nine photodetector timing signals 1485 from nine into one output channel 1497 via a multi-stage combining circuit. Each photodetector (or subarray of photodetectors) in a 3×3 array 1480 of photodetectors (or 3×3 array of subarrays of photodetectors) generates a timing signal 1485. Each row of photodetectors 1481, 1482, and 1483 is combined by a corresponding combiner 1491, 1492, and 1493 in the first combining stage, where each of the combiners 1491, 1492, and 1493 comprises a 3:1 combiner. A subsequent-stage combiner 1495 combines the three timing signals 1494 that are output by the first combining stage into a single output timing signal 1497. The illustrated example uses two cascading stages to combine nine inputs 1485 into a single output 1497. It is appreciated that a third cascading combining stage could be added to combine up to 27 channels. Similarly, with a fourth cascading combining stage, up to 81 timing channels could be combined into a single output channel, and so on.

In some embodiments, each box 1484 represents a subarray of two or more photodetectors, such that FIG. 14E illustrates a 3×3 array 1480 of subarrays of photodetectors. Each subarray may, for example, include four photodetectors, such that the photodetector array 1480 includes a total of 36 photodetectors, each of which may be an SiPM. Analog signals from each subarray may be combined (e.g., as described in conjunction with FIG. 14A) to form the photodetector timing signals 1485.

Figure 15:
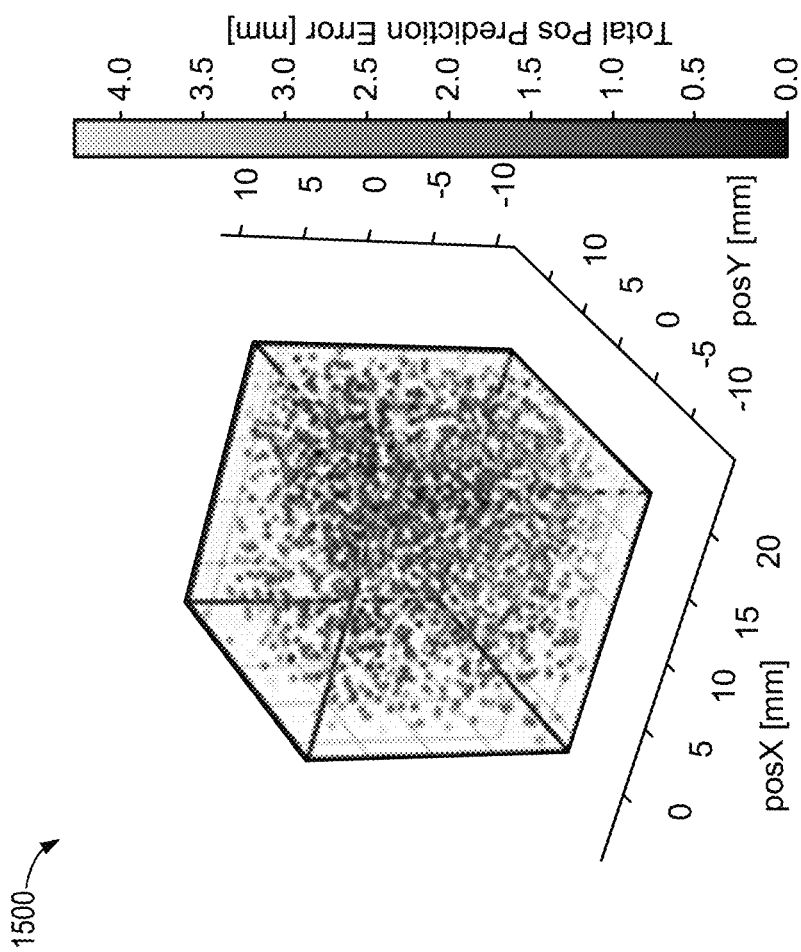
FIG. 15 illustrates that the three-dimensional position prediction error in a three-sided readout from a monolithic scintillation crystal is substantially uniform, according to one embodiment.

FIG. 15 illustrates a three-dimensional plot 1500 of a position prediction error in a configuration using 4 mm SiPMs in photodetector arrays on faces 0, 2, and 5 (e.g., a Side025 configuration) of a 20×20×20 mm$^3$ monolithic scintillation crystal, according to one embodiment. As illustrated, the position prediction error is substantially uniform across the scintillator block, demonstrating that the presently described systems and methods mitigate edge effects. In contrast, single-sided readout exhibits significant edge effects with lower position accuracy along the edges. Many of the embodiments described herein address the issue of edge effects by employing photodetector arrays on three orthogonal sides of the monolithic scintillator, thereby providing a viewing direction along each axis. This configuration ensures that position prediction remains accurate even near the edges, significantly reducing resolution loss. Consequently, the uniformity of the position prediction is enhanced across the entire scintillator block.

Extensive testing, calculations, and simulations demonstrate the functionality and benefits of the presently described systems and methods. As described herein, the transit time spread is a large contributor to coincidence time resolution and varies widely depending on the configuration from $\Gamma_T$=29.6 picoseconds (ps) for a Side015 configuration to $\Gamma_T$=167 ps for Side4 readout configuration. Transit time correction can significantly reduce IT in all cases. The processing circuit may correct the transit time, as described herein, by processing and correcting the individual outputs of each photodetector array individually.

As illustrated and described in conjunction with FIGS. 11A and 11B, the transit time can be independently corrected for each side, resulting in the corrected transit time, denoted as $\Gamma_{TE,corrected}$. For a Side5 configuration, the lowest $\Gamma_{TE,corrected}$ is 55 ps. In general, multisided configurations are improved when they include Side5 and exclude Side4. Orthogonally aligned photodetector arrays considerably increase the light transmission efficiency, as compared to configurations using the same number of photodetector arrays in a non-orthogonally aligned configuration. Since each additional photodetector array increases the cost, complexity, and energy consumption of the system, there are applications that may benefit from using various two-sided configurations, three-sided configurations, and four-sided configurations. From the perspective of optimizing for $\Gamma_{TE,corrected}$ while keeping the number of detectors low, the following configurations are useful in various different applications: Side05 (equivalents: Side15, Side25, Side35) $\Gamma_{TE,corrected}$=42 ps; Side015 (equivalent Side235) $\Gamma_{TE,corrected}$=38 ps; Side025 (equivalent Side035, Side125 and Side135) $\Gamma_{TE,corrected}$=39 ps; and Side0125 (equivalent Side0135, Side0235, Side1235) $\Gamma_{TE,corrected}$=35 ps. Other configurations exhibit significantly higher $\Gamma_{TE,corrected}$.

Simulation results are provided below for 4×4 mm SiPMs in a first-to-trigger configuration (e.g., configuration 1230 in FIG. 12C), along with a time correction module and position module (e.g., the time correction modules 1135 and the position module 1160 in FIGS. 11A and 11B). The simulation results demonstrate that a Side05 configuration has a CTR of 145 ps, a Side025 configuration has a CTR of 124 ps, a Side015 configuration has a CTR of 130 ps, and a Side0125 configuration has a CTR of 112 ps.

FIG. 16A illustrates a scintillator detector 1610 comprising a scintillation crystal with three photosensing array faces (labeled A, B, and C), according to one embodiment. Each photosensor array on each face of the scintillation crystal is illustrated as having nine photodetectors or photodetector subarrays. For example, the square B1 may represent a photodetector on the B face or a subarray of photodetectors on the B face (e.g., where each photodetector subarray comprises two or more photodetectors). In various embodiments, two photosensor faces may be used to determine a related ordinate value, provided the ordinate axis is not perpendicular to a photosensor plane. The ordinate may be determined by calculating the centroid of photoluminescence resulting from a terminated gamma scintillation. In the illustrated example, each photosensing face includes nine photosensors (or nine subarrays of photosensors comprising one or more photosensors each).

The X ordinate may be determined using the photosensor arrays of faces B and C. The Y ordinate may be determined using the photosensor array of faces A and C. The Z ordinate may be determined using the photosensor array of faces A and B.

An ordinate for a particular axis may be determined by dividing a position-weighted sum of two related photosensor array faces by the total photoluminescence measured by the same two faces. For example, the X ordinate may be determined by:

$$X = \frac{\begin{array}{c}(i_{B1}*X_1 + i_{B2}*X_2 + i_{B3}*X_3 + i_{B4}*X_4 + \\ i_{B5}*X_5 + i_{B6}*X_6 + i_{B7}*X_7 + i_{B8}*X_8 + i_{B9}*X_9) + \\ (i_{C1}*X_1 + i_{C2}*X_2 + i_{C3}*X_3 + i_{C4}*X_4 + \\ i_{C5}*X_5 + i_{C6}*X_6 + i_{C7}*X_7 + i_{C8}*X_8 + i_{C9}*X_9)\end{array}}{\begin{array}{c}(i_{B1} + i_{B2} + i_{B3} + i_{B4} + i_{B5} + i_{B6} + i_{B7} + i_{B8} + i_{B9}) + \\ (i_{C1} + i_{C2} + i_{C3} + i_{C4} + i_{C5} + i_{C6} + i_{C7} + i_{C8} + i_{C9})\end{array}}$$

Similarly, the Y ordinate may be determined by:

$$Y = \frac{\begin{array}{c}(i_{A1}*Y_1 + i_{A2}*Y_2 + i_{A3}*XY_3 + i_{A4}*Y_4 + \\ i_{A5}*Y_5 + i_{A6}*Y_6 + i_{A7}*Y_7 + i_{A8}*Y_8 + i_{A9}*Y_9) + \\ (i_{C1}*Y_1 + i_{C2}*Y_4 + i_{C3}*Y_7 + i_{C4}*Y_2 + \\ i_{C5}*Y_5 + i_{C6}*Y_8 + i_{C7}*Y_3 + i_{C8}*Y_6 + i_{C9}*Y_9)\end{array}}{\begin{array}{c}(i_{A1} + i_{A2} + i_{A3} + i_{A4} + i_{A5} + i_{A6} + i_{A7} + i_{A8} + i_{A9}) + \\ (i_{C1} + i_{C2} + i_{C3} + i_{C4} + i_{C5} + i_{C6} + i_{C7} + i_{C8} + i_{C9})\end{array}}$$

The Z ordinate may be determined by:

$$Z = \frac{\begin{array}{c}(i_{A1}*Z_1 + i_{A2}*Z_2 + i_{A3}*Z_3 + i_{A4}*Z_4 + \\ i_{A5}*Z_5 + i_{A6}*Z_6 + i_{A7}*Z_7 + i_{A8}*Z_8 + i_{A9}*Z_9) + \\ (i_{B1}*Z_3 + i_{B2}*Z_2 + i_{B3}*Z_1 + i_{B4}*Z_6 + \\ i_{B5}*Z_5 + i_{B6}*Z_4 + i_{B7}*Z_9 + i_{B8}*Z_8 + i_{B9}*Z_7)\end{array}}{\begin{array}{c}(i_{A1} + i_{A2} + i_{A3} + i_{A4} + i_{A5} + i_{A6} + i_{A7} + i_{A8} + i_{A9}) + \\ (i_{B1} + i_{B2} + i_{B3} + i_{B4} + i_{B5} + i_{B6} + i_{B7} + i_{B8} + i_{B9})\end{array}}$$

In the expressions above, "i" represents a particular photosensor signal and Xn, Yn, and Zn represent weightings applied for the weighted sum. In various embodiments, the weightings are applied such that the product of the photosensor signal and weighting results in values that correspondingly scale with the length of the related axis. For example, the weighting of photosensors B1, B2, and B3 may be twice the weighting of photosensors B4, B5, and B6 and four-hundred times that of photosensors B7, B8, and B9, resulting in growing magnitudes of the X ordinate as a scintillation event occurs more toward the B1, B2, and B3 photosensors. The weightings may be similarly applied to face C when determining the Z ordinate.

FIG. 16B illustrates a table 1620 of example position weightings for a complete three-dimensional determination of X, Y, and Z ordinates, according to one embodiment. In some embodiments, the photosensor arrangement of each face is configured such that the strongest weighted sensors provide symmetry enabling the use of substantially similar readout hardware for each side. Immediate position determination may be obtained in a hardware circuit using, for example, analog summing and dividing circuits. The gain of the circuits may be used to realize the sum-products described above.

Upon determination of three-dimensional positioning (e.g., by position module 1160), the system (e.g., the position module 1160) may output an equivalent voxel identifier, as shown in FIG. 16A. The voxel identification, which may correspond to the limits of position resolution of the detector, may enable more efficient PET image reconstruction as compared to the use of direct three-dimensional ordinates.

Figure 16C:
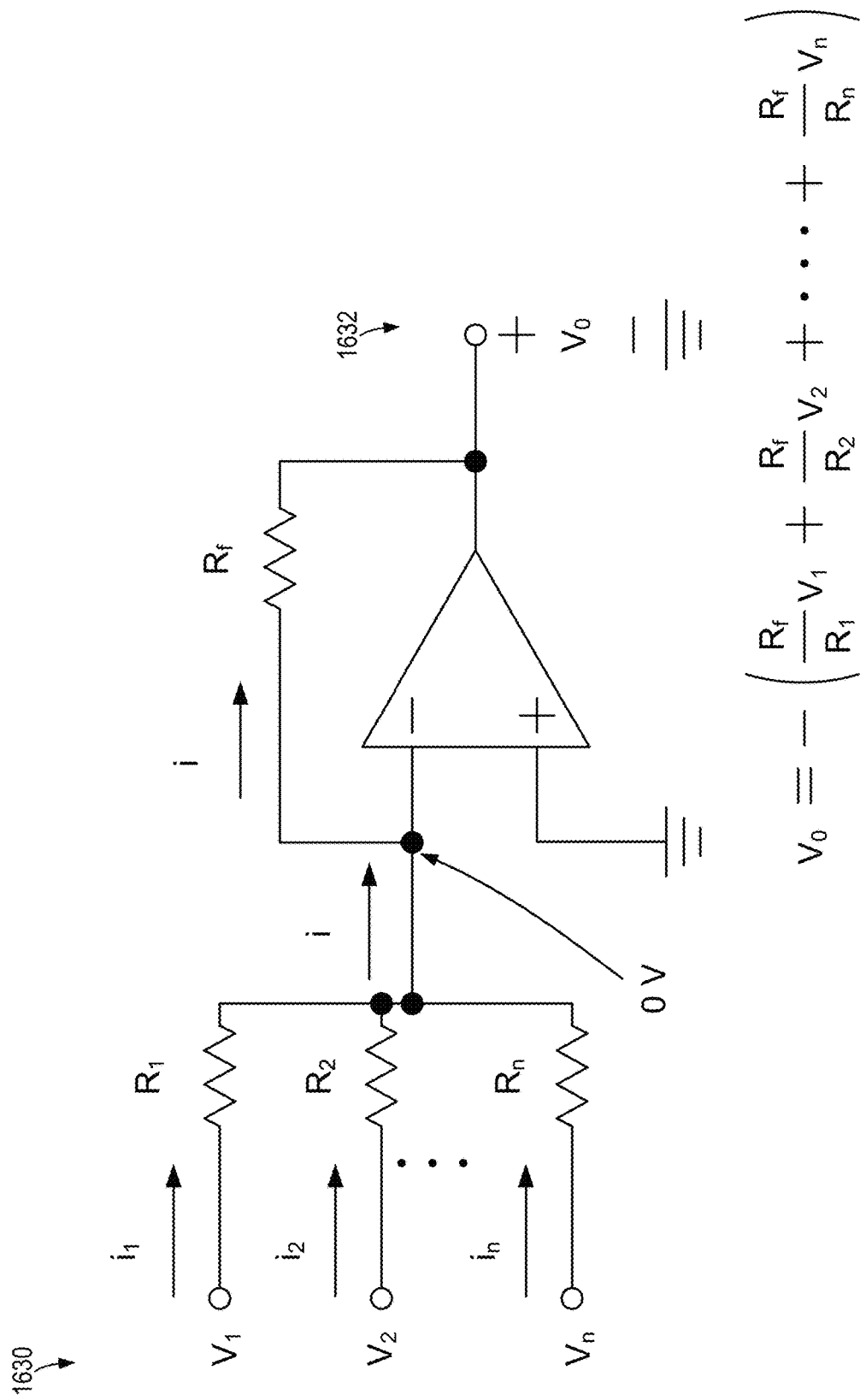
FIG. 16C illustrates an example of a weighted summing circuit that sums independent input voltages, according to one embodiment.

FIG. 16C illustrates an example of a weighted summing circuit that sums independent input voltages 1630 with an inverting gain of Rf/Rn, according to one embodiment. The output 1632 of the circuit is the weighted sum of the input voltages 1630.

Figure 16D:
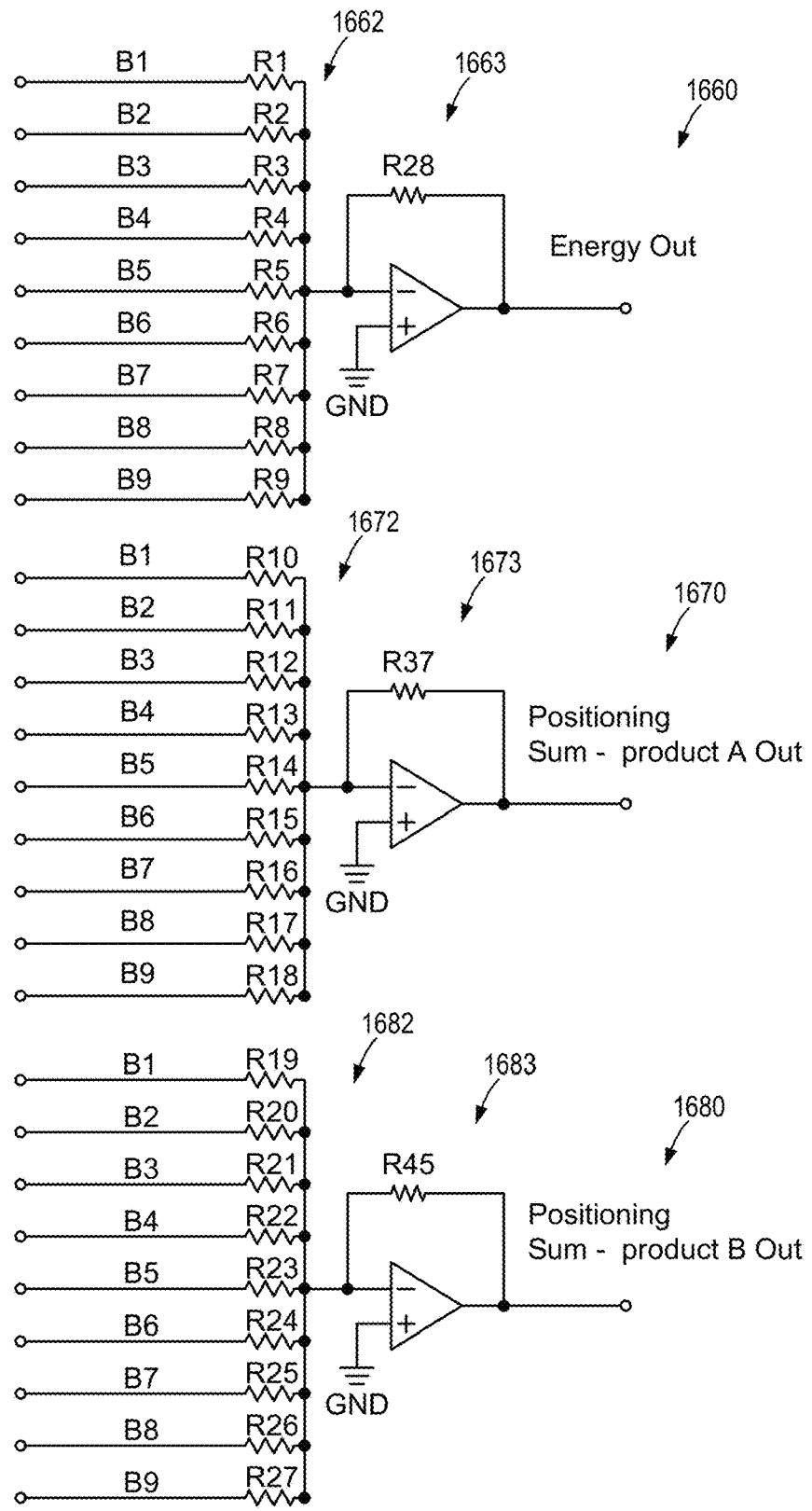
FIG. 16D illustrates an example of a circuit to generate a weighted summing of one face of the scintillator detector, according to one embodiment.

FIG. 16D illustrates an example of a circuit to generate a weighted summing of one face of the scintillation crystal, according to one embodiment. For example, the illustrated circuit may generate a weighted sum of the 'B' face of the scintillation crystal of the scintillator detector 1610 in FIG. 16A. The energy output 1660 utilized within the denominator, is configured to provide an equally weighted summation, with both input resistors 1662 and gain resistor 1663 equal (e.g., 1 kΩ, 5 kΩ, 10 kΩ, etc.). The unique sum-products 1670 and 1680 implemented by the other two lower operational amplifier circuits are utilized within the numerators for the determination of the X and Z ordinates, as expressible by the equations above. The gain resistors 1673 and 1683 may be, for example, 2500 and, combined with input resistor values 1672 and 1682 of, for example, either 500, 100Ω, or 20,0000, results in weightings of 5, 2.5, or 0.0125, corresponding to the values in the table of FIG. 16B. The outputs 1670 and 1680 of these weighted summing circuits, for example, may be further summed by additional inverted weighted summing circuits to accomplish the total non-inverted formulation of any numerator or denominator used for the determination of X, Y, and Z ordinate calculations.

In some embodiments, division operations may be accomplished via analog means or analog-to-digital conversion with ensuing digital division. Advantages of the illustrated approach for the determination of a centroid of photoluminescence include immediate formulation of numerator, denominator, and/or quotient positioning calculations for high count-rate acquisition of PET events.

In an alternative embodiment, the determination of the X, Y, and Z ordinates is simplified by using the total energy ($E_{tot}$) instead of the sum of energies from the related photosensor array faces. This approach deviates from the traditional center of gravity method, which reduces the number of electronic components and ADC converters. In this approach, the denominator that is used is the output of the Energy module, $E_{tot}$. The position determination formulars include the X ordinate expressible as:

$$X = \frac{\begin{array}{c}(i_{B1}*X_1 + i_{B2}*X_2 + i_{B3}*X_3 + i_{B4}*X_4 + \\ i_{B5}*X_5 + i_{B6}*X_6 + i_{B7}*X_7 + i_{B8}*X_8 + i_{B9}*X_9) + \\ (i_{C1}*X_1 + i_{C2}*X_2 + i_{C3}*X_3 + i_{C4}*X_4 + \\ i_{C5}*X_5 + i_{C6}*X_6 + i_{C7}*X_7 + i_{C8}*X_8 + i_{C9}*X_9)\end{array}}{E_{tot}}$$

Similarly, the Y ordinate may be determined by:

$$Y = \frac{\begin{array}{c}(i_{A1}*Y_1 + i_{A2}*Y_2 + i_{A3}*XY_3 + i_{A4}*Y_4 + \\ i_{A5}*Y_5 + i_{A6}*Y_6 + i_{A7}*Y_7 + i_{A8}*Y_8 + i_{A9}*Y_9) + \\ (i_{C1}*Y_1 + i_{C2}*Y_4 + i_{C3}*Y_7 + i_{C4}*Y_2 + \\ i_{C5}*Y_5 + i_{C6}*Y_8 + i_{C7}*Y_3 + i_{C8}*Y_6 + i_{C9}*Y_9)\end{array}}{E_{tot}}$$

The Z ordinate may be determined by:

$$Z = \frac{\begin{array}{c}(i_{A1}*Z_1 + i_{A2}*Z_2 + i_{A3}*Z_3 + i_{A4}*Z_4 + \\ i_{A5}*Z_5 + i_{A6}*Z_6 + i_{A7}*Z_7 + i_{A8}*Z_8 + i_{A9}*Z_9) + \\ (i_{B1}*Z_3 + i_{B2}*Z_2 + i_{B3}*Z_1 + i_{B4}*Z_6 + \\ i_{B5}*Z_5 + i_{B6}*Z_4 + i_{B7}*Z_9 + i_{B8}*Z_8 + i_{B9}*Z_7)\end{array}}{E_{tot}}$$

This approach is feasible due to the multiple viewing angles provided by the multi-sided photodetector arrays that provide highly accurate position information.

FIG. 17A illustrates a detector module 1701 with a two-dimensional array of elongated scintillation crystals, including scintillation crystal 1710. End-readout photodetectors are positioned on the end of each scintillation crystal. For example, photodetector 1712 is positioned on the end of scintillation crystal 1710.

FIG. 17B illustrates a detector module 1702 with a two-dimensional array of elongated scintillation crystals, including scintillation crystal 1720. The photodetectors are positioned on the lateral side of each scintillation crystal. For example, the photodetector 1722 is positioned on the lateral side of the scintillation crystal 1720. The detector modules 1701 and 1702 utilize pixelated high aspect ratio scintillation arrays.

FIG. 17C illustrates a detector module 1703 according to one example of the described systems and methods in which an independent or distinct photodetector array is positioned on more than one side of each scintillation crystal. In the illustrated example, the scintillation crystal 1730 includes a photodetector array 1733 on face 0, a photodetector array 1732 on face 3, and a photodetector array 1734 on the end-face 5 (the back side, which is not visible). Each of the other scintillation crystals in the 2×3 array of scintillation crystals also has three photodetectors positioned on the faces 0, 3, and 5.

In the illustrated example, each scintillator detector in the gamma radiation detector module 1703 comprises a monolithic scintillation crystal, three photodetector arrays on orthogonal faces of the monolithic scintillation crystal, and associated processing circuitry. The spacing between individual scintillator detectors in the 2×3 array is based on the thickness of the photodetector arrays, which may span, for example, 100 μm to 3 mm. As in previously described embodiments, each photodetector array may comprise a plurality of individual photodetectors (e.g., a two-dimensional array of SiPMs). The 2×3 array of scintillator detectors forms a detector module. A radial sector may include multiple detector modules, and a ring may be formed from multiple radial sectors.

Figure 18A:
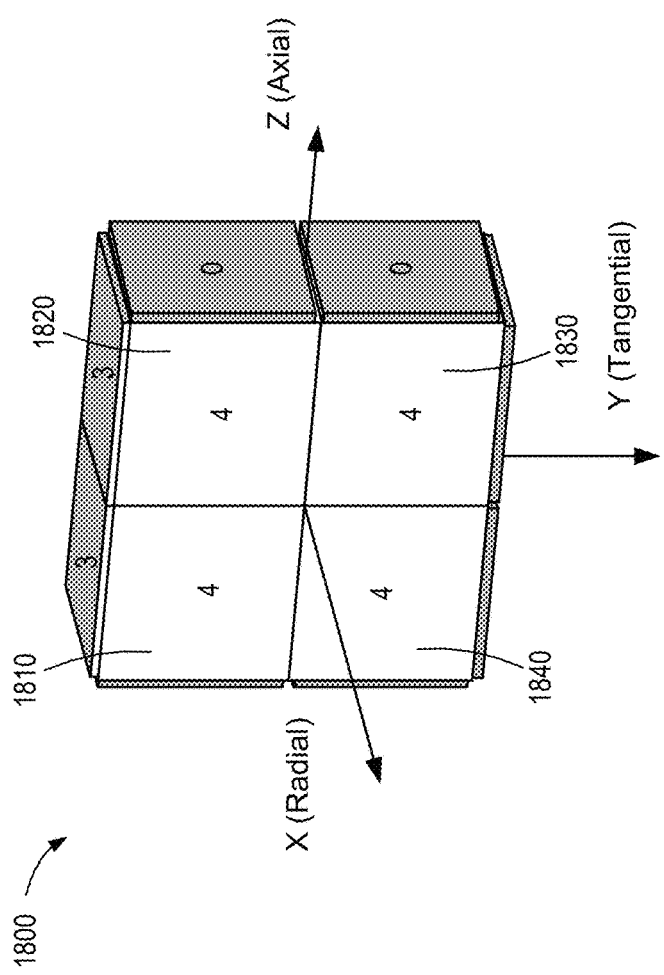
FIG. 18A illustrates an example of a radiation detector module with four scintillator detectors arranged in a 2×2 array, according to one embodiment.

FIG. 18A illustrates an example of a radiation detector module 1800 with four scintillator detectors arranged in a 2×2 array, where each scintillator detector comprises a scintillation crystal 1810, 1820, 1830, and 1840 and multiple photodetector arrays. As illustrated, a photodetector array is positioned on multiple faces of each scintillation crystal 1810, 1820, 1830, and 1840. The photodetector arrays are placed on the lateral faces in a rotated configuration that allows for the inner faces of the scintillation crystals to be in direct contact with one another, separated only by the reflective material on each of the inner faces face. Accordingly, the photodetector arrays on lateral faces of the scintillation crystals in the 2×2 array of scintillator detectors are positioned on faces that are nonadjacent to the other scintillation crystals in the 2×2 array of scintillator detectors. As illustrated, scintillation crystal 1810 includes photodetector arrays on faces 1, 3, and 5 (face 5 is the back side and is not visible). Scintillation crystal 1820 includes photodetector arrays on faces 0, 3, and 5. Scintillation crystal 1830 includes photodetector arrays on faces 0, 2, and 5. Scintillation crystal 1840 includes photodetector arrays on faces 1, 2, and 5.

The radiation detector module 1800 includes a 2×2 array of scintillator detectors in a configuration that utilizes the virtual crystal as detector area. The inner end-faces of the four scintillation crystals (face 4) are configured to be radially oriented into the detector volume (e.g., into a detector ring). Each lateral face of each scintillation crystal with reflective material is in contact with a lateral face of another scintillation crystal with reflective material. The inter-crystal spacing of the scintillation crystals within the detector module 1800 is minimized while still allowing for each scintillation crystal to have a photodetector array on multiple orthogonal faces.

Figure 18B:
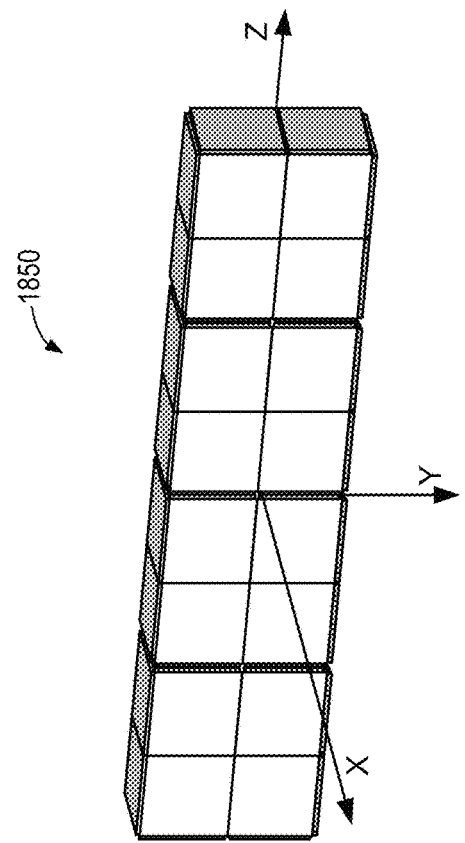
FIG. 18B illustrates a radial sector with four radiation detector modules, according to one embodiment.

FIG. 18B illustrates a radial sector 1850 with four radiation detector modules (similar to radiation detector module 1800 of FIG. 18A). Each radiation detector module includes four scintillator detectors, where each scintillator detector includes a scintillation crystal with orthogonal photodetector arrays on multiple sides, as described in conjunction with FIG. 18A. In this configuration, the photodetectors occupy the virtual crystal gap between adjacent radiation detector modules. In some embodiments, each radial sector may include more modules. A detector ring may include any number of radial sectors to achieve a target diameter with a relatively close spacing of radial sectors. A PET scanner may include any number of axially aligned detector rings.

The photodetectors of each scintillator detector in the radiation detector module are positioned within a virtual crystal gap between adjacent radiation detector modules of the radial sector 1850. The virtual crystal gap between adjacent radiation detector modules may be configured to have a width or crystal gap spacing corresponding to an integer multiple of a spatial resolution bin size of the radiation detector modules. For example, the virtual crystal gap between adjacent radiation detector modules may be configured to have a width equal to the spatial resolution bin size of the detector module, equal to two times the spatial resolution bin size, equal to three times the spatial resolution bin size, etc.

Figure 19A:
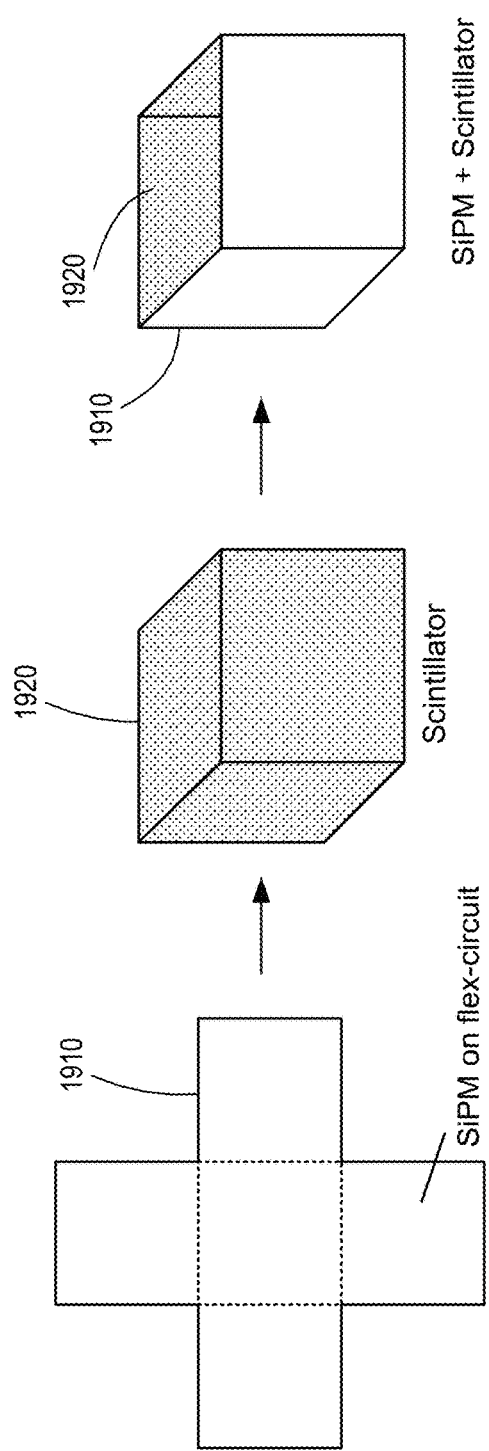
FIG. 19A illustrates an example set of SiPMs on a flex-circuit that can be applied to a scintillation crystal, according to one embodiment.

FIG. 19A illustrates an example set of SiPMs on a flex-circuit 1910 that can be applied to a scintillation crystal 1920. The photodetector arrays are formed by the SiPMs on the flex-circuit 1910, which is later applied to the scintillation crystal 1920. As illustrated, the flex-circuit 1910 is wrapped around the scintillation crystal 1920.

Figure 19B:
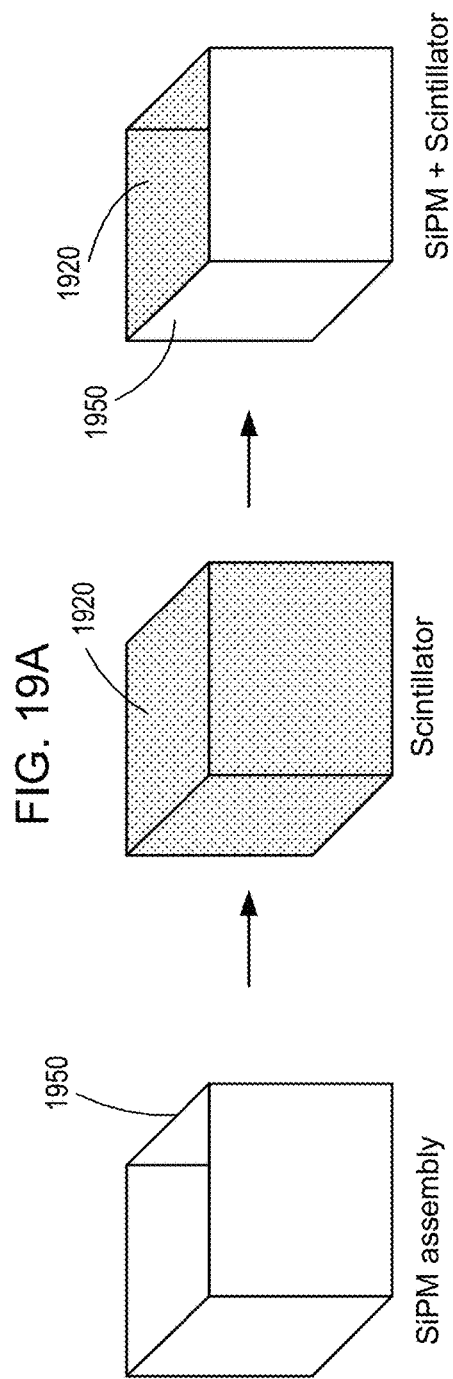
FIG. 19B illustrates another embodiment in which the SiPMs of the photodetector arrays are pre-assembled as a box, according to one embodiment.

FIG. 19B illustrates another embodiment in which the SiPMs of the photodetector arrays are pre-assembled as a box 1950. The scintillation crystal 1920 is inserted into the pre-assembled as a box 1950. Any one of the sides may be configured with SiPMs to provide a photodetector array. Similarly, any one of the sides may be omitted or comprise only a reflective material. The presently described systems and methods are not restricted to a scintillator of cubical shape with dimensions of 20×20×20 mm$^3$. Instead, it is appreciated that various shapes and formats of scintillation crystals may be utilized.

FIG. 20 illustrates examples of scintillators 2010, 2020, and 2030 with various possible geometries. As illustrated, the scintillator 2010 may be shaped as a prism with parallel sides, allowing for a simple and versatile geometry. Alternatively, the scintillator 2020 can be configured with tapered sides configured to align in a circular pattern. This design facilitates the creation of wedge-shaped or pie-slice segments that can be arranged radially without gaps that would otherwise be present, such as in using a rectangular cube, and therefore increases detector and scanner sensitivity.

The scintillator 2030 may comprise multiple smaller components that are securely bonded or otherwise joined or positioned together using, for example, a refractive index-matching liquid. This method ensures the continuity of the crystal structure, minimizes light scattering, and optimizes the overall performance of the scintillator. Such construction may be advantageous for manufacturability and cost. This flexibility in the scintillator's shape and assembly allows for a wide range of applications and performance characteristics, thereby enhancing its utility in various detection systems.

FIG. 21A illustrates scintillation crystals 2100 that are aligned along their detection faces receive a gamma-ray substantially perpendicular to the inner end-faces of each respective scintillation crystal. As illustrated, the SiPM board between the two scintillation crystals 2100 represents a gap where a gamma-ray may go undetected.

FIG. 21B illustrates scintillation crystals 2110 that are angled to reduce or eliminate the gap between the adjacent scintillation crystals 2110. For example, the scintillation crystals 2110 may be rotated around the axis between 5 and 25 degrees, such that the inner end-face is radially oriented into a detection volume (e.g., a center or central region of a detector ring) at an off-normal angle. In some example embodiments, a rotation of between 7 and 16 degrees in either an axial direction or a tangential direction is used in conjunction with scintillation crystals having dimensions between 15 and 30 mm and inter-crystal gaps between 0.5 and 3 mm.

Many existing computing devices and infrastructures may be used in combination with the presently described systems and methods. Some of the infrastructure that can be used with embodiments disclosed herein is already available, such as processors, microprocessors, microcontrollers, computer programming tools and techniques, digital storage media, image processor devices, imaging processing techniques, and communication links. Many of the systems, subsystems, modules, components, and the like that are described herein improve temporal resolution, improve position delineation for a given positron's line-of-response in order to reduce parallax error, increase sensitivity to afford better image clarity, reduce scan duration, and/or reduce patient radiation exposure. The systems, subsystems, modules, and components may be implemented as hardware, firmware, and/or software, as understood by those of skill in the art and in the context of the associated description thereof. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific function.

It is also appreciated that two or more of the systems, subsystems, components, modules, etc., that are described herein may be combined as a single system, subsystem, module, or component. Moreover, many of the systems, subsystems, components, and modules may be duplicated or further divided into discrete systems, subsystems, components, or modules to perform subtasks of those described herein. Any of the embodiments described herein may be combined with any combination of other embodiments described herein.

The components of some of the disclosed embodiments are described and illustrated in the figures. herein. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. Many of the illustrations are provided in a block diagram format to illustrate a general configuration and may not be drawn to scale. The right to add any described embodiment or feature to any one of the figures and/or as a new figure is explicitly reserved.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

Clause 1. A gamma radiation detector module, comprising: an array of scintillator detectors to be positioned on a detector ring with axial, tangential, and radial axes, wherein each scintillator detector includes: a monolithic scintillation crystal with: an inner end-face to be radially oriented into the detector ring to receive a gamma photon into the scintillation crystal, an outer end-face to be radially oriented outward and opposite the inner end-face, opposing first and second lateral faces to be axially oriented with respect to the detector ring, and opposing third and fourth lateral faces to be tangentially oriented with respect to the detector ring; a set of photodetector arrays to detect scintillation photons, including at least a first photodetector array positioned on the outer end-face, and a second photodetector array positioned on one of the lateral faces; and reflective material to reflect scintillation photons, the reflective material positioned on each face of the scintillation crystal without a photodetector array.

Clause 2. The gamma radiation detector module of clause 1, wherein each scintillation crystal comprises a cuboid, such that the first photodetector array is substantially orthogonal to the second photodetector array.

Clause 3. The gamma radiation detector module of clause 1, wherein each photodetector array comprises a silicon photomultiplier (SiPM).

Clause 4. The gamma radiation detector module of clause 1, wherein each photodetector array comprises multiple silicon photomultipliers (SiPMs) in an N×M array, wherein N and M are each an integer.

Clause 5. The gamma radiation detector module of clause 1, wherein the reflective material is positioned on at least the inner end-face.

Clause 6. The gamma radiation detector module of clause 1, wherein the second photodetector array is positioned on one of: the axially oriented first lateral face and the axially oriented second lateral face.

Clause 7. The gamma radiation detector module of clause 1, wherein the second photodetector array is positioned on one of: the tangentially oriented third lateral face and the tangentially oriented fourth lateral face.

Clause 8. The gamma radiation detector module of clause 1, wherein at least some of the photodetector arrays are positioned within a virtual crystal gap between the gamma radiation detector module and an adjacent gamma radiation detector module.

Clause 9. The gamma radiation detector module of clause 8, wherein the virtual crystal gap spacing between adjacent gamma radiation detector modules is an integer multiple of a spatial resolution bin size of the radiation detector module.

Clause 10. The gamma radiation detector module of clause 1, wherein the set of photodetector arrays of each scintillator detector includes a fourth photodetector array positioned on another of the lateral faces of each respective scintillation crystal.

Clause 11. The gamma radiation detector module of clause 1, wherein each scintillation crystal has dimensions of length, width, and height that differ by no more than 75% from one another.

Clause 12. The gamma radiation detector module of clause 11, wherein at least two dimensions of each scintillation crystal are equal.

Clause 13. The gamma radiation detector module of clause 11, wherein a volume of each scintillation crystal is at least 500 cubic millimeters.

Clause 14. The gamma radiation detector module of clause 11, wherein a volume of each scintillation crystal is at least 2,000 cubic millimeters.

Clause 15. The gamma radiation detector module of clause 1, wherein the reflective material comprises at least one of an enhanced specular reflector (ESR) material, a specular reflector material, a diffuse reflector material, and a retroreflective material.

Clause 16. The gamma radiation detector module of clause 1, wherein each scintillator detector further comprises a processing circuit with an electronic timing readout channel for the photodetector array on each face, including at least a first electronic timing readout channel for the first photodetector array on the outer end-face and a second electronic timing readout channel for the second photodetector array on one of the lateral faces.

Clause 17. The gamma radiation detector module of clause 16, wherein the electronic timing readout channels of each photodetector array have an identical electrical length.

Clause 18. The gamma radiation detector module of clause 16, wherein each electronic timing readout channel comprises a leading-edge discriminator and a time-to-digital converter (TDC), including at least a first leading-edge discriminator and a first TDC connected to the first photodetector array on the outer end-face and a second leading-edge discriminator and a second TDC connected to the second photodetector array on one of the lateral faces.

Clause 19. The gamma radiation detector module of clause 18, wherein each leading-edge discriminator circuit generates a side event timing signal based on a detection signal from at least one photodetector in a corresponding photodetector array that first exceeds a detection threshold during a given scintillation event, including at least a first side event timing signal for the first photodetector array on the outer end-face and a second side event timing signal for the second photodetector array on one of the lateral faces.

Clause 20. The gamma radiation detector module of clause 19, wherein each leading-edge discriminator circuit generates the side event timing signal based on a detection signal from a subarray of photodetectors in a corresponding photodetector array that first exceeds a detection threshold during a given scintillation event.

Clause 21. The gamma radiation detector module of clause 19, wherein the processing circuit further comprises a time estimation module to generate a total event timing signal based on the side event timing signals from each of the leading-edge discriminator circuits.

Clause 22. The gamma radiation detector module of clause 19, wherein the processing circuit further comprises: a position module to calculate location information of the scintillation event based on detection signals from at least two different photodetector arrays of the scintillation detector, including at least a first detection signal from the first photodetector array on the outer end-face and a second detection signal from the second photodetector array on one of the lateral faces; and at least one time correction module to adjust the side event timing signal of each photodetector array based on the calculated location information of the scintillation event, thereby forming at least a first adjusted side event timing signal for the first photodetector array on the outer end-face and a second adjusted side event timing signal for the second photodetector array on one of the lateral faces.

Clause 23. The gamma radiation detector module of clause 22, wherein the processing circuit further comprises a time estimation module to generate a total event timing signal based on the adjusted side event timing signals from each of the at least one time correction module.

Clause 24. The gamma radiation detector module of clause 22, wherein the position module calculates the location information of the scintillation event using one of a center of gravity method, a center of photoluminescence method, a truncated center of gravity method, a truncated center of photoluminescence method, a circle-of-progression detection method, a position-weighted center of photoluminescence method, and a position-weighted center of gravity method.

Clause 25. The gamma radiation detector module of clause 22, wherein the processing circuit further comprises a diagnostic module configured to identify an error in a photodetector array based on deviations in the detection signal of at least one of the photodetector arrays that results in erroneous calculations of the location information of the scintillation event.

Clause 26. The gamma radiation detector module of clause 22, wherein the processing circuit further comprises an amplitude correction module to adjust an amplitude time walk of a detection signal from at least one of the photodetector arrays based on the calculated location information of the scintillation event.

Clause 27. The gamma radiation detector module of clause 22, wherein the position module is configured to calculate the location information of the scintillation event based on at least one of: independent scintillation event timing signals from at least two different photodetector arrays of the scintillation detector, and independent scintillation event positioning signals from at least two different photodetector arrays of the scintillation detector.

Clause 28. The gamma radiation detector module of clause 16, wherein the processing circuit determines a total energy of a scintillation event based on a sum of energy signals from all the photodetector arrays of the scintillation detector.

Clause 29. The gamma radiation detector module of clause 16, wherein each photodetector array comprises a plurality of subarrays of photodetectors, wherein each subarray of photodetectors comprises at least two photodetectors.

Clause 30. The gamma radiation detector module of clause 29, wherein each analog-to-digital timing channel comprises a subarray combining circuit for each subarray of photodetectors, each subarray combining circuit configured to sum analog detection signals of the photodetectors in a respective subarray of photodetectors and generate a subarray analog detection signal.

Clause 31. The gamma radiation detector module of clause 30, wherein each analog-to-digital timing channel comprises at least one two-stage combining circuit, each two-stage combining circuit comprising: a comparator for each of at least two subarrays of photodetectors, each comparator configured to receive the subarray analog detection signal of one of the subarrays of photodetectors and generate a binary time-mark signal based on the subarray analog detection signal exceeding a subarray trigger threshold; and a combining comparator to combine the binary time-mark signals from each comparator of each of the at least two subarrays of photodetectors to generate an intermediate binary time-mark signal.

Clause 32. The gamma radiation detector module of clause 31, wherein each photodetector array comprises at least four subarrays of photodetectors, and wherein each analog-to-digital timing channel comprises at least two two-stage combining circuits.

Clause 33. The gamma radiation detector module of clause 32, wherein each analog-to-digital timing channel comprises at least one subsequent-stage combining circuit, each subsequent-stage combining circuit comprising: a subsequent-stage combining comparator to combine the intermediate binary time-mark signals from at least two two-stage combining circuits to generate a subsequent binary time-mark signal.

Clause 34. The gamma radiation detector module of clause 33, wherein each subarray of photodetectors comprises four photodetectors, wherein each photodetector array comprises nine subarrays of photodetectors, wherein each analog-to-digital timing channel comprises nine subarray combining circuits, wherein each analog-to-digital timing channel comprises at least three two-stage combining circuits to generate three intermediate binary time-mark signals, each two-stage combining circuit comprising: three comparators, each comparator configured to receive the subarray analog detection signal of one of the subarrays of photodetectors and generate a binary time-mark signal based on the respective subarray analog detection signal exceeding a subarray trigger threshold, and a combining comparator to combine the three binary time-mark signals from the three comparators to generate an intermediate binary time-mark signal, wherein each analog-to-digital timing channel comprises one subsequent-stage combining circuit configured to combine the three two-stage binary time-mark signals from the three two-stage combining circuits to generate a subsequent binary time-mark signal.

Clause 35. The gamma radiation detector module of clause 1, wherein the set of photodetector arrays includes a third photodetector array positioned on another of the lateral faces.

Clause 36. The gamma radiation detector module of clause 35, wherein the second photodetector array is positioned on one of: the axially oriented first lateral face and the axially oriented second lateral face, and wherein the third photodetector array is positioned on one of: the tangentially oriented third lateral face and the tangentially oriented fourth lateral face.

Clause 37. The gamma radiation detector module of clause 36, wherein each scintillation crystal comprises a cuboid, such that the first, second, and third photodetector arrays are orthogonal to one another.

Clause 38. The gamma radiation detector module of clause 37, wherein the array of scintillation detectors comprises four scintillation detectors arranged in a 2×2 configuration.

Clause 39. The gamma radiation detector module of clause 38, wherein each lateral face with reflective material of each scintillation crystal is in contact with a lateral face with reflective material of another scintillation crystal.

Clause 40. The gamma radiation detector module of clause 38, wherein the array of scintillation detectors arranged in the 2×2 configuration is configured to be a detector module of a radial sector, wherein each radial sector comprises six detector modules, and wherein the detector ring comprises sixty radial sectors.

Clause 41. The gamma radiation detector module of clause 40, wherein the photodetectors of each scintillation detector are positioned within a virtual crystal gap between adjacent modules in each radial sector.

Clause 42. The gamma radiation detector module of clause 41, wherein the virtual crystal gap between adjacent modules has a width corresponding to an integer multiple of a spatial resolution bin size of the detector module, where the integer multiple is at least 1.

Clause 43. A gamma radiation scintillator detector comprising: a monolithic scintillator with at least six faces; a first photodetector array on a first face of the monolithic scintillator; a second photodetector array on a second face of the monolithic scintillator, wherein the first face is nonparallel with the second face; and reflective material positioned on at least each face without a photodetector array.

Clause 44. The scintillator detector of clause 43, wherein the first face and the second face are orthogonal.

Clause 45. The scintillator detector of clause 43, wherein the monolithic scintillator comprises a cuboid.

Clause 46. The scintillator detector of clause 43, further comprising: a third photodetector array on a third face of the monolithic scintillator.

Clause 47. The scintillator detector of clause 46, wherein the third face is nonparallel with the second face and nonparallel with the first face.

Clause 48. The scintillator detector of clause 46, wherein the first face, the second face, and the third face are all orthogonal to one another.

Clause 49. The scintillator detector of clause 48, wherein the monolithic scintillator comprises a fourth face configured to be positioned to receive a gamma photon into the monolithic scintillator.

Clause 50. The scintillator detector of clause 49, wherein at least one of the first face, the second face, and the third face are opposite the fourth face.

Clause 51. The scintillator detector of clause 43, further comprising: a first analog-to-digital timing channel for the first photodetector array of the first face; and a second analog-to-digital timing channel for the second photodetector array of the second face.

Clause 52. The scintillator detector of clause 51, wherein each analog-to-digital timing channel comprises: an analog pulse shaping module to shape analog signals from the respective photodetector array; a combining module to combine the shaped analog signals from the respective photodetector array; and a time module to generate a digital timing signal for the respective photodetector array of each respective face.

Clause 53. The scintillator detector of clause 51, wherein each photodetector array comprises a plurality of subarrays of photodetectors, and wherein each analog-to-digital timing channel comprises: a subarray combining circuit for each of the plurality of subarrays of photodetectors, each subarray combining circuit configured to sum detection signals of the photodetectors in one of the subarrays of photodetectors; an analog pulse shaping module to shape analog signals from each subarray combining circuit; and a timing circuitry to generate a side event timing signal based on the shaped analog signal from one of the subarray combining circuits that first exceeds a detection threshold during a given scintillation event.

Clause 54. The scintillator detector of clause 51, further comprising an energy module to determine a total energy of a scintillation event based on a sum of energy signals from each of the photodetector arrays.

Clause 55. The scintillator detector of clause 51, further comprising a position module to calculate location information of a scintillation event within the monolithic scintillator based on signals from each of the photodetector arrays.

Clause 56. The scintillator detector of clause 55, wherein the position module calculates the location information of the scintillation event using one of a center of gravity method, a center of photoluminescence method, a truncated center of gravity method, a truncated center of photoluminescence method, a circle-of-progression detection method, a position-weighted center of photoluminescence method, and a position-weighted center of gravity method.

Clause 57. The scintillator detector of clause 55, further comprising: at least one time correction module to: adjust a first digital timing output of the first analog-to-digital timing channel based on the location information of the scintillation event; and adjust a second digital timing output of the second analog-to-digital timing channel based on the location information of the scintillation event.

Clause 58. The scintillator detector of clause 57, further comprising: a time estimation module to generate a total event timing signal based on a function of the adjusted first and second digital timing outputs of the first and second analog-to-digital timing channels.

Clause 59. The scintillator detector of clause 51, wherein each analog-to-digital timing channel comprises a multi-stage cascaded combiner circuit to generate a single binary time-mark signal based on analog signals from multiple subarrays of photodetectors forming each respective photodetector array.

Clause 60. The scintillator detector of clause 59, further comprising an energy module to determine a total energy of a scintillation event based on time-over-threshold calculation of the single binary time-mark signal of each analog-to-digital timing channel.

Clause 61. The scintillator detector of clause 51, wherein each photodetector array comprises a plurality of subarrays of photodetectors, wherein each subarray of photodetectors comprises at least two photodetectors.

Clause 62. The scintillator detector of clause 61, wherein each analog-to-digital timing channel comprises a subarray combining circuit for each subarray of photodetectors, each subarray combining circuit configured to sum analog detection signals of the photodetectors in a respective subarray of photodetectors and generate a subarray analog detection signal.

Clause 63. The scintillator detector of clause 62, wherein each analog-to-digital timing channel comprises at least one programmable two-stage dual-trigger combining circuit, wherein each programmable two-stage dual-trigger combining circuit is configurable to selectively trigger an output binary time-mark signal in response to a selectable number of subarrays of photodetectors exceeding a subarray trigger threshold.

Clause 64. The scintillator detector of clause 62, wherein each analog-to-digital timing channel comprises at least one programmable two-stage dual-trigger combining circuit, each programmable two-stage dual-trigger combining circuit comprising: a comparator for each of at least two subarrays of photodetectors, each comparator configured to receive the subarray analog detection signal of one of the subarrays of photodetectors and generate a binary time-mark signal based on the subarray analog detection signal exceeding a subarray trigger threshold; and a combining comparator to combine the binary time-mark signals from each comparator of a selectable number of subarrays of photodetectors to generate an output binary time-mark signal.

Clause 65. The scintillator detector of clause 62, wherein each analog-to-digital timing channel comprises at least one two-stage combining circuit, each two-stage combining circuit comprising: a comparator for each of at least two subarrays of photodetectors, each comparator configured to receive the subarray analog detection signal of one of the subarrays of photodetectors and generate a binary time-mark signal based on the subarray analog detection signal exceeding a subarray trigger threshold; and a combining comparator to combine the binary time-mark signals from each comparator of each of the at least two subarrays of photodetectors to generate an intermediate output binary time-mark signal.

Clause 66. The scintillator detector of clause 65, wherein each photodetector array comprises at least four subarrays of photodetectors, and wherein each analog-to-digital timing channel comprises at least two two-stage combining circuits.

Clause 67. The scintillator detector of clause 66, wherein each analog-to-digital timing channel comprises at least one subsequent-stage combining circuit, each subsequent-stage combining circuit comprising: a subsequent-stage combining comparator to combine the two-stage binary time-mark signals from at least two two-stage combining circuits to generate a subsequent binary time-mark signal.

Clause 68. The scintillator detector of clause 67, wherein each subarray of photodetectors comprises four photodetectors, wherein each photodetector array comprises nine subarrays of photodetectors, wherein each analog-to-digital timing channel comprises nine subarray combining circuits, wherein each analog-to-digital timing channel comprises at least three two-stage combining circuits to generate three intermediate binary time-mark signals, each two-stage combining circuit comprising: three comparators, each comparator configured to receive the subarray analog detection signal of one of the subarrays of photodetectors and generate a binary time-mark signal based on the respective subarray analog detection signal exceeding a subarray trigger threshold, and a combining comparator to combine the three binary time-mark signals from the three comparators to generate an intermediate binary time-mark signal, wherein each analog-to-digital timing channel comprises one binary mark combining circuit configured to combine the three intermediate binary time-mark signals from the three two-stage combining circuits to generate a combined binary time-mark signal.

Clause 69. A gamma radiation detector module, comprising: an array of scintillator detectors to be positioned on a detector ring with axial, tangential, and radial axes, wherein each scintillator detector includes: a monolithic scintillation crystal with: an inner end-face to be radially oriented into the detector ring to receive a gamma photon, an outer end-face to be radially oriented outward and opposite the inner end-face, and four lateral faces, including: opposing first and second lateral faces to be axially oriented with respect to the detector ring, and opposing third and fourth lateral faces to be tangentially oriented with respect to the detector ring; a first photodetector array positioned on the outer end-face with reflective material positioned on the opposing inner end-face; a second photodetector array positioned on one of the axially oriented lateral faces with reflective material positioned on the opposing axially oriented lateral face; and a third photodetector array positioned on one of the tangentially oriented lateral faces with reflective material positioned on the opposing tangentially oriented lateral face.

Clause 70. The gamma radiation detector module of clause 69, wherein each scintillation crystal comprises a cuboid, such that the first, second, and third photodetector arrays are substantially orthogonal to one another.

Clause 71. The gamma radiation detector module of clause 69, wherein each scintillation crystal is rotated around an axis between 5 and 25 degrees, such that the inner end-face is configured to be radially oriented into a center of the detector ring at an off-normal angle.

Clause 72. The gamma radiation detector module of clause 69, wherein at least some of the photodetector arrays of the scintillator detectors are positioned within a virtual crystal gap between the gamma radiation detector module and an adjacent gamma radiation detector module.

Clause 73. The gamma radiation detector module of clause 72, wherein the virtual crystal gap is an integer multiple of a spatial resolution bin size of the gamma radiation detector module.

Clause 74. The gamma radiation detector module of clause 69, wherein the array of scintillator detectors comprises a 2×2 array of scintillator detectors, wherein photodetector arrays on lateral faces of the scintillation crystals in the 2×2 array of scintillator detectors are positioned on faces that are nonadjacent to other scintillation crystals in the 2×2 array of scintillator detectors.

Clause 75. The gamma radiation detector module of clause 74, wherein photodetector arrays on lateral faces of the scintillation crystals in the 2×2 array of scintillator detectors are positioned within a virtual crystal gap between the gamma radiation detector module and an adjacent gamma radiation detector module, wherein the virtual crystal gap is an integer multiple of a spatial resolution bin size of the gamma radiation detector module.

Clause 76. The gamma radiation detector module of clause 69, wherein each scintillation crystal has dimensions of length, width, and height that differ by no more than 75% from one another.

Clause 77. The gamma radiation detector module of clause 76, wherein at least two dimensions of each scintillation crystal are equal.

Clause 78. The gamma radiation detector module of clause 76, wherein a volume of each scintillation crystal is at least 500 cubic millimeters.

Clause 79. The gamma radiation detector module of clause 69, wherein the reflective material comprises at least one of an enhanced specular reflector (ESR) material, a specular reflector material, a diffuse reflector material, and a retroreflective material.

Clause 80. The gamma radiation detector module of clause 69, wherein each scintillator detector further comprises a processing circuit with an electronic timing readout channel for each photodetector array, including at least a first timing electronic readout channel connected to the first photodetector array, a second timing electronic readout channel connected to the second photodetector array, and a third timing electronic readout channel connected to the third photodetector array.

Clause 81. The gamma radiation detector module of clause 80, wherein each of the first, second, and third electronic timing readout channels have an identical electrical length.

Clause 82. The gamma radiation detector module of clause 80, wherein the processing circuit comprises a leading-edge discriminator circuit and an independent time-to-digital converter (TDC) channel.

Clause 83. The gamma radiation detector module of clause 82, wherein the processing circuit further comprises a comparator circuit to compare detection signals from each of the electronic readout channels to a detection threshold, wherein the leading-edge discriminator circuit generates a scintillation event timing signal based on the detection signal from the electronic readout channel that first exceeds the detection threshold during a given scintillation event, wherein the time-to-digital converter transmits a digital scintillation event timing signal based on the scintillation event timing signal from the leading-edge discriminator circuit.

Clause 84. The gamma radiation detector module of clause 83, wherein the processing circuit further comprises: a position module to calculate location information of a scintillation event based on independent scintillation event signals from each of the photodetector arrays of the scintillator detector.

Clause 85. The gamma radiation detector module of clause 84 wherein the position module calculates the location information of the scintillation event using one of a center of gravity method, a center of photoluminescence method, a truncated center of gravity method, a truncated center of photoluminescence method, a circle-of-progression detection method, a position-weighted center of photoluminescence method, and a position-weighted center of gravity method.

Clause 86. The gamma radiation detector module of clause 84, wherein the processing circuit further comprises: a time correction module to adjust the digital scintillation event timing signal of at least one of the photodetector arrays based on the calculated location information of the scintillation event.

Clause 87. The gamma radiation detector module of clause 86, wherein the processing circuit further comprises a diagnostic module configured to identify an error in a photodetector array based on deviations in the scintillation event timing signal of at least one of the photodetector arrays that result in erroneous calculations of the location information of the scintillation event.

Clause 88. The gamma radiation detector module of clause 84, wherein the processing circuit further comprises an amplitude correction module to adjust an amplitude time walk of a signal from at least one of the photodetector arrays based on the calculated location information of the scintillation event.

Clause 89. The gamma radiation detector module of clause 80, wherein the processing circuit determines a total energy of a scintillation event based on a sum of energy signals from the three photodetector arrays of the scintillator detector.

Clause 90. The gamma radiation detector module of clause 80, wherein the electronic readout channel of each photodetector array further comprises: a leading-edge discriminator circuit to generate a scintillation event timing signal based on a detection signal that exceeds a detection threshold, and a time-to-digital converter to transmit a digital scintillation event timing signal for each photodetector array based on the scintillation event timing signal from the respective leading-edge discriminator circuits.

Clause 91. The gamma radiation detector module of clause 90, wherein the processing circuit further comprises: a position module to calculate location information of a scintillation event based on independent scintillation event signals from at least two different photodetector arrays of the scintillator detector; and a time correction module to adjust the digital scintillation event timing signal of at least one of the photodetector arrays based on the calculated location information of the scintillation event.

Clause 92. A positron emission tomography (PET) scanning system, comprising: a plurality of gamma radiation detector modules positioned to form a detector ring with axial, tangential, and radial axes, wherein each detector module comprises an array of scintillator detectors, each of which includes: a scintillation crystal with: an inner end-face to be radially oriented into the detector ring to receive a gamma photon into the scintillation crystal, an outer end-face to be radially oriented outward and opposite the inner end-face, opposing first and second lateral faces to be axially oriented with respect to the detector ring, and opposing third and fourth lateral faces to be tangentially oriented with respect to the detector ring; a set of photodetector arrays to detect scintillation photons, including a first photodetector array positioned on the outer end-face, and a second photodetector array positioned on one of the lateral faces; and reflective material to internally reflect scintillation photons, the reflective material positioned on each face of the scintillation crystal without a photodetector array; and an imaging system to generate an image based on electronic outputs from the plurality of detector modules.

Clause 93. The PET scanning system of clause 92, further comprising a virtual crystal gap between adjacent gamma radiation detector modules, the virtual crystal gap comprising a spacing distance between adjacent gamma radiation detector modules that is an integer multiple of a spatial resolution bin size of each gamma radiation detector module.

Clause 94. The PET scanning system of clause 93, wherein the second photodetector array on the lateral face of a scintillation crystal in at least one of the scintillator detectors is positioned within the virtual crystal gap.

Clause 95. The PET scanning system of clause 92, wherein the detector ring is formed as a plurality of axially aligned rings of radial sectors, where each of the axially aligned rings comprises at least four radial sectors, and wherein each radial sector comprises at least six modules, and wherein each module comprises at least four scintillation crystals.

Clause 96. The PET scanning system of clause 92, wherein the set of photodetector arrays of each respective scintillator detector includes a third photodetector array positioned on another of the lateral faces of each respective scintillation crystal.

Clause 97. The PET scanning system of clause 96, wherein the second photodetector array is positioned on one of: the axially oriented first lateral face and the axially oriented second lateral face, and wherein the third photodetector array is positioned on one of: the tangentially oriented third lateral face and the tangentially oriented fourth lateral face.

Clause 98. The PET scanning system of clause 97, wherein each scintillation crystal comprises a cuboid, such that the first, second, and third photodetector arrays are orthogonal to one another.

Clause 99. The PET scanning system of clause 98, wherein each detector module comprises a 2×2 array of scintillator detectors.

Clause 100. The PET scanning system of clause 99, wherein the second and third photodetector arrays of scintillator detectors of adjacent detector modules are positioned within a virtual crystal gap between the adjacent detector modules.

Clause 101. The PET scanning system of clause 100, wherein the virtual crystal gap between the adjacent detector modules has a width corresponding to an integer multiple of a spatial resolution bin size of the detector modules, wherein the integer multiple is at least 1.

Clause 102. The PET scanning system of clause 92, wherein each scintillator detector further comprises a processing circuit with an electronic readout channel for each photodetector array, including at least a first electronic readout channel connected to the first photodetector array on the outer end-face of each respective scintillation crystal, and a second electronic readout channel connected to the second photodetector array on one of the lateral faces of each respective scintillation crystal.

Clause 103. The PET scanning system of clause 102, wherein the processing circuit of each scintillator detector uses signals from the electronic readout channels of the photodetector arrays to generate an energy signal that corresponds to a total energy of a scintillation event, a position information signal that corresponds to a calculated location of the scintillation event within each respective scintillation crystal, and scintillation event timing signal that corresponds to a timing of the scintillation event.

Clause 104. The PET scanning system of clause 103, wherein the position information is used to determine a depth of interaction value for the scintillation event.

Clause 105. The PET scanning system of clause 103, wherein the position information is used to adjust a line-of-response calculation to reduce a parallax error.

Clause 106. The PET scanning system of clause 103, wherein the energy signal is adjusted based on the calculated location of the scintillation event within the scintillation crystal.

Clause 107. The PET scanning system of clause 103, wherein each electronic readout channel of each photodetector array generates an independent timing signal, wherein each independent timing signal of each photodetector array is adjusted based on the calculated location of the scintillation event within each respective scintillation crystal, wherein the scintillation event timing signal comprises a function of the adjusted independent timing signals of the photodetector arrays.

Clause 108. The PET scanning system of clause 107, wherein the scintillation event timing signal is determined as an average of the adjusted independent timing signals of the photodetector arrays.

Clause 109. The PET scanning system of clause 107, wherein the scintillation event timing signal is determined as an earliest adjusted independent timing signal of the photodetector arrays.

Clause 110. The PET scanning system of clause 103, wherein the scintillation event timing signal is adjusted based on the calculated location of the scintillation event within each respective scintillation crystal.

Clause 111. The PET scanning system of clause 110, wherein the adjusted event timing signal is used to modify a time-of-flight calculation of a gamma photon.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure includes and encompasses at least the following claims.

The invention claimed is:

1. A gamma radiation scintillator detector comprising:
a cuboid monolithic scintillator with six faces, including a first end-face to receive a gamma photon, a second end-face opposing the first end-face, and four lateral faces, including a first lateral face opposing a third lateral face and a second lateral face opposing a fourth lateral face;
arrays of silicon photomultipliers (SiPMs) on only three orthogonal faces of the scintillator, including:
a first two-dimensional array of SiPMs on the second end-face of the monolithic scintillator;
a second two-dimensional array of SiPMs on the first lateral face of the monolithic scintillator;
a third two-dimensional array of SiPMs on the second lateral face of the monolithic scintillator;
reflective material positioned on the three orthogonal faces of the scintillator without an array of SiPMs, including reflective material on at least the first end-face, the third lateral face, and the fourth lateral face, such that each face with an array of SiPMs is opposed by a face with reflective material;
a position module to calculate location information of a scintillation event based on detection signals from the SiPM arrays on the three orthogonal faces of the scintillator;
a processing circuit comprising:
a first timing channel to generate a first side event timing signal for the second end-face based on combined detection signals from the first two-dimensional array of SiPMs;
a second timing channel to generate a second side event timing signal for the first lateral face based on combined detection signals from the second two-dimensional array of SiPMs; and
a third timing channel to generate a third side event timing signal for the second lateral face based on combined detection signals from the third two-dimensional array of SiPMs; and
a time correction module to adjust the first, second, and third side event timing signals based on the calculated location information of the scintillation event, thereby generating:
a first adjusted side event timing signal for the second end-face;
a second adjusted side event timing signal for the first lateral face; and
a third adjusted side event timing signal for the second lateral face.

2. The scintillator detector of claim 1, wherein each two-dimensional array of SiPMs comprises a plurality of subarrays of SiPMs, and wherein each timing channel comprises:
an analog subarray combining circuit for each of the plurality of subarrays of SiPMs to combine the detection signals thereof; and
an analog pulse shaping module to shape analog signals from each analog subarray combining circuit.

3. The scintillator detector of claim 1, wherein each of the first, second, and third timing channels comprises:
an analog combing circuit to combine analog detection signals from all the SiPMs in the respective two-dimensional array of SiPMs;
a leading-edge discriminator; and
a time-to-digital converter (TDC).

4. The scintillator detector of claim 3, wherein the analog combing circuit of each timing channel comprises a multi-stage cascaded combiner circuit.

5. The scintillator detector of claim 1, wherein each two-dimensional array of SiPMs comprises multiple rows of SiPMs and multiple columns of SiPMs, and
wherein each timing channel comprises an analog subarray combining circuit for each row of SiPMs in each respective two-dimensional array of SiPMs to combine analog detection signals thereof.

6. The scintillator detector of claim 5, wherein each timing channel further comprises an analog pulse shaping module to shape analog signals from each analog subarray combining circuit.

7. The scintillator detector of claim 1, further comprising an energy module to determine a total energy of a scintillation event.

8. The scintillator detector of claim 1, wherein each two-dimensional array of SiPMs comprises a plurality of subarrays of SiPMs, wherein each subarray of SiPMs comprises at least two SiPMs, wherein each timing channel comprises a subarray combining circuit for each subarray of SiPMs, each subarray combining circuit configured to sum analog detection signals of the SiPMs in a respective subarray of SiPMs and generate a subarray analog detection signal.

9. The scintillator detector of claim 8, wherein each timing channel comprises at least one two-stage combining circuit, each two-stage combining circuit comprising:
a comparator for each of at least two subarrays of SiPMs, each comparator configured to receive the subarray analog detection signal of one of the subarrays of SiPMs and generate a binary time-mark signal based on the subarray analog detection signal exceeding a subarray trigger threshold; and
a combining comparator to combine the binary time-mark signals from each comparator of each of the at least two subarrays of SiPMs to generate an intermediate binary time-mark signal.

10. The scintillator detector of claim 9, wherein each two-dimensional array of SiPMs comprises at least four subarrays of SiPMs, and wherein each timing channel comprises at least two two-stage combining circuits,
wherein each timing channel comprises at least one subsequent-stage combining circuit, each subsequent-stage combining circuit comprising:
a subsequent-stage combining comparator to combine the binary time-mark signals from at least two two-stage combining circuits to generate a subsequent binary time-mark signal.

11. The scintillator detector of claim 8, wherein each timing channel comprises at least one programmable two-stage dual-trigger combining circuit, wherein each programmable two-stage dual-trigger combining circuit is configurable to selectively trigger an output binary time-mark signal in response to a selectable number of subarrays of SiPMs exceeding a subarray trigger threshold.

12. The scintillator detector of claim 8, wherein each timing channel comprises at least one programmable two-stage dual-trigger combining circuit, each programmable two-stage dual-trigger combining circuit comprising:
a comparator for each of at least two subarrays of SiPMs, each comparator configured to receive the subarray analog detection signal of one of the subarrays of SiPMs and generate a binary time-mark signal based on the subarray analog detection signal exceeding a subarray trigger threshold; and a combining comparator to combine the binary time-mark signals from each comparator of a selectable number of subarrays of SiPMs to generate an output binary time-mark signal.

13. A gamma radiation detector module comprising an array of scintillator detectors, wherein each scintillator detector includes:
a cuboid monolithic scintillator with six faces, including a first end-face to receive a gamma photon, a second end-face opposing the first end-face, and four lateral faces, including a first lateral face opposing a third lateral face and a second lateral face opposing a fourth lateral face;
photodetector arrays on only three orthogonal faces of the scintillator, including:
a first two-dimensional array of silicon photomultipliers (SiPMs) on the second end-face of the monolithic scintillator;
a second two-dimensional array of SiPMs on the first lateral face of the monolithic scintillator;
a third two-dimensional array of SiPMs on the second lateral face of the monolithic scintillator;
reflective material positioned on the three orthogonal faces of the scintillator without a photodetector array, including reflective material on at least the first end-face, the third lateral face, and the fourth lateral face, such that each face with an array of SiPMs is opposed by a face with reflective material;
a position module to calculate location information of a scintillation event based on detection signals from the photodetector arrays on the three orthogonal faces of the scintillator;
a processing circuit comprising:
a first timing channel to generate a first side event timing signal for the second end-face based on combined detection signals from the first two-dimensional array of SiPMs;
a second timing channel to generate a second side event timing signal for the first lateral face based on combined detection signals from the second two-dimensional array of SiPMs; and
a third timing channel to generate a third side event timing signal for the second lateral face based on combined detection signals from the third two-dimensional array of SiPMs; and
a time correction module to adjust the first, second, and third side event timing signals based on the calculated location information of the scintillation event, thereby generating:
a first adjusted side event timing signal for the second end-face;
a second adjusted side event timing signal for the first lateral face; and
a third adjusted side event timing signal for the second lateral face.

14. A positron emission tomography (PET) scanning system, comprising:
a plurality of gamma radiation detector modules, wherein each detector module comprises an array of scintillator detectors, each of which includes:
a cuboid monolithic scintillator with six faces, including a first end-face to receive a gamma photon, a second end-face opposing the first end-face, and four lateral faces, including a first lateral face opposing a third lateral face and a second lateral face opposing a fourth lateral face;
photodetector arrays on only three orthogonal faces of the scintillator, including:
a first two-dimensional array of silicon photomultipliers (SiPMs) on the second end-face of the monolithic scintillator;
a second two-dimensional array of SiPMs on the first lateral face of the monolithic scintillator;
a third two-dimensional array of SiPMs on the second lateral face of the monolithic scintillator;
reflective material positioned on the three orthogonal faces of the scintillator without a photodetector array, including reflective material on at least the first end-face, the third lateral face, and the fourth lateral face, such that each face with an array of SiPMs is opposed by a face with reflective material;
a position module to calculate location information of a scintillation event based on detection signals from the photodetector arrays on the three orthogonal faces of the scintillator;
a processing circuit comprising:
a first timing channel to generate a first side event timing signal for the second end-face based on combined detection signals from the first two-dimensional array of SiPMs;
a second timing channel to generate a second side event timing signal for the first lateral face based on combined detection signals from the second two-dimensional array of SiPMs; and
a third timing channel to generate a third side event timing signal for the second lateral face based on combined detection signals from the third two-dimensional array of SiPMs;
a time correction module to adjust the first, second, and third side event timing signals based on the calculated location information of the scintillation event, thereby generating:
a first adjusted side event timing signal for the second end-face
a second adjusted side event timing signal for the first lateral face; and
a third adjusted side event timing signal for the second lateral face; and
an imaging system to generate an image based on electronic outputs from the plurality of detector modules.

* * * * *